(12) United States Patent
Acharya et al.

(10) Patent No.: US 11,917,018 B2
(45) Date of Patent: Feb. 27, 2024

(54) BROKER-BASED BUS PROTOCOL AND MULTI-CLIENT ARCHITECTURE

(71) Applicant: Excelfore Corporation, Fremont, CA (US)

(72) Inventors: Shrikant Acharya, Fremont, CA (US); Anoop Balakrishnan, Fremont, CA (US); John Crosbie, Fremont, CA (US); Pawel Veselov, Saratoga, CA (US)

(73) Assignee: Excelfore Corporation, Fremont, CA (US)

( * ) Notice: Subject to any disclaimer, the term of this patent is extended or adjusted under 35 U.S.C. 154(b) by 0 days.

(21) Appl. No.: 17/983,175

(22) Filed: Nov. 8, 2022

(65) Prior Publication Data

US 2023/0076669 A1  Mar. 9, 2023

Related U.S. Application Data

(63) Continuation-in-part of application No. 17/093,066, filed on Nov. 9, 2020, now Pat. No. 11,496,577,
(Continued)

(51) Int. Cl.
*H04L 67/141* (2022.01)
*G06F 8/65* (2018.01)
(Continued)

(52) U.S. Cl.
CPC .............. *H04L 67/141* (2013.01); *G06F 8/65* (2013.01); *G06F 8/658* (2018.02); *H04L 9/006* (2013.01);
(Continued)

(58) Field of Classification Search
CPC . H04L 63/10; H04L 63/0884; H04L 63/0281; H04L 67/568; H04L 67/10;
(Continued)

(56) References Cited

U.S. PATENT DOCUMENTS 9,215,228 B1  12/2015 Zhang
9,432,437 B1  8/2016 Leonard
(Continued)

FOREIGN PATENT DOCUMENTS

EP  1956794 A2  8/2008

OTHER PUBLICATIONS

PCT International Search Report of International Searching Authority, corresponding to PCT International Application No. PCT/US2019/019737 dated Sep. 6, 2019.
(Continued)

*Primary Examiner* — Djenane M Bayard
(74) *Attorney, Agent, or Firm* — Lempia Summerfield Katz LLC

(57) ABSTRACT

A system and method for an eSync bus protocol is provided. The eSync bus protocol uses a broker to route communications between electronic devices within an electronic environment, such as within a vehicle or the like. The electronic devices may first register with the broker, and thereafter send messages to the broker for routing to other registered electronic devices. In this way, the broker may act as an intermediary to route communications using the eSync bus protocol. A multi-client architecture is also provided in which multiple domains may be defined by the functions performed by electronic devices within a respective domain.

20 Claims, 30 Drawing Sheets

Related U.S. Application Data which is a continuation of application No. 16/287,514, filed on Feb. 27, 2019, now Pat. No. 10,834,206.

(60) Provisional application No. 62/635,648, filed on Feb. 27, 2018.

(51) Int. Cl.
| | |
|---|---|
| *G06F 8/658* | (2018.01) |
| *H04L 9/00* | (2022.01) |
| *H04L 9/08* | (2006.01) |
| *H04L 9/32* | (2006.01) |
| *H04L 9/40* | (2022.01) |
| *H04L 12/40* | (2006.01) |
| *H04L 45/74* | (2022.01) |
| *H04L 61/103* | (2022.01) |
| *H04L 67/00* | (2022.01) |
| *H04L 67/12* | (2022.01) |
| *H04W 4/44* | (2018.01) |

(52) U.S. Cl.
CPC .......... *H04L 9/0816* (2013.01); *H04L 9/3263* (2013.01); *H04L 12/40* (2013.01); *H04L 45/74* (2013.01); *H04L 61/103* (2013.01); *H04L 63/0823* (2013.01); *H04L 63/102* (2013.01); *H04L 63/166* (2013.01); *H04L 67/12* (2013.01); *H04L 67/34* (2013.01); *H04W 4/44* (2018.02); *H04L 2012/40215* (2013.01); *H04L 2012/40273* (2013.01)

(58) Field of Classification Search
CPC ... H04L 67/141; H04L 63/20; H04L 67/1044; H04L 63/062
See application file for complete search history.

(56) References Cited

U.S. PATENT DOCUMENTS

| | | | |
|---|---|---|---|
| 11,409,898 B1 * | 8/2022 | Jensen | G06F 21/6245 |
| 11,593,780 B1 * | 2/2023 | Dai Zovi | H04W 12/069 |
| 2004/0003249 A1 | 1/2004 | Dabbish | |
| 2008/0219274 A1 | 9/2008 | Kato | |
| 2012/0116633 A1 | 5/2012 | Kato | |
| 2013/0227015 A1 | 8/2013 | Mihara | |
| 2016/0191483 A1 | 6/2016 | Larson | |
| 2016/0335073 A1 | 11/2016 | Hong | |
| 2017/0257345 A1 | 9/2017 | Westra | |
| 2019/0108010 A1 | 4/2019 | Tillman et al. | |
| 2019/0132414 A1 | 5/2019 | Bongaarts et al. | |
| 2020/0334125 A1 | 10/2020 | Degaonkar et al. | |
| 2021/0011708 A1 | 1/2021 | Smith et al. | |
| 2021/0377053 A1 * | 12/2021 | Mahajan | H04L 63/0281 |
| 2022/0366408 A1 * | 11/2022 | Vimberg | G06Q 20/127 |

OTHER PUBLICATIONS

PCT International Written Opinion of the International Searching Authority dated Sep. 6, 2019, for corresponding PCT/US2019/019737.

\* cited by examiner

BROKER-BASED BUS PROTOCOL AND MULTI-CLIENT ARCHITECTURE

REFERENCE TO RELATED APPLICATIONS

This application is a continuation-in-part of U.S. application Ser. No. 17/093,066 (now U.S. Pat. No. 11,496,577), which is a continuation of U.S. application Ser. No. 16/287,514 (now U.S. Pat. No. 10,834,206), which claims the benefit of U.S. Provisional Patent Application Ser. No. 62/635,648, filed on Feb. 27, 2018. U.S. application Ser. No. 17/093,066 (now U.S. Pat. No. 11,496,577), U.S. application Ser. No. 16/287,514 (now U.S. Pat. No. 10,834,206), and U.S. Provisional Patent Application Ser. No. 62/635,648 are each incorporated by reference herein in their entirety.

TECHNICAL FIELD

This application relates generally to bus protocols. More specifically, this application relates to a broker-based bus protocol in which a broker acts as an intermediary between communicating devices within a system (such as within a vehicle, a building or the like) which may comprise a multi-client architecture.

BACKGROUND

Vehicles today include electronics to control and manage the vehicle. The electronics may be in various forms, such as microprocessors, microcontrollers, or the like. The electronics in the vehicle may communicate using a variety of networks and protocols, such as in-vehicle Ethernet, a controller area network (CAN) bus, or the like.

DETAILED DESCRIPTION

Figure 1:
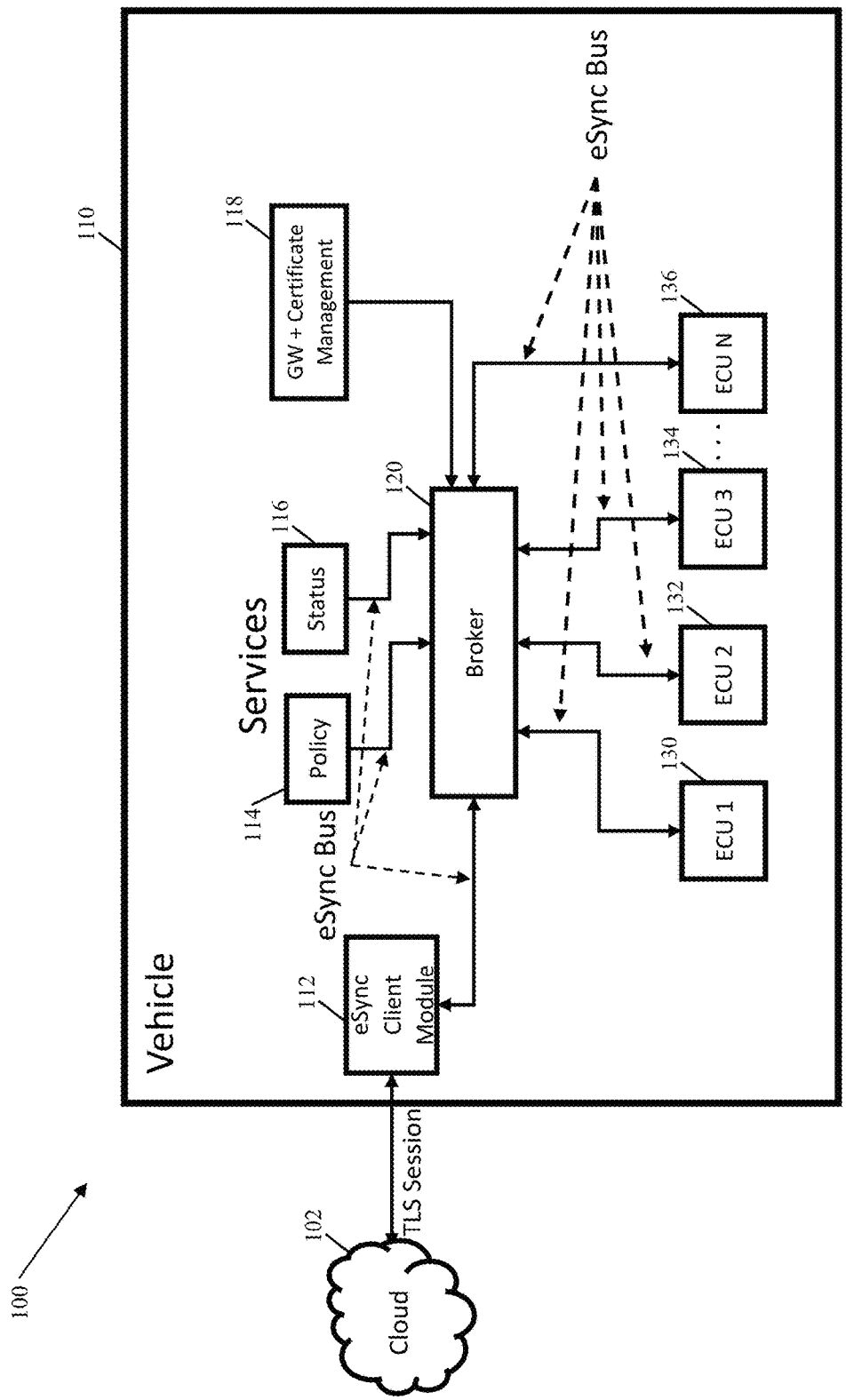
FIG. 1 illustrates a block diagram of functional devices within a vehicle and a proprietary bus interconnecting the functional devices.

Electronic devices may be present in a variety of contexts, such as vehicles, buildings, passenger ships, trains, automated mass transit systems, or any other type of large constituent system. As one example, software may be present in one or more electronic devices resident in a vehicle. As another example, software may be present in a plurality of electronic devices within a building or other type of dwelling or residence. In particular, buildings may necessitate extensive monitoring, with electronics described herein to manage various operations in the buildings, including their energy consumption, emergency evacuation, etc. The building may have multiple zones (such as multiple floors) with each zone having one or more electronic devices assigned or associated with the respective zone. In the multi-floor building example, a building with 30 floors may have an electronic device (or a set of electronic devices) assigned or associated with each respective floor in order to control communication, heating/air conditioning, fire safety, and the like. As still another example, electronic devices may be used in passenger ships, trains, or automated mass transit systems.

The electronic devices within an environment such as a vehicle may seek to communicate with each other. As one example, a first electronic device in the vehicle may seek to update software in a second electronic device in the vehicle. As another example, a first electronic device in the vehicle may seek to transmit a message (such as a user interface (UI) message or an alert message) to a second electronic device in the vehicle. Thus, any discussion below regarding communications for a vehicle may likewise be applied to communications in any other context, such as in the context of a building.

In one implementation, an eSync bus protocol may use a broker that may act as an intermediary between electronic devices in the environment, such as the intermediary to route messages between the first and second electronic devices in the vehicle. The broker may comprise a standalone device or may comprise a device instantiated within another device. In this regard, broker, broker device, or broker module may be used interchangeably in any of these configurations. In one implementation, the electronic devices are unable to route messages to each other. As one example, an electronic device, acting as the sender of the message, does not have the address (such as the network address or the node within the network, e.g., at a particular node and/or on a specific bus within the vehicle, such as sitting on the Ethernet bus or on the CAN bus) of another electronic device, acting as the receiver of the message. This may be particularly the case in vehicles, which may communicate via multiple networks, such as Ethernet, Controller Area Network (CAN), or the like. Alternatively, or in addition, the electronic devices may be configured only to accept/process messages received via the broker device. As one example, upon registration of an electronic device with the broker, the electronic device may be assigned a unique designation that may be used for addressing. In this example, the recipient electronic device may thus only process messages with the unique designation, which indicates that the messages were sent via the broker. In another example, the recipient electronic device, upon registering itself with a broker, establishes a duplex communication channel that is exclusive to the device and the broker. In this example, the recipient electronic device may thus be contacted through this channel, which would indicate that the messages come from the broker. In this regard, messaging may be routed via the broker, which may reduce or prevent multicast or broadcast messaging (e.g., where a message is transmitted to a group of destination computers simultaneously). Instead, the broker may transmit messages via "limited-cast" in which the messaging is specifically addressed.

In this regard, the broker may act as the postal service within the environment routing mail from one location to another. For example, the sender of the message may have the name (e.g., "John Doe") or other designation of the recipient, but not the address of the recipient (e.g., "123 Main Street, New York City, New York 10004"). As another example, the sender may have the name and the address of the recipient, but not the ability (e.g., the means to navigate the streets) in order to be the entity that routes the mail. As described further below, during registration, the broker may correlate the name (or other non-address indication) to the address (e.g., correlating "John Doe" to "123 Main Street, New York City, New York 10004"), and also has the ability to route the mail to the ultimate address. Thus, when a sender wishes to send a message to "John Doe", the sender may send the message (indicating that the recipient is "John Doe" and/or the address) to the broker, with the broker using the table correlating the names to identify the address ("123 Main Street, New York City, New York 10004") and uses its knowledge gained during registration in which to route the message. In another example, the sender may wish to send a type of message (such as an alert). In the context of the "John Doe" example, if "John Doe" registered for "weather alerts" with the broker, the broker has correlated either one or both of "John Doe" or "123 Main Street, New York City, New York 10004" with "weather alert". Thus, in the instance where the sender sends a message with a type "weather alert" to the broker, the broker may either:

(1) compile all of the addresses that are correlated to "weather alert" and transmit the "weather alert" message to those compiled addresses (e.g., send the "weather alert" message to "123 Main Street, New York City, New York 10004" and to other addresses that have signed up for the "weather alert" messages)); or (2) compile all of the non-addresses (e.g., "John Doe") that are correlated to "weather alert" and send those compiled non-addresses back to the sender. The sender then crafts the "weather alert" message(s) with the non-addresses (e.g., "John Doe"), with the broker then routing those "weather alert" message(s) with the non-addresses (e.g., "John Doe") by correlating the non-addresses with the addresses (e.g., correlating "John Doe" with "123 Main Street, New York City, New York 10004").

Thus, in one implementation, the broker may register electronic devices in the environment (e.g., registration of electronic devices in the vehicle). The registration may be initiated by the electronic devices (e.g., the broker sits at a predetermined address location with a respective electronic device sending a registration request with its certificate to the broker to initiate the registration process). The registration may comprise the broker validating the electronic device (e.g., via a certificate associated with the electronic device, which may be sent from the electronic device to the broker or obtained by the broker from a third party device, as discussed below) and/or the electronic device validating the broker.

In one implementation, the broker may validate the electronic device in order to determine whether the electronic device is entitled to communicate with or via the broker. Validation may be performed in one of several ways. In one way, the broker may review the certificate associated with the electronic device (e.g., the certificate that the electronic device transmitted with the registration request) in order to make the validation determination. In one implementation, the certificate may be generated by (or caused to be generated by) the broker. For example, the broker may include (or may communicate with) a certificate management authority in order to generate the respective certificate for the electronic device. As discussed further, the certificate may provide any one, any combination, or all of: (1) a non-address indication of the designation of the electronic device (which may be subsequently used by an external server or an eSync Client Module to include in a message to the broker so that the broker may route the message to the electronic device); (2) an indication of the privileges assigned to the electronic device (e.g., the types of messages the electronic device is allowed to receive (e.g., allowed to receive UI messages; disallowed to receive alert messages); the types of electronic devices that the electronic device is allowed to communicate with (e.g., allowed to communicate with eSync Client Modules, but not with other electronic control units (ECUs)); the specific devices that the electronic device is allowed to communicate with (e.g., allowed to communicate with eSync Client Module 1, but not eSync Client Module 2)); or (3) an indication that the electronic device is entitled to communicate with the broker. In this way, the certificate may indicate the one or more privileges that the respective electronic device associated with the certificate has.

Alternatively, or in addition, the electronic device may validate the broker in order to determine whether the broker is entitled to route communications to and/or from the electronic device. Validation may comprise the electronic device reviewing a certificate associated with (and optionally provided by) the broker.

Responsive to validating the electronic device and/or the broker, the broker may update one or more tables (e.g., data constructs) correlating a non-address indication(s) and/or types of message(s) to address indication(s) of the respective electronic device. As discussed above, the non-address indication associated with the respective electronic device may be correlated to the address indication and/or the types of messages the respective electronic device is allowed to receive and/or allowed to send. In this regard, the one or more tables may correlate address information (e.g., used to route information to a node within the environment such as a node within the electronic system of the vehicle) to non-address information (e.g., information which may identify the respective electronic device).

For example, via the request of the respective electronic device to register with the broker, the broker may identify the address in the system. As one example, the respective electronic device may have an address akin to a media access control (MAC) address, which may comprise an Ethernet hardware address (EHA), hardware address or physical address. The electronic device may reside at a network node (which may be a communication endpoint) or may reside within a unique address of the network node (e.g., multiple electronic devices, such as an eSync Client Module and the broker, may reside at the node of a gateway server, discussed below; in this regard, the different electronic devices, such as the eSync Client Module or the broker, may have unique addresses within the node of the gateway server). As discussed herein, the eSync Client Module may comprise a standalone device or may comprise a device instantiated within another device. In this regard, the eSync Client Module and eSync Client device may be used interchangeably and may be used in either configuration. Further, as discussed below, the eSync Client Module may perform various functions. In either instance, the broker may correlate in its one or more tables the non-address designation with the address designation. The address designation may comprise a physical address (such as may exist for ECUs or sensors) or may comprise a non-physical address (such as may exist for micro service agents or the eSync Client Modules which do not carry physical address but are addressable through the exception or reserved address space). In this way, the eSync Client Module or external server may include the non-address designation in the message to the broker. The broker, in response, may access the one or more tables (identifying the address designation based on the non-address designation in the message) to route the message. In another example, an exclusive duplex communication channel can be established by the eSync Client Module to the broker, so the broker may communicate with the particular eSync Client Module through such communication channel; a TCP channel is an example of such a channel. In this example, the internal table of the broker will be pointing to such a channel through some sort of a descriptor or reference.

In this way, the broker may communicate with various electronic devices within the environment. In particular, the configuration is akin to a virtual communication hub-and-spoke between each of the electronic devices and the broker. Further, the electronic devices may reside across different networks; nevertheless, the respective virtual communication hub-and-spoke between the respective electronic device and the broker allows the senders to be unaware of the address within the environment (e.g., an eSync Client Module does not need to know the address of the recipient ECU, and vice-versa) or even know the architecture of the system. Rather, in one instance, the sender and/or the recipient need only know the address of the broker (e.g., for registration and for transmission and/or receipt of messages). In another instance, such as a sending a type of message (such as a UI message or an alert message), the sender does not even need to know the address of the recipients. Rather, the sender need only tag the message, with the tag indicating the list of the message recipients, e.g., "UI device". The broker, in response to receipt of the message, may identify the addresses of the electronic devices that are entitled to receive the type of message, and route accordingly.

After registration, the broker may receive one or more messages. As one example, the broker may receive a session key message from a first electronic device, with the session key message including an encrypted session key (e.g., encrypted with the public key of the second electronic device) and indicative of a non-address indication of a second electronic device. For example, an eSync Client Module may wish to communicate with a specific ECU (such as to transmit a software update that the eSync Client Module received from an external server). The eSync Client Module may obtain the public key of the specific ECU (e.g., by the eSync Client Module requesting the public key from the broker, which responsive to the request, the broker sends the public key to the eSync Client Module; and/or by the eSync Client Module requesting the public key from a third party device either inside or external to the vehicle). The eSync Client Module may include the non-address indication (e.g., a serial number associated with the specific ECU or a textual string identifying the specific ECU (e.g., "ECU1" as identified in the certificate associated with the specific ECU)). The broker may route, using the non-address indication of the second electronic device and the one or more tables, the session key message to the second electronic device.

For example, the specific ECU was previously registered, so that the broker updated the tables to correlate the non-address indication to address indication (e.g., "ECU1" to node X.Y.Z). In response to receipt of the session message, the specific ECU may decrypt, using its private key, the session key in the payload of the session message. Thereafter, the eSync Client Module may send a session message to the broker, with the session message including at least a part of the message (such as the payload) encrypted with the session key, and the non-address indication of the specific ECU (e.g., "ECU1"). In response to receiving the session message, the broker may route, using the non-address indication in the session message (e.g., the "ECU1") and the one or more tables, the session message to the specific ECU (e.g., use the tables to route the session message to node X.Y.Z. In one implementation, the broker does not decrypt the session key message (at least a part of which may be encrypted with the public key of the specific ECU, as it is made impossible for the broker to learn the session key used by communicating parties) and/or the session message (at least a part of which (such as only the payload) is encrypted with the session key), instead merely routing the session key message and/or the session message to the specific ECU. For example, the broker does not decrypt (e.g., the broker is programmed not to use its decryption capabilities when routing the session message) and/or is unable to decrypt (e.g., the broker does not have decryption functionality in order to perform decryption) the session message when routing. Thus, the eSync Client Module may send a software update to the specific ECU encrypted using the session key. Thus, the broker, as part of the registration, establish the validity of the different devices, including the eSync Client Module and the ECU. Further, the broker facilitates the transmission of the session key by routing the message with the session key from the eSync Client Module to the ECU. However, after that, the broker does not secure the channel (does not encrypt or decrypt communications with its own session key), instead merely previously verifying the certificates and the addresses of the eSync Client Module and the ECU, since the communication is secured between the terminal parties. Alternatively, or in addition, in response to receiving a message from a sender and delivering it to the receiver, the broker may send a confirmation message back to the sender indicating success in receiving the message and/or success in routing the message. Further, separate from the eSync Client Module sending a message to an ECU, an ECU may send a message via the broker to another ECU (such as from ECU1 to ECU2). The broker does not necessarily distinguish or deviate from the routing dependent on which electronic device is the sender or the receiver. In this regard, in one implementation, the routing of a message sent from the eSync Client Module is the same as the routing of a message sent from the ECU.

Figure 9:
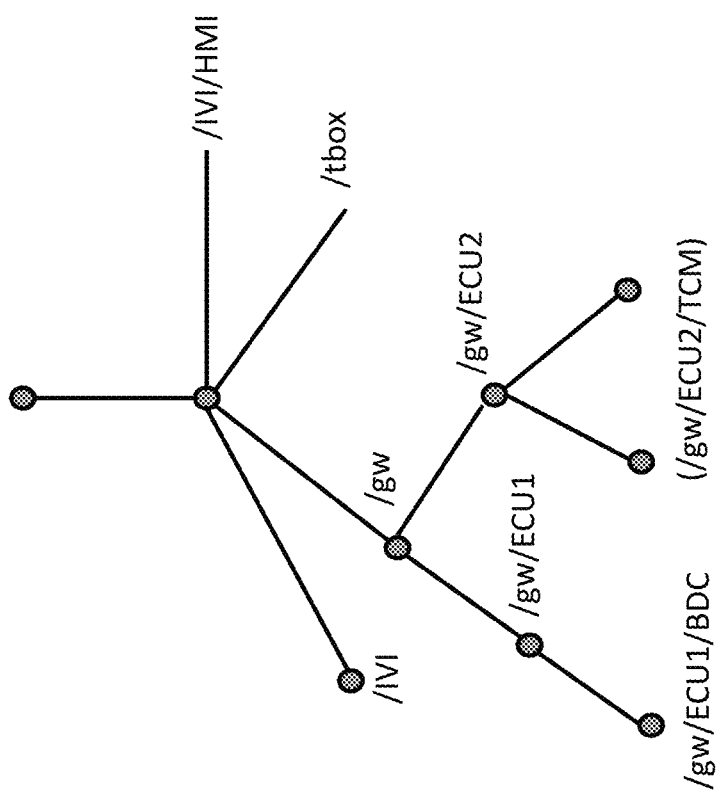
FIG. 9 illustrates a tree address structure that may be used to identify one or a group of devices.

As discussed further below regarding the presence message, the broker may send a presence message to one, some, or all devices in the electronic environment. The presence message may comprise: (1) a listing of the electronic devices that have registered with the broker (e.g., the non-address designation of the electronic device as indicated by the certificate associated with the electronic device); and/or (2) a hierarchical structure (such as flat address (e.g., /gw/ECU2) as illustrated in FIG. 9, discussed below). For example, an eSync Client Module may receive the presence message, and may forward the presence message to an external server, such as a software update server or a message server. In this way, the server may be apprised of the components available in that particular environment. The primary goal of presence message is to have ECUs or eSync Client Modules to be aware of other participants of the bus, which may in some cases alter their behavior. For example, an entertainment system may alter its display or output if different sets of speakers are present. In another example, an eSync Client Module may decide to not communicate to the ECU, or expect an answer from an ECU, if no presence information from that ECU has been received. Again, this presence information may manifest in different forms, such as a list of devices registered with the broker and/or flat addresses (e.g., /gw/ECU2/TCM) that give information regarding hierarchy but insufficient information to route messages directly to the endpoint. As discussed in co-pending in co-pending U.S. patent application Ser. No. 16/287,524 (now U.S. Pat. No. 10,834,207) entitled "System and Method for Updating Software in an Electronic Device" filed on Feb. 27, 2019, incorporated by reference herein in its entirety, a target device may not have the capability to decrypt and/or decompress the software update. In this regard, a node proximate to the target device may perform the decryption and/or decompression, and then transmit the decrypted/decompressed software update to the target device for installation. Because the flat addresses (which include the hierarchy) are sent to the eSync Client Module (and in turn to the external server), one or both of the Client Module or the external server may designate the node proximate to the target device that may perform the decryption and/or decompression. As one example, in the event that the transmission control module (TCM) is unable to perform the decryption and decompression, the node closest to the TCM (indicated by the flat address of /gw/ECU2/TCM as being ECU2) may perform the decryption and decompression. In this regard, one or both of the eSync Client Module or the external server may instruct (such as via the manifest) ECU2 to perform the decryption and decompression prior to transmission (either directly or via the broker) to TCM of the decrypted/decompressed software update for installation at the TCM.

In practice, the software update server may send to the eSync Client Module a manifest that is included in the software update and contains the non-address designation of the electronic device subject to the software update. Alternatively, the software update is sent in conjunction with the manifest (which may include the non-address designation and/or the address designation of the electronic device(s) subject to the software update). In response, the eSync Client Module may send message(s) to the broker with the non-address designation (for the broker to route the message) and with the software update as the payload (optionally encrypted using the session key).

Further, the broker may, prior to routing a message and using the one or more tables, determine whether one or both of the sender or recipient is entitled to send and/or receive the message. For example, as part of the registration process, the broker may analyze the certificate of the respective electronic device in order to determine types of messages the respective electronic device is entitled to send and/or receive. Responsive to the broker determining that the sender is not entitled to send the specific type of message and/or the recipient is not entitled to receive the specific type of message, the broker may deny routing of the message (such as the session message) to the recipient.

As another example, the broker may receive, from a sender, a message that includes a specific message type (e.g., a group message, an alert message, a UI message, etc.) and a payload, with the message not including any address indications for use by the broker device to route the message. In a first implementation, responsive to receiving such a message, the broker may route the message without further input from the sender. For example, the broker may use the one or more tables to obtain the address information of the recipients who are to receive the message, and then route the message to those recipients using the address information. In a second implementation, the broker may send the non-address indications of the recipients (e.g., "ECU1", "ECU2", etc.) back to the sender, with the sender then sending subsequent messages with the non-address indications for later routing.

In the first implementation, the broker may access the one or more tables correlating the message types to respective address indications of the electronic devices registered with the broker in order to determine a subset of the electronic devices correlated to the specific message type. For example, responsive to receiving a message that is an "alert message", the broker may determine, based on the one or more tables, the address indications (e.g., node X.Y.Z) for all of the electronic devices that are registered to receive an "alert message". As another example, responsive to receiving a message that is a specific type of "group message" (such as a "group message" comprising "ECU group" indicative of all ECUs that have registered with the broker), the broker may determine, based on the one or more tables, the address indications (e.g., node X.Y.Z) for all of the electronic devices that are registered to receive the specific type of "group message" (e.g., all devices that are registered as ECUs with the broker). The broker may then generate one or more messages with the payload and the address indications of each of the electronic devices in the subset of electronic devices, and may then transmit the generated one or more messages to each of the electronic devices in the subset of electronic devices.

In the second implementation, the broker may access the one or more tables correlating the message types to respective address indications of the electronic devices registered with the broker in order to determine a subset of the electronic devices correlated to the specific message type. For example, responsive to receiving a message that is an "alert message", the broker may determine, based on the one or more tables, the non-address indications (e.g., "ECU1", "ECU2", etc.) for all of the electronic devices that are registered to receive an "alert message". The broker may then send the list of non-address indications (e.g., "ECU1", "ECU2", etc.) to the sender device. Alternatively, the sender may send a polling message (e.g. send me a list of all devices that are registered to receive an "alert message); responsive thereto, the broker may then send the list of non-address indications (e.g., "ECU1", "ECU2", etc.) to the sender device. In response to receiving the list of non-address indications, the sender may send one or more subsequent messages, the one or more subsequent messages including the non-address indications for each of the electronic devices in the subset (e.g., in a single message including the entire list of non-address indications or multiple messages with different non-address indications). In response to receiving the one or more subsequent messages, the broker may perform the typical routing (correlating a non-address indication in a message sent from the sender into an address indication for transmission to the recipient) by accessing the one or more tables that correlates non-address indications with address indications in order to access the address indications correlated to each of the electronic devices in the subset. The broker may then route one or more subsequent messages to the address indications correlated to each of the electronic devices in the subset.

Electronic devices may comprise separate standalone devices (with a separate memory and processor) or may comprise sub-devices within an electronic device. As merely one example, the broker (or broker device) may be resident within a same electronic device (e.g., a gateway server) as an eSync Client Module. In particular, the broker may comprise a first software thread in a gateway server in the vehicle and the eSync Client Module may comprise a second software thread in the gateway server.

The eSync bus protocol may comprise uniform and secure communication functionality between various devices, such as different ECUs, across one, some, or all in-vehicle networks. In this regard, the eSync bus protocol enables inter-device (such as inter-ECU or ECU to eSync Client Module) communication across buses of different types (e.g., one or more devices sitting on the CAN bus communicating with one or more devices sitting on the Ethernet bus).

Typically, vehicles may have a plurality of different types of networks, such as Ethernet, CAN, etc. Each of the networks has strengths and drawbacks vis-à-vis the vehicle environment. For example, in-vehicle Ethernet does not have a proper protocol defined for inter-ECU communication. As another example, CAN has Unified Diagnostic Services (UDS), but it does not have security. As still another example, CAN is a broadcast methodology, which may be bandwidth inefficient.

In one implementation, the eSync bus protocol may include any one, any combination, or all of:

a defined remote procedure call (RPC) mechanism based on the message structure, such as used in peer-to-peer (P2P) communications only; enable delivery of arbitrary messages between two systems; enable delivery of arbitrary messages to multiple systems simultaneously, based on subscription; authorization parameters include any one, any combination or all of: a flag indicating bus access is allowed; zero or more group names the peer belongs to; or one or more peer names (ECU, etc.) that the peer represents; support security, including authentication and/or authorization mechanism (e.g., X.509); support encryption mechanism (e.g., AES); System Network Architecture (SNA) log and trace features; SNA tailored to internet of things (IoT) or car-to-car communications (e.g., Car2X_solutions); or SNA for cloud app support.

The eSync bus protocol may support one or more address types, such as any one, any combination, or all of: special addresses; update agent; or groups. Example special addresses include, without limitation: eSync Client Module (whereby the entity is an eSync Client Module or other type of inter-process communication management software device); or Broker (discussed in further detail below). In this regard, certain addresses may be reserved by the eSync bus protocol and may have special meaning. Further, an update agent address may comprise a hierarchical address structure (discussed further below) in which a message is set to an address in the form of $Xi/ \ldots /Xn$ is delivered to all of $Xi/ \ldots /Xj$ where $j \leq n$. Various types of groups are contemplated. For example, in one implementation, general purpose text destination strings may be used, with the group name determined by the specific implementation. Example implementations include, without limitation:

connection-info (a connection information query is posted to this group, and peers from this group may post connection information to CommMgr; CommMgr-report (all reporting information about ongoing updates may be posted to this group); update-listener (all communications ever sent to any update agent by the CommMgr may also copied to this group); CommMgr-UI (this group may receive select messages from CommMgr; authentication PIN request messages may be sent to this group; other types of messages, with a user interface (UI) outcome are likewise contemplated); or CommMgr-config (this group may receive requests for CommMgr configuration, and members of this group may influence CommMgr configuration).

Thus, the groupings may be based on any one, any combination or all of: a particular function; a type of device; or the like.

The eSync bus protocol is configured for various uses of addresses. For example, each participant may declare its address(es), such as its address indication indicative of the address. In particular, each participant may declare as many addresses as needed, with at least one address being designated. As discussed in more detail below, the declared address(es) becomes the address list of a respective participant. Further, various security protocols, such as X.509, are contemplated. When using the X.509 identity mechanism, all addresses of the participant are declared in their respective X.509 certificate. As discussed in further detail below, various types of communications that involve the broker are contemplated. One type of message sent via the broker (e.g., from a sender to a recipient) may be termed high-level messages. Another type of message whereby the broker is the originator or the ultimate recipient (e.g., a device establishes a connection with the broker) may be termed low-level messages.

Further, one, some or all of messages may include at least one destination address, and may include as many as addresses needed. The address(es) in the message may comprise the address list of the message. As discussed in further detail below, the broker is configured to perform various functionality, including determining the recipients of the message. For example, when the broker receives a message sent from a sender, the broker determines the participants that will receive the message. In one implementation, the broker may make this determination by matching all addresses from the address list in the message against address lists of all connected participants (excluding the participant that is sending the message, so there is no possible echo). If a participant has an address in the address list in the message that matches at least one address in the list of addresses of the message, the message will be delivered to this participant. This is discussed further below with regard to address matching.

When the message is delivered to a participant (e.g., a recipient), the recipient of the message may also receive the address(es) list of the sender. In one implementation, the recipient may examine the list of address(es) of the sender, and use them as an authorization confirmation. In particular, the recipient may determine whether one, some or all of the addresses in the list of addresses of the sender is authorized (e.g., authorized to send a message of a certain type, such as an alert, an update, etc.). Responsive to making this determination that the sender is authorized, the recipient may determine that the payload in the message is acceptable for processing (e.g., acceptable for implementing as a software update, for processing of an alert, etc.). For example, if an eSync Client Module receives a connection change, the sender may be required to be in the "connection-info" group; otherwise, the recipient may reject the message since the connection information in the message cannot be trusted (e.g., if the sender's certificate does not indicate that the sender is included in the "connection-info" group, the sender is not authorized to send a message commanding a connection change). Alternatively, or in addition, the broker may make the determination whether the sender is allowed to send the message (e.g., the broker may determine a type of message sent from the sender, and determine, based on the certificate of the sender, whether the sender is allowed to send the type of message; if the broker determines that the sender is not authorized to send the type of message, the broker refuses to route the message; if the determines that the sender is authorized to send the type of message, the broker routes the message). If a message contains a report of an update agent having version information for a device node (e.g., for performing a software update as further described herein), the sender may be required to have an update agent address that matches the reported device node (e.g., the recipient may check the sender's certificate to determine whether the update agent address that matches the reported device node). When determining such an authorization address, all addresses from the address list of the sender are considered, and matching a single address may be sufficient to grant the needed authorization. Alternatively, matching of all addresses may be required to grant the needed authorization.

As discussed above, various devices, such as the broker, may perform address matching. In one implementation, address matching may be dependent on the address type. For example, special addresses (such as the eSync Client Module or the broker) may require an exact match of the special type. As another example, group addresses may require an exact match of the name of the group. As still another example, update agent addresses may use a different matching algorithm. One example matching algorithm is as follows: considering that one is matching user agent address values L against user agent address value R: break down L into sequence of {Ln}, separated by forward slashes (n may be 0, in which case the sequence is empty), and {Rm}, accordingly.

If n<m, then the address doesn't match.
If all Li==Ri, for all i∈[0, n], then the address matches
Otherwise, the address does not match.

By way of example, update agent (UA) addresses may match against the same or lesser path. If the participant declared its UA address as "/a/b", the participant will receive messages for any update agent addresses sent to "/a/b", "/a/b/xxx", etc., but not for "/a".

In one implementation, address matching is not commutative for all addresses. Thus, for certain addresses, address A may match B, but address B may not match A.

Fail-over Requirements may comprise: fail-over may be used for redundancy for high-availability; and have 2 (or more) brokers and discard duplicate messages upon receipt.

In one implementation, the eSync bus protocol includes authentication in one or more contexts including any one, any combination or all of: authentication (such as dual authentication) when registering with the broker; authentication whether to allow a sender to send a message; or authentication whether to allow a recipient to receive a message. Various authentication methodologies are contemplated. As one example, X.509 authentication credentials are contemplated. The certification may include any one, any combination or all of: certification of the identity of the device; certification whether the device is allowed to receive certain messages (e.g., certain alerts); or certification whether the device is allowed to send certain messages (e.g., whether the device is allowed or disallowed from sending/ acknowledging certain types of messages). Thus, in one instance, the certification may be used to constrain a device from eavesdropping on communications when not entitled.

Further, the certification may be indicative of allowing certain downloads and/or allowing updates to be according to a schedule.

Specific cryptographic algorithms contemplated include, but are not limited to, RSA algorithms (such as RSA-OWEP, RS256, RS384) or non-RSA algorithms. In particular, the following links include different methodologies (including symmetric or asymmetric algorithms, including asymmetric key wraps and symmetric key wraps): {+}https://tools.ietf.org/html/rfc7518#section-4; {+}https://tools.ietf.org/html/rfc7518#section-5+; {+}https://tools.ietf.org/html/rfc7518#section-3+.

As discussed above, a broker may be used as a device for implementing the eSync bus protocol. In one implementation, the broker may be a centralized actor in that messages are routed via the broker. For example, a client may connect to or register with the broker for the purpose of sending and/or receiving messages. The broker may identify the client by the network address(es) provided by the client. In one implementation, the broker may learn of the network address(es) of the client implicitly, such as via a return address of the incoming connection and/or the X.509 certificate(s) containing client credentials. Alternatively, or in addition, the broker may learn of the network address(es) of the client explicitly, such as via polling the client for its address(es).

In one implementation, the broker does not accept any messages from the client until the client successfully identifies itself to (e.g., registers with) the broker. As discussed in more detail below, successful identification may include any one, any combination, or all of: the broker authenticating at least one aspect of the client, such as the identity of the client (e.g., based on a client certificate), the ability of the client to receive and/or send a message (e.g., to receive or send messages to group(s), etc.). Because of the use of the broker and thus the separation of roles in communication, the following terms are used herein: sender, broker and recipient. The sender comprises a sender of a message. The recipient comprises the receiver of the message. The sender and the recipient may be the same entity for different messages. When the message delivery direction does not matter, the sender/recipient is referred to as client. Further, in one implementation, to withdraw itself from the broker, the client may explicitly disconnect from the broker.

Various message formats for messages are contemplated. In one implementation, JSON Web Signature (JWS)/JSON Web Encryption (JWE) may be used. For example, messages may be exchanged through JavaScript Object Notation (JSON) messages. When exchanged on the wire, messages may be wrapped, such as multiple times, into JWE and JWS standards. By way of example, the standards are discussed at https://tools.ietforg/html/rfc7515 and https://tools.ietforg/html/rfc7516, respectively. The details on when JWS or JWE is used are detailed in message flow discussion below. Thus, as discussed herein, any JSON Web message may be applied to a message under JWS or JWE.

Alternatively, message payloads may optionally not be in JSON, which is the serialization used for messages so far. Optionally, ASN.1 may be used as well. It is contemplated to create a tool that converts JSON schemas to ASN.1 schemas, and have a converter that will convert one to another and back. The same reasoning about UDS client capabilities applies. The cryptography packaging format can therefore be CMS/PKCS #7.

When a JSON Web message is transmitted, the following guidelines may apply to the contents of the JOSE (JavaScript Object Signing and Encryption) header fields: "alg" is not set to "none" (the list of supported algorithms is discussed below with regard to accepted algorithms and key sources); "cty" property has the value of "application/vnd.x14.bus message+json" for internal eSync bus protocol messages, the corresponding JSON Web mime type for wrapped messages, or high level mime type as was specified by the application; "typ" property is not used; "crit" is not used; "enc" is as specified by accepted algorithms and key sources, discussed below; the names and values of the properties that identify the key material are discussed below in accepted algorithms and key sources; "x-x14bus" header property may contain JSON serialized "Bus Object", for applicable messages.

The bus object may be part of the JOSE message header for eSync bus protocol message, and may contain meta-information related to routing, or message integrity. The bus object may be defined by the following:

```
{
  "$schema": "http://json-schema.org/draft-06/schema#",
  "$id": "https://dev-esync.excelfore.com/schema/json/xl4bus/xl4bus.json",
  "type": "object",
  "properties" : {
    "destinations" : {
       "type" : "array",
       "items" : { "$ref" : "xl4bus-address.json" }
    },
    "nonce" : { "type" : "string" },
    "timestamp" : { "type" : "string", "format" : "date-time" },
    "stream-id" : { "type" : "number", "minimum": 0, "multipleOf": 1, "maximum": 65535 }
  },
  "additionalProperties" : true
}
```

The timestamp value in the eSync bus protocol message header may be within a predetermined amount of time (e.g., 5 minutes) of the current time for message to be recognized; otherwise, the message may be rejected. The NONCE value may not repeat within a predetermined amount of time (e.g., the last 10 minutes) (double the clock variation allowance in the example above). Further, in one implementation, the NONCE value may be no less than 64 characters long.

Various accepted algorithms and key sources are contemplated. With regard to the signature, in one implementation, the RS256 signature algorithm is supported. Alternatively, or in addition, RS384 and RS512 algorithms are supported. With regard to encryption, the key management algorithm may comprise RSA1_5, RSA-OAEP, or A256KW. Other algorithms are contemplated. Further, the encryption algorithms may comprise either A128CBC-HS256, A256CBC-HS512 or A192CBC-HS384. Again, other algorithms are contemplated. With regard to the public key reference, the public key may be supplied with the "x5c" protected header parameter for the first message that is sent to the other side, and may either use "x5c" or "x5t #S256" property to identify the certificate for consecutive messages. For encrypted messages, "x5t #S256" may be sufficient due to it having a smaller size.

As discussed in more detail below, there are various interactions with the broker, including any one, any combination, or all of: initialization (or registration); normal operations; disconnecting; connectivity testing; or presence. With regard to initialization, the client and/or the broker may initiate the connection and establish serialization (with the process of establishing the serialization mechanism depending on the transport). The broker may only send other messages (such as non-registration messages) to the client after the registration confirmation is fully sent. Further, in one implementation, the client cannot send any normal messages before the registration is finished. In an implementation using connectionless transports, an external mechanism for guaranteed delivery is employed during the initialization phase (though this may not be necessary for normal operations). Finally, the presence message may contain "connected" information on all currently connected clients (e.g., clients that have previously connected with the broker).

With regard to normal operation, one, some, or all messages are encrypted for their final destinations. The messages may be encrypted using the public keys of the intended recipients. In one implementation, the public key may simply be used to encrypt a symmetric encryption key that encrypts the rest of the payload. Further, in one implementation, all recipients use X.509 authentication. In such an implementation, the public key of the corresponding X.509 certificate is to be used for such encryption. To be able to encrypt messages with the keys of all the recipients, the sender may discover the connected recipients before sending each message. As discussed further below, the sender may ask for the certificate bodies for those certificates that the sender has not seen previously (or has disposed of).

The following is one example of a sequence for communications between the sender and the broker when sending a message: sender requests destinations from the broker; broker sends destination information (in the event that there are no destinations found, this may end the sequence); sender requests certificate details from the broker (e.g., to the extent the sender does not have the certification information); broker sends the certificate details to the sender; sender sends the message to the broker; broker sends confirmation of receipt of the message and/or confirmation of transmission of the message to the recipient(s).

The following is one example of a sequence for communications between the broker and the recipient when the broker delivers the message: broker sends the message to the recipient; recipient may request certificate details (e.g., recipient may request the certificate details of the sender for authentication by the recipient); broker may send certificate details responsive to request from recipient; and recipient may confirm receipt of the message.

In this regard, a peer may request keys from other peers. For example, the peer decryption described here may include key requests and responses. Responsive to key request(s) from other peers, a peer may reply with a key response; however, in one implementation, in order for the peer to respond, each key request is signed by the public key of the receiver of the request (e.g., the peer subject to the request). Further, in one implementation, key requests need to be encrypted. The peer subject to the request may have previously produced the key that is currently being requested. If no such key has been produced (e.g., the peer did not previously produce the key), the peer need not respond to the key request, and the stream may be aborted.

With regard to an electronic device (such as an eSync Client Module or an ECU) disconnecting from the broker, the following is an example sequence: the electronic device sends a disconnect request to the broker; the broker sends a disconnect acknowledgement to the electronic device; and one or both of the electronic device and broker terminates the connection.

If the protocol is stateful (e.g., TCP), the broker may invoke some function of the protocol to shut it down. For stateless protocols, no explicit termination is needed.

With regard to groups/tree-like addresses (such as illustrated in FIG. 9), there may be 3 types of addresses allowed:

(1) predefined address (e.g., eSync Client Module or broker, which may be specified at the outset at a predetermined address, and may mean certain things. Sending a message to one of then reach the predefined device.)

(2) group addresses—single string address, destination identified by a full string match. One implementation of the eSync bus protocol includes defining the names. There are also certain predefined names in a default solution. Thus, if an electronic device assigns itself with address group designated as "bunny-rabbit", any other electronic device may contact that electronic device by sending the message to the group "bunny-rabbit". Multiple electronic devices may specify that they are a member of the group, in which case all electronic devices that indicate that they are in the group "bunny-rabbit" will receive a message targeted to the group "bunny-rabbit". However, such duplication (e.g., multiple electronic devices connecting with the same address, receiving all of the correspondence to that address) is valid for all address types.

(3) hierarchical addresses. The address comprises or consists of variable length path, separated by fixed address "words". The chain may be of any length (including zero). Example of chains include: "/a"; "/a/b"; "/a/b/c". If an electronic device declares that it is at the address "/a/b", the electronic device will receive every message that starts with "/a/b", including "/a/b" itself. In on implementation, an electronic device may declare to be at address of "/", in which case the electronic device will receive all messages directed to any hierarchical address.

With regard to connectivity testing, the client, within certain intervals, may conduct a connection test (e.g., when the underlying connection requires so). The connectivity testing is not required; however, the client may incur a higher risk of encountering a dead connection when a message needs to be sent. In this regard, the connectivity testing may be performed in advance of sending a message in order to determine whether the connection is active. The connectivity test may contain the following sequence: participant1 sends a ping to participant2; participant2 sends a pong to participant1. In one implementation, the client may perform the connectivity test responsive to identifying a predetermined event, such as determining that there is no data received from the connection within a certain amount of time.

With regard to presence, when there is a change in the recognition of clients in the system (e.g., when a new client connects to or disconnects from the broker), the presence information may be distributed to all other connected clients. In one example, the sequence for distributing presence information is as follows: the broker sends a presence message to all connected clients. In one implementation, the broker may include functionality to combine multiple presence events, or even have presence events cancel each other out, within a single message. For example, the broker may compile multiple communications indicative of presence events, such as multiple communications indicative of new client connections, multiple communications of new client disconnections, and/or multiple communications of new client connection(s) and disconnection(s), and responsive to a certain determination by the broker (such as based on a time elapse or based on a predetermined number of presence event communications received), the broker may broadcast a communication indicative of multiple presence events. In one implementation, the combined information is not gathered for longer than a predetermined amount (e.g., one second). The broker may buffer multiple connections with the same address, and not issue disconnect events; however, the broker may always issue connect events. Thus, when a new client is connected, a presence message on that client may be issued regardless. However, there may be multiple clients with the same group, special address, or update agent address. If one, then another update agent with the same address connects, between presence messages, both may generate a connection event. If one only disconnects, a disconnect event may not be issued; a disconnected event may only be issued for an address when there is no more clients for that address. This results in an imbalance in the amount of connect and disconnect events, which is intentional and by design.

With regard to the low level protocol, the communication may be broken down by frames. For example, once a TCP connection is established between two peers, the only data that needs to be exchanged between the peers is frame data as described below. The low level code of the library may assemble incoming frames into: system frames (which may be processed by the low level itself); and normal frames (which may be assembled into messages).

Each frame may start with the 4 frame header bytes as defined below. Any values used in the frame format may be big endian (network order) in which the most significant value in the sequence is stored first. Bytes and bits may be numerated as 0 based. The frame information may be encoded in the first byte (byte #0) of the frame. The following is an example of a byte:

bits 7-6 (reserved, set to 0);

bit 5 (1—last frame in a message; 0—not last frame in a message);

Bit 4 (for normal frames: 0—not a final message (in sequence); 1—final message);

Bit 3 (0—first message (request for connectivity test); 1—response message (response for connectivity test);

Bits 2-0 (000—normal frame; 001—connectivity test; 010—stream abort; 011—acknowledgement: both the acknowledgement and retransmit request are only needed for protocols that do not guarantee delivery and sequence; 100—retransmit request).

After the first byte (as formatted above), there may be additional bytes (such as 3 more bytes) containing the length of the remainder of the bytes. The information may be provided in network order. In one implementation, the length is not to contain the first 4 bytes that are considered the minimal header for each frame. The last 4 bytes of the frame may include a cyclic redundancy check, such as CRC-32 of all the data of the frame, starting with the first byte. The CRC bytes may always be included into the length of the frame. CRC-32 value is transmitted in network order.

The connectivity test frames may include a cryptographic hash algorithm, such as contain a secure hash algorithm (SHA)-256 value of some random string that was generated for the test. Other cryptographic hash algorithms are contemplated. The response may contain the same value as the request; otherwise, the response may be ignored. Further, the format may be as follows: bytes 4-35: unique test value; bytes 36-39: CRC-32.

With regard to normal frames, streams may be used to separate data between different messages. In particular, the low level protocol may use streams to separate the data. Each message exchange may run on a unique stream. When the protocol is connected, one side may always make an initial connection. The one side that makes that initial connection (typically the client) may use even numbered streams. The other side (typically the broker) may use the odd numbered streams. Once a stream has started, all messages for the same stream may re-use the same stream ID (or other identifier of the stream), until the final message is received. The stream number may be allocated when the first message is sent. The client may use an atomic counter to keep track of stream values. Further, the client may re-use stream IDs after the final message have been sent/received, and twice the message timeout time has passed.

All frames within a stream may be numbered consecutively. The numeration continues throughout all the messages. The sequence numbers for the incoming and outgoing messages may be independent from each other. The underlying protocol handler may deal with re-sequencing the frames before handling them to the upper layer. If the message exchange runs out of sequence numbers (e.g., numeric overflow), the numeration may restart from 0. The sequence number may be an unsigned value.

With regard to the frame identifier, it may include the stream identifier and sequence number. The frame identifier may be allocated 2 bytes for each, such as: 2 bytes containing the stream ID; and 2 bytes containing the sequence number.

For the normal frames, the minimal header is followed by: 2 bytes containing the stream ID; and 2 bytes containing the sequence number.

The frame with the number 0 may be considered a special frame, and may contain an additional first byte that contains the mime type information for the message: 00—application/jose; 01—application/jose+json; 02—application/json; 03—application/vnd.x14.busmessage-trust+json.

In one implementation, a TCP-UDS proxy may be used and may be built-in at the broker as well, but may be separate if the electronic device connected to UDS is not the same as the one running the broker, or if there are multiple UDS hosts. The proxy may convert low-level eSync bus protocol frames into UDS frames, rather than TCP packets.

With regard to stream cancellation, the stream cancellation frame includes a payload, similar to a normal message. The stream cancellation frame may include no sequence number, with the entire message fitting into a single frame. The payload may comprise a JWS message, and contain a nonce, a timestamp and a stream ID. The stream may be canceled if the payload can be verified. The minimal frame header may be followed by: content type (see frame format, discussed above); payload; and CRC-32.

As discussed above, encryption may be used in transmitting messages. Specifically, a message may be encrypted with a public key, which may include creating a symmetric key (e.g., a session key), using the symmetric key to encrypt content, and then encrypting the key itself with the public key.

As discussed above, one device (e.g., a sender) may send a communication to another device (e.g., a receiver). In one implementation, the sender has the public key(s) of the receiver (e.g., the sender requested the public key of the receiver, which may be obtained by the sender directly from the certificate authority or from an intermediary, such as the broker). In a specific implementation, the sender sends a private message (S0) to the receiver. The sender may encrypt the message with the public key(s) of the receiver, creating JWE message (S1). In one implementation, the sender first compresses message (S0), with the JWE standard supporting compressing the original body as part of encryption. Thereafter, the sender may sign the encrypted message (S1) with one of its keys (such as the private key of the sender), thereby creating JWS message (S2). The sender may further add routing information to JWS message (S2). The sender may then encrypt JWS message (S2) with the public key of the broker, thereby creating JWE message (S3). After which, the sender may transmit the JWE message (S3) to the broker.

Responsive to the broker receiving the JWE message (S3), the broker may decrypt the JWE message (S3) with the broker's private key, which produces JWS message (S2) (or which results in failure). The broker may then examine JWS message (S2) for the destination(s) of the message (which may be contained in the routing information added by the sender). The broker may perform each of the following for each receiver identified by the routing information:

The broker may encrypt JWS message (S2) with the public key of the respective receiver, thereby creating message S4;

The broker delivers message S4 to the destination of the respective receiver;

The respective receiver decrypts message S4 with its private key, which must thereby produce S2;

The respective receiver may verify the signature of S2, and extract 51 if validation succeeds The respective receiver may decrypt 51 with its private key, thereby obtaining S0.

In one implementation, there is a confirmation by the receiver to the broker of success in receiving the message.

Thus, as discussed above, a device may initiate the sending of a message via the broker to another device. Conversely, the broker may be the ultimate destination of the communication. In this regard, messages may be sent from the broker to the client, or the client may send a message to the broker itself (e.g., not using the broker as an intermediary for sending a message to a 3rd party receiver). In these instances, the process may be simpler than when the broker acts as the intermediary when transmitting messages. Further, the process may be symmetric, with either the client or the broker termed as the producer (e.g., the device that produces the message) and the consumer (e.g., the device that receives and consumes the message). Both the producer and the consumer know the public keys of the other, which may be learned or obtained by them during the connection initialization process, as discussed previously.

In one implementation, the sequence of transmitting the message between the producer and the consumer may be as follows: the producer generates message M0; the producer signs message M0 with its own private key, thereby resulting in signed message M1; the producer encrypts signed message M1 with the public key of the consumer, thereby resulting in encrypted signed message M2; the producer sends encrypted signed message M2 to the consumer; the consumer receives encrypted signed message M2, decrypts it with its private key, thereby producing signed message M1; the consumer may then validate the signature of the producer in signed message M1, thereby extracting message M0 and resulting in the consumer obtaining the original message.

As discussed above, routing and/or meta information may be associated with the message subject to transmission. In one implementation, the routing and/or meta information used for the transmission is an object of a protected header at an appropriate message level.

Further, authentication of certificates may be performed, as discussed above. Various types of authentication are contemplated. As one example, X.509 authentication is performed.

In one implementation, the following steps are performed for X.509 authentication:

(1) the certificate path is validated against known trust anchors, such as according to RFC #4158 and RFC #5280;

(2) extended key usage is validated. In one implementation, the signature and the encryption extended key usage (EKU) is present. Key usage, which may define the purpose (e.g., encipherment, signature, certificate signing) of the key contained in the certificate, may also be present. In this regard, the key usage may be used when the key might be used for multiple operations and where it is desired to restrict usage of the key to a subset of the potential multiple operations. In one implementation, the key usage may have "digitalSignature" for signing and "keyEncipherment" for encryption. Prior to sending the message, the sender may analyze at least one aspect of the key usage. For example, responsive to the sender determining that the receiver's certificate does not have any key usage information, the sender may refuse to encrypt the message to send to the receiver. Alternatively, or in addition, the broker may filter out those certificates without key usage information because messages for any receiver are to be encrypted.

(3) if sending a message to a specific group, the sender verifies the recipient has the specific group listed in the corresponding attribute (e.g., the certificate associated with the recipient indicates that the recipient is entitled to receive messages from the specific group).

(4) when sending a message to a destination, the sender may verify destination value. In one implementation, the destination value is governed by ASN.1 definition of the value attribute. Special destinations have matching object identifier (OID), such as where UpdateAgent (UA) destination uses the destination value matching the destination. The rule for destination matching includes:

(4.a) convert the destination to an array of strings, where elements of the array are strings of the destination broken at the '/' characters. Multiple '/' characters will not create empty array points (which the array points termed array A).

(4.b) convert the update agent address from the certificate into an array in the same manner, with the array termed array B.

(4.c) iterate through both arrays of A and B, and compare elements of both arrays at the same index. If a comparison of an element fails, stop and skip the destination.

(4.d) if the array B is exhausted, stop and skip the destination.

(4.e) if the array A is exhausted, or both arrays of A and B are exhausted simultaneously, then the destination receives the message.

In one implementation, the system may address one or more types of errors. Example errors include, but are not limited to any one, any combination, or all of: low level errors; stream errors; timeout errors; and content errors. Other types of errors are contemplated.

Low level errors may arise from the following list of conditions: transport socket read/write error; and/or connectivity test timeout. In one implementation, the response to a low level error is to disconnect the transport channel and re-establish the connection. The frames that fail CRC checksum may be silently discarded (which may result in out-of-sequence frames over reliable protocol; however, the probability of such events is very low).

Stream errors may result in the cancellation of a stream. Unless the initialization itself fails (which may cause the connection to be dismissed), the response to the stream errors is to cancel the stream that caused the errors or is the source of the error. The error conditions include any one, any combination, or all of: timeout waiting for a frame; encryption or signature verification error (which may include the content errors (e.g., failed to parse security data), verification errors (e.g., mismatched hash, etc.), or authenticity errors (e.g., expired certificate, no X.509 chain, etc.); frame out of sequence (for reliable transports only, unreliable transports may address missing frames at a transport adapter level).

With regard to timeout errors, examining the message exchanges discussed above, for any messages that require a reply, a timeout may occur responsive to not receiving such a reply within a predefined timeout. One example of such a reply is connectivity test messages. Alternatively, or in addition, there may be transport timeout, when receiving frames, such that each frame is not apart more than some predefined timeout.

A content error may be detected by the calling application. The application may not view streams; therefore, the application use its own timeouts, and signaling mechanism for errors.

Further, as discussed above, the message may be sent in a variety of formats. As one example, the application messages may be in the JavaScript Object Notation (JSON) format. In particular, the top level JSON artifact may be a JSON object. In this way, the messages expressed as JSON schema enables various devices, such as the broker, to access the information about the message.

Thus, it may be difficult to find a trusted communication channel through which to communicate within the vehicle. In this regard, the broker may be used as a trusted device in which to establish the trusted communication channel, which may be termed a broker communication channel. As discussed above, the broker may be used to validate one or more electronic devices within the vehicle. In turn, responsive to being validated by the broker, the trusted devices may communicate via the broker communication channel (e.g., whereby the broker routes communications) and may receive a broker key which may be used in order to encrypt communications transmitted via the broker communication channel. In one embodiment, responsive to the broker device validating a respective electronic device, the broker device may send the broker key to the respective electronic device. After which, because the broker communication channel may comprise a trusted communication channel, the electronic devices may send various communications that are encrypted with the broker key.

As one example, after validation, one or more electronic devices may use the broker communication channel to establish a broker communication channel session key, which may comprise a key to encrypt communications transmitted via the broker communication channel. For example, the broker device may cause the broker key to be sent to be sent to the electronic device that was validated by transmitting a communication (with the broker key in the payload) to the electronic device.

In one or some embodiments, in addition to using the broker key to encrypt communications sent via the broker communication channel, the broker communication channel session key (alternatively termed a broker-routed session key) may likewise be used to encrypt communications sent via the broker communication channel. In particular, during a broker-routed communication session (in which messages between electronic devices are routed via the broker device), a broker-routed session key may be generated. As discussed in more detail below, the broker-routed session key (alternatively termed a session key for encrypting messages that are routed by the broker in the broker-routed communication session) may be generated by sending information (e.g., public keys) that the electronic devices may use (along with other private information, such as private keys) to generate the broker-routed session key. After establishing the broker-routed session key, the electronic devices may use the broker-routed session key along with the broker key (received by the electronic devices after validation by the broker device) to encrypt messages for transmission between the electronic devices and routed by the broker device.

Merely by way of example, the payload of a communication may be encrypted with the broker communication channel session key (alternatively termed the broker-routed session key) and one or more other parts of the communication may be encrypted with the broker key (e.g., the address indicative of the destination device, such as the receiver address indication). Further, in one or some embodiments, the broker is unable to determine the broker communication channel session key (and therefore cannot decrypt the payloads of communications sent via the broker communication channel). In one embodiment, a sender device (interchangeably termed a sender electronic device) and a receiver device (interchangeably termed a receiver electronic device) may seek to establish the broker communication channel session key (alternatively termed the broker-routed session key). In a specific implementation of this embodiment, the sender device and the receiver device may not wish for the broker device to know or discover the broker communication channel session key. However, sending the broker communication channel session key in the payload of a communication sent via the broker communication channel (and encrypted just with the broker key) is discoverable by the broker device. As such, one or both of the sender device and the receiver device may send information that can be used by one or both of the sender device or the receiver device to generate the broker communication channel session key but that cannot be used by the broker device to generate the broker communication channel session key. By way of example, the sender device may send a first session message, via the broker communication channel (and encrypted with the broker key), the sender device public key (or other type of public information of the sender device). After receipt of the sender device public key, the receiver device may then generate the broker communication channel session key using the sender device public key and the receiver device private key. Similarly, the receiver device may send a second session message, via the broker communication channel (and encrypted with the broker key), the receiver device public key (or other type of public information of the receiver device). After receipt of the receiver device public key, the sender device may then generate the broker communication channel session key using the receiver device public key and the sender device private key. In this way, both the sender device and the receiver device may each independently generate the broker communication channel session key (using its respective private key and the other party's public key) whereas the broker device (only having access to the public keys of the sender device and the receiver device) is unable to generate the broker communication channel session key (e.g., since the broker device does not have access to both of the private keys associated with the sender device and the private key associated with the receiver device). Thus, asymmetric cryptography or public key cryptography may be used to establish or generate the broker communication channel session key. Other ways to generate the broker communication channel session key are contemplated. In this way, even though the broker device is facilitating the communication between the sender device and the receiver device (by routing the various communications to establish the broker communication channel session key) and even though the broker device can decrypt the communication (since the communications are encrypted by the broker key), the broker device is unable to generate the broker communication channel session key with the limited information transmitted (e.g., only the public keys of the sender device and the receiver device, and not having the private keys of at least one of the sender device and the receiver device). Thus, the sender device and the receiver device may take advantage of the trusted nature of the broker communication channel, but due to the procedure followed (e.g., only sending the public keys), the sender device and the receiver device may still keep at least a part of the communications sent via the broker communication channel secret even from the broker device.

Further, once the broker communication channel session key is generated (without the broker device being unable to determine it), the electronic devices, such as the sender device and the receiver device, may send communications via the broker communication channel encrypted with the broker communication channel session key and with the broker key. In one embodiment, the communications sent via the broker communication channel may exchange data between the sender device and the receiver device. Again, in such a data exchange, the data in the communications sent via the broker communication channel may be encrypted with the broker communication channel session key, and thus may not be decrypted by the broker device (since the broker device is unable to generate or determine the broker communication channel session key). Alternatively, or in addition, the communications sent via the broker communication channel may be used to set up yet another communication channel, such as a communication channel separate from the broker communication channel. In one particular example, the communications sent via the broker communication channel may be used to set up a direct channel (e.g., without the broker device acting as a router) between the sender device and the receiver device. Various protocols are contemplated for such a direct channel, such as data distributed services (DDS) (alternatively termed a distributed data service), user datagram protocol (UDP), or transmission control protocol (TCP).

For example, DDS implements a publish-subscribe pattern for sending and receiving data, events, and/or commands among the nodes. Nodes that produce information, which may be considered publishers, may create "topics" (e.g., temperature, location, pressure) and publish "samples". DDS may deliver the samples from the publisher (e.g., the sender device(s)) to subscribers (e.g., receiver device(s)) that declare an interest in that topic. In this DDS context, the electronic devices, such as one or both of the sender device or the receiver device, may transmit via the broker communication channel information to configure the DDS channel, which may be separate from the broker communication channel (e.g., whereby communications are not routed through the broker device). Specifically, one or both of the following may be encrypted with the broker communication channel session key and routed via the broker device through the broker communication channel session: (i) information to generate a direct communication channel key, such as a DDS channel key, or the direct communication channel key itself; or (ii) a topic for the DDS session. For example, the sender device may generate the direct communication channel key, such as the DDS channel key. The sender device may then encrypt the direct communication channel key with the broker communication channel session key (which is not known to the broker device), encrypt part or all of the communication with the broker key (which is known to the broker device), and transmit the communication to the broker device for routing to the receiver device. As discussed above, the broker device may: decrypt the communication with the broker key; review the communication (e.g., for address information of one or both of the sender device or receiver device, which are indicated in the communication); determine that one or both of the sender device or the receiver device was previously validated by the broker device; and forward the communication (which is encrypted with the broker key and the broker communication channel session key) to the receiver device. In turn, the receiver device may: decrypt the communication (using the broker key and the broker communication channel session key); determine the topic and the DDS channel key (after decrypting the payload of the communication with the broker communication channel session key); and configure the DDS channel (using the DDS channel key and the decrypted topic to "subscribe" to the topic listed in the communication). After which, the sender device may encrypt (with the DDS channel key) communications that identify the topic previously sent via the broker communication channel session. The encrypted communications may then be sent via the DDS channel for receipt by the receiver device, which may identify the topic that the receiver device previously subscribed to and decrypt the communications using the DDS channel key.

In this way, the broker device, as a trusted device, may be used as a trusted channel. As discussed above, the sender device and the receiver device may have pre-programmed therein the address of the broker device in order to communicate with the broker device and be verified by the broker device. After validation, the sender device and the receiver device become broker-verified devices and may receive the broker key, which may be used to encrypt communications via the trusted broker channel. After which, a first broker-verified device may wish to communicate with a second broker-verified device via the trusted broker channel. To do so, the first broker-verified device may send a communication (encrypted with the broker key and including an address designation of the second broker-verified device) to the broker device for routing. The communication may include information (e.g., a public key of the one broker-verified device) to generate or establish a key that is known to the second broker-verified device but not to the broker device. The broker device, confirming that the sender of the communication is a broker-verified device, routes the communication to the second broker-verified device. The converse may also occur whereby the second broker-verified device sends a communication along with information (such as the public key of the second broker-verified device) in order to generate or establish a key that is known to the first broker-verified device but not to the broker device. As discussed above, this key may be used to encrypt information on the trusted broker channel to privately send information between the first and second broker-verified devices. In one instance, the private information may be for establishing a second channel outside of the trusted broker channel (e.g., the private information may include the topic and/or a key for use in a DDS channel). In another instance, the private information may be used to transmit data between the devices.

Thus, as a general matter, different types of session messages may be sent via the broker communication channel including one or both of: (1) one or more establishing-key session messages in order for each of the sender device and receiver device to establish the session key (e.g., the sender device sending its public key; the receiver device sending its public key); and/or (2) one or more encrypted-by-session-key session messages that are encrypted with the session key and the broker key. There may be one or more types of (2) messages. In one example, the one or more encrypted-by-session-key session messages include a data transfer (e.g., a data distribution session) from the sender device to the receiver device (e.g., diagnostic data that is generated by sensors in the vehicle and transmitted in a diagnostic message from the sender device to the receiver device). In a second example, the one or more encrypted-by-session-key session messages include one or more non-broker routed configuration messages, with the one or more non-broker routed configuration messages including information to configure a non-broker routed communication channel to transmit in a non-broker routed communication session (e.g., the topic and the DDS channel key encrypted using the session key in order to configure the DDS channel). In the second example, after the one or more encrypted-by-session-key session messages are sent, thereby configuring the separate channel (e.g., the DDS channel that does not route data through the broker), a data transfer may occur on the separate channel (e.g., transmit the diagnostic generated by sensors in the vehicle from the sender device to the receiver device via the DDS channel).

Further, an electronic device may be installed in the vehicle and may be configured to communicate with one or more other electronic devices in the vehicle. The electronic device may include: at least one memory; and at least one processor configured to: communicate with a broker device in the vehicle in order to validate the electronic device with the broker device; receive, responsive to the device being validated by the broker device, a broker key in order to encrypt communications sent to the broker. In addition, the process may be configured to determine to send a broker-routed message in a broker-routed session (e.g., a message that is routed via the broker device). Responsive to determining to send the broker-routed message in the broker-routed session: the processor is configured to: configure at least one broker-routed message, the at least one broker-routed message for generating a broker-routed session key and including an indication of the receiver device and a payload; encrypt the at least one broker-routed message with the broker key; and transmit the at least one broker-routed message to the broker device in order for the broker device to: decrypt the at least one broker-routed message with the broker key; determine whether at least one of the electronic device or the receiver device have been validated by the broker device; and responsive to determining that the at least one of the electronic device or the receiver device have been validated by the broker device, routing the at least one broker-routed message to the receiver device in order for the receiver device to generate the broker-routed session key. In addition, the processor may be configured to determine to send a non-broker-routed message in a non-broker-based session (e.g., a message that is not routed via the broker device). Responsive to determining to send the non-broker-routed message in the non-broker-based session: the processor is configured to use the broker device to establish a non-broker-routed session key, the non-broker-routed session key used to encrypt one or more messages in the non-broker-routed session; encrypting the one or more non-broker-routed messages with the non-broker-routed session key; and transmitting the one or more non-broker-routed messages to the receiver device without routing through the broker device. By way of example, using the broker device to establish a non-broker-routed session key (e.g., the DDS channel key) may be performed by using the broker device to route information used for or indicative of the non-broker-routed session key so that the receiver device obtains the non-broker-routed session key (e.g., the information routed may include one or both of the topic and the DDS channel key itself). In particular, the broker device may be used to establish the non-broker session key by:

First, one or more broker-routed messages may be sent to establish the broker-routed session key. For example, the sender device may send its public key, via the broker device to the receiver device, and vice versa. Specifically, the sender device may generate a first broker-routed message for transmission from the sender device, with the first broker-routed message includes a public key associated with the sender device that is encrypted with the session key; thereafter, a second broker-routed message is received by the sender device, with the second broker-routed message including a public key associated with the receiver device that is encrypted with the session key. As discussed above, the sender device may generate the session key using its private key and the receiver device public key.

Second, at least one message may be generated that includes the information to establish the non-broker-routed session key and/or the non-broker routed session. For example, the sender device may generate a message that includes the information, such as the topic and/or the DDS channel key itself, encrypted with the broker-routed session key, and sends the at least one message to the broker for routing to the receiver device. This information may then be used to send data via the non-broker-routed session (e.g., the DDS channel).

Thus, as discussed above, various devices and methods are disclosed. For example, a method is disclosed in which an electronic device, installed within a vehicle, communicates with a plurality of electronic devices in the vehicle, with the method comprising: communicating with a broker device in the vehicle in order to validate the electronic device with the broker device; receiving, responsive to the electronic device being validated by the broker device, a broker key in order to encrypt communications sent to the broker device; responsive to determining to send a broker-routed message in a broker-routed session: configuring at least one broker-routed message, the at least one broker-routed message for generating a broker-routed session key and including an indication of a receiver device and a payload; encrypt the at least one broker-routed message with the broker key; and transmit the at least one broker-routed message to the broker device in order for the broker device to: decrypt the at least one broker-routed message with the broker key; determine whether at least one of the electronic device or the receiver device have been validated by the broker device; and responsive to determining that the at least one of the electronic device or the receiver device have been validated by the broker device, routing the at least one broker-routed message to the receiver device in order for the receiver device to generate the broker-routed session key; determine to send a non-broker-routed message in a non-broker-routed session; responsive to determining to send a non-broker-routed message: use the broker device to establish a non-broker-routed session key, the non-broker-routed session key used to encrypt one or more non-broker-routed messages in the non-broker-routed session; encrypting the one or more non-broker-routed messages with the non-broker-routed session key; and transmitting the one or more non-broker-routed messages to the receiver device without routing through the broker device.

Further, there may be several target devices within the vehicle (or other electronic environment) that may be subject to a software upgrade, such as discussed in co-pending U.S. patent application Ser. No. 16/287,524 (now U.S. Pat. No. 10,834,207) entitled "System and Method for Updating Software in an Electronic Device" filed on Feb. 27, 2019, incorporated by reference herein in its entirety. In one implementation, a single eSync Client Module is used to manage the download of the software upgrade to the multiple target devices in the vehicle. For example, a single eSync Client Module may manage software updates to any two, any three, or all four of the following: telematics control unit (TCU); head unit; advanced driver assistance system (ADAS); or the controller area network (CAN) device.

In an alternate implementation, multiple eSync Client Modules are used within the vehicle to perform the software upgrade. In this way, the vehicle may be configured as a multi-client architecture, with multiple eSync Client Modules used. Thus, in one implementation, the eSync Client Modules comprise software update modules. In practice, the different eSync Client Modules may be assigned to different devices (or different sets of devices) within the vehicles based on one or more factors. For example, the eSync Client Modules may be assigned to update different devices within the vehicle based on the type of functions performed by the software of the target device (e.g., based on the type of devices, such as a UI device). As another example, the eSync Client Modules may be developed for each OEM's custom vehicle network along with several download agents which may be customized for each engine control unit (ECU) in the vehicle. In this way, the design of the multi-client architecture is not limited by potentially differing networks; rather, the design may be based on the types of or functions performed by the devices within a respective client.

In particular, one division may be based on the functions performed by the software of the target device, such as critical functions (e.g., related to safety) and non-critical functions (e.g., such as infotainment). For example, criticality of a target device may be based on the Automotive Safety Integrity Level. ASIL is a risk classification scheme defined by the ISO 26262—Functional Safety for Road Vehicles standard. There are four ASILs identified by the standard: ASIL A, ASIL B, ASIL C, ASIL D. ASIL D dictates the highest integrity requirements on the product and ASIL A the lowest. In particular, ASIL D is the most stringent level of safety measures to apply for avoiding an unreasonable residual risk, represents likely potential for severely life-threatening or fatal injury in the event of a malfunction, and requires the highest level of assurance that the dependent safety goals are sufficient and have been achieved. Other divisions of the target devices are contemplated.

In one implementation, all of the target devices within a specific division (e.g., ASIL D) may connect to nodes in a same specific network within the vehicle (with the respective eSync Client Module also residing in the same specific network or in a different network). Alternatively, or in addition, one, some or all of the target devices may connect to nodes in different networks within the vehicle, such as connect to an Ethernet network, a CAN network, etc. (with the respective eSync Client Module also residing in the same network as a specific target device, or with the respective eSync Client Module residing in a different network than all of its target devices). Thus, in one implementation, the respective eSync Client Module may communicate with its respective group of target devices independent of the layout of the devices amongst the different networks within the vehicle.

As discussed in more detail below, a first eSync Client Module may be assigned to update target devices that have a specific ASIL level (such as ASIL D), and a second eSync Client Module may be assigned to update target devices that have different specific ASIL level(s) (such as ASIL A only or ASIL A-C). Thus, there is a separation of non-critical ASIL-A and critical ASIL-D component for software updates. In turn, the architecture may configure separate update zones, defining the multi download manager client architecture for the single vehicle (or other electronic environment).

As another example, a first eSync Client Module may be assigned to update target devices that have an ASIL A designation, a second eSync Client Module may be assigned to update target devices that have an ASIL B designation, a third eSync Client Module may be assigned to update target devices that have an ASIL C designation, and a fourth eSync Client Module may be assigned to update target devices that have an ASIL D designation.

Each of the eSync Client Modules may perform any one, any combination, or all of the following independently of other eSync Client Modules: (1) connect to an external server in order to obtain the update software; (2) receive the update from the external server, which may include a manifest (including designations (such as non-address designations and/or address designations) of the target devices subject to the software update and the software update which may be included or associated with the manifest); (3) after receiving the update from the server, determine whether to begin the process of updating the software in the target device(s); (4) transmit (directly or via a broker, discussed below) the software update to the target devices; (5) determine whether the target devices have been properly updated; and (6) determine which target devices to roll back the software to a previous version in the event that the target device(s) were not properly updated. For example, each eSync Client Module may connect to the server independently, may download the individual manifest and the payload (e.g., compressed or uncompressed), and may integrate with OEM's custom download agents for target devices in the domain.

Alternatively, or in addition, one, some, or all of the eSync Client Modules may receive other types of communications (such as alerts, etc.) to send to their respective device(s). In this regard, the respective eSync Client Module may communicate with an external device (such as a server) in order to obtain the communication, transmit the communication (e.g., directly or through a broker, as discussed below), with the recipient target device residing in the same network as other target devices that receive the communication or a different network as other target devices that receive the communication, and/or with the recipient target device residing in the same network as its respective eSync Client Module (that sends the communication) or residing in a different network than its respective eSync Client Module.

In one implementation, the multi-eSync Client Module architecture may be arranged as mutually exclusive domains, as discussed in more detail below. Thus, the various functions performed by the eSync Client Modules in the different domains are entirely separate and not dependent at all on one another. Example functions that an eSync Client Module may perform include, but are not limited to: (1) connecting to an external server in order to obtain the update software; (2) receiving the update from the external server; (3) after receiving the update from the server, determining whether to begin the process of updating the software in the target device(s); (4) transmitting (directly or via a broker, discussed below) the software update to the target devices (or to a node proximate to the target device in the event that the target device does not have an update agent); (5) determining whether the target devices have been properly updated; and (6) determining which target device(s) to roll back the software to a previous version in the event that the target device(s) were not properly updated. The eSync Client Module, separate from operations related to software updates, may likewise communicate messages to various devices, such as in the respective domain.

For example, the multi-eSync Client Module architecture may be configured in a critical domain (with the eSync Client Module(s) within the critical domain managing devices deemed as critical (e.g., ASIL D devices)) and in a user domain (with the eSync Client Module(s) within the user domain managing devices deemed as non-critical (e.g., ASIL A-C devices)). In one implementation, the managed devices within a respective domain may be in a same network (with the respective eSync Client Module being in that same network or a different network). Alternatively, or in addition, the managed devices within a respective domain may be in different networks (with the respective eSync Client Module being in one of the different networks or in an entirely different network). Thus, the various functions, including the downloading of the software update, the decryption of the software update, the decompressing of the compressed delta, the adding of the decompressed delta to the existing version of software to obtain the new version of software, and the flashing of the new version of the software, may be performed independently for the different eSync Client Modules in the different domains.

In an alternate implementation, the multi-eSync Client Module architecture may be arranged as dependent domains, as discussed in more detail below. For example, a single target device (such as an ECU) may have certain functions in the critical domain and other functions in the user domain. In this way, there are interdependent elements within each of the critical and user domains.

In the interdependent multi-client architecture, one, some, or all of the following may be performed interdependently of other eSync Client Modules including: (1) connecting to an external server in order to obtain the update software; (2) receiving the update from the external server; (3) after receiving the update from the server, determining whether to begin the process of updating the software in the target device(s); (4) transmitting (directly or via a broker, discussed below) the software update to the target devices (or to a node proximate to the target device in the event that the target device does not have an update agent); (5) determining whether the target devices have been properly updated; and (6) determining which target device(s) to roll back the software to a previous version in the event that the target device(s) were not properly updated. For example, the timing as to when the eSync Client Modules connect to the external server in order to obtain the update may be interdependent. In one implementation, a master eSync Client Module may determine when the follower eSync Client Module(s) connect to the external server. In an alternate implementation, the eSync Client Modules negotiate amongst themselves to determine when to connect to the external server.

Likewise, after receiving the software update from the server, the timing of when to begin the process of updating the software in the target devices may be interdependent. In one implementation, a master eSync Client Module may determine when the follower eSync Client Module(s) begin the process of updating the software in the target devices.

Further, the determination as to which target devices to roll back the software to a previous version in the event that the target device(s) were not properly updated may be interdependent. In one implementation, a master eSync Client Module may determine which of the follower eSync Client Module(s) (including whether for all follower eSync Client Modules) to roll back the software to the previous version in the event that the target device(s) were not properly updated. In an alternate implementation, the eSync Client Modules negotiate amongst themselves to determine which target devices to roll back the software to the previous version. Alternatively, or in addition, separate from which target device(s) to rollback, the timing of the rollback may likewise be interdependent. In one implementation, a master eSync Client Module may determine when the follower eSync Client Module(s) (including whether for all follower eSync Client Modules) are commanded to roll back the software to the previous version in the event that the target device(s) were not properly updated.

For example, because of this interdependence, the version of the software that is updated through the critical domain and the version of the software that is updated through the user domain may be synchronized. In the event that the software update in one domain fails to update, then both update agents may revert back to an older working version of the software (e.g., the version of the software prior to the latest software update).

In still an alternate implementation, the multi-eSync Client Module architecture may be arranged as dependent domains for certain functions and independent domains for other functions. As discussed above, various functions include, but are not limited to: downloading the software update; decrypting the software update; decompressing the compressed delta; adding the decompressed delta to the existing version of software to obtain the new version of software; flashing the new version of the software (e.g., storing the new version of the software into non-volatile memory); and determining whether to roll back to a previous version of the software in response to an error in any point in the process (e.g., an error in adding the decompressed delta to the existing version of software or in flashing the new version of the software). As one example, the multi-eSync Client Modules may operate independently for all functions except for the determining whether to roll back to the previous version.

In one implementation, the respective eSync Client Module may communicate directly with the target devices. Alternatively, the respective eSync Client Module may communicate indirectly (via a broker) with the target devices. As discussed above, using a broker relieves the different devices, such as the eSync Client Module, from knowing the address of the target devices, as further discussed below.

Referring to the figures, FIG. 1 illustrates a block diagram 100 of functional devices within a vehicle and a proprietary bus interconnecting the functional devices. As discussed above, one example system comprises an in-vehicle system. Alternatively, other types of systems, such as for a building, are contemplated. In that regard, the discussion with regard to the in-vehicle system may likewise be applied to other types of systems.

As shown, vehicle 110 includes eSync Client Module 112, policy 114, status 116, gateway (GW)+Certificate Management 118, broker 120, and one or more ECUs (such as ECU 1 (130), ECU 2 (132), ECU 3 (134), and ECU N (136). Though 4 ECUs are depicted in FIG. 1, fewer or greater numbers of ECUs are contemplated. eSync Client Module 112 and ECU 1 (130), ECU 2 (132), ECU 3 (134), ECU N (136) are examples of eSync agents, which may communicate with broker 120. The various eSync agents may communicate via one or more types of buses. In one implementation, one, some or all of the buses in vehicle 110 communicate via a proprietary type of bus protocol, such as the eSync bus protocol. As discussed in further detail below, broker 120 may comprise the intermediary through which devices, such as eSync Client Module 112 and the one or more ECUs communicate. As shown, eSync Client Module 112 may communicate with other electronic devices (not shown) via cloud 102. As discussed further below, the other electronic devices may comprise servers, such as command servers or software update servers, in order to control various electronic devices in vehicle 110.

One, some, or all of blocks depicted in FIG. 1 may comprise functional blocks configured to perform a function. As one example, broker 120 may comprise a functional block configured to perform the broker functionality, as discussed in more detail below. In this regard, in one implementation, the broker 120 may reside in an electronic device within vehicle 110 that further houses other functional blocks. As another example, a same electronic device (such as a gateway server resident in the vehicle) may execute the functionality for both the broker 120 and eSync Client Module 112. In one implementation, the same electronic device may execute multiple processing threads, with different processing threads for executing the broker functionality and the eSync Client Module functionality, respectively.

One, some or all of the functional blocks (including eSync Client Module 112, broker 120, and ECUs) depicted in FIG. 1 may include any one, any combination, or all of: (1) a certificate for verification of the functional block (e.g., the certificate may establish the origin of the respective functional block to validate the functional block by another functional block); (2) a private key for the functional block, with the private key being generated by the same entity that generate the certificate in (1); and (3) a trust anchor or authority that verifies authentication for other participants (e.g., functionality to verify certificates of other functional blocks).

As discussed further below, one, some, or all of the devices within vehicle 110 may establish a channel with the broker 120. For example, one or both of the ECUs or eSync Client Module 112 may establish an individual channel to broker 120, which may already be provisioned in the component prior to installation. Prior to establishing a channel, validation of at least one party (or both parties) to the channel are validated. In particular, one, some, or all of the devices in vehicle 110 may be provisioned with a certificate (such as provisioned with a certified upon manufacture). One, some, or all of the devices in vehicle (except for broker 120) may include information to communicate with broker 120 (such as a default address of broker 120), which may be used to register with broker 120. As discussed in further detail below, during registration and in order to establish a channel, the broker 120 and the electronic device, such as ECU 1 (130) or eSync Client Module 112, may perform mutual validation. For example, broker 120 may request (or receive unprompted) from the electronic device the electronic device's certificate, and validate the certificate of the electronic device as indicating that the electronic device is allowed to communicate via the broker. Likewise, the electronic device may request (or receive unprompted) from the broker 120 the broker's certificate, and validate the certificate of broker 120 as indicating that broker 120 is allowed to communicate via the electronic device.

Thereafter, subsequent to registration, the channel may be established. Various security measures may be established for the respective channels, such as by generating a random session key for the electronic device registered with broker 120, with subsequent communications for the channel via broker 120 for the electronic device (either as a sender or a recipient) using the session key. For example, the ECUs may be preprogrammed (via a programmed address for the broker 120 (e.g., a configured port address and IP address of broker 120), discussed below) to communicate with the broker 120 in order to establish the channel. Once the channels are established, any devices with a respective channel may exchange information via the broker 120 using the eSync bus protocol. As one example, the eSync Client Module 112 and one, some or all of ECU 1 (130), ECU 2 (132), ECU 3 (134), and ECU N (136) may exchange information. In this regard, any two components that have established channels via the eSync bus protocol may exchange information.

Figure 3:
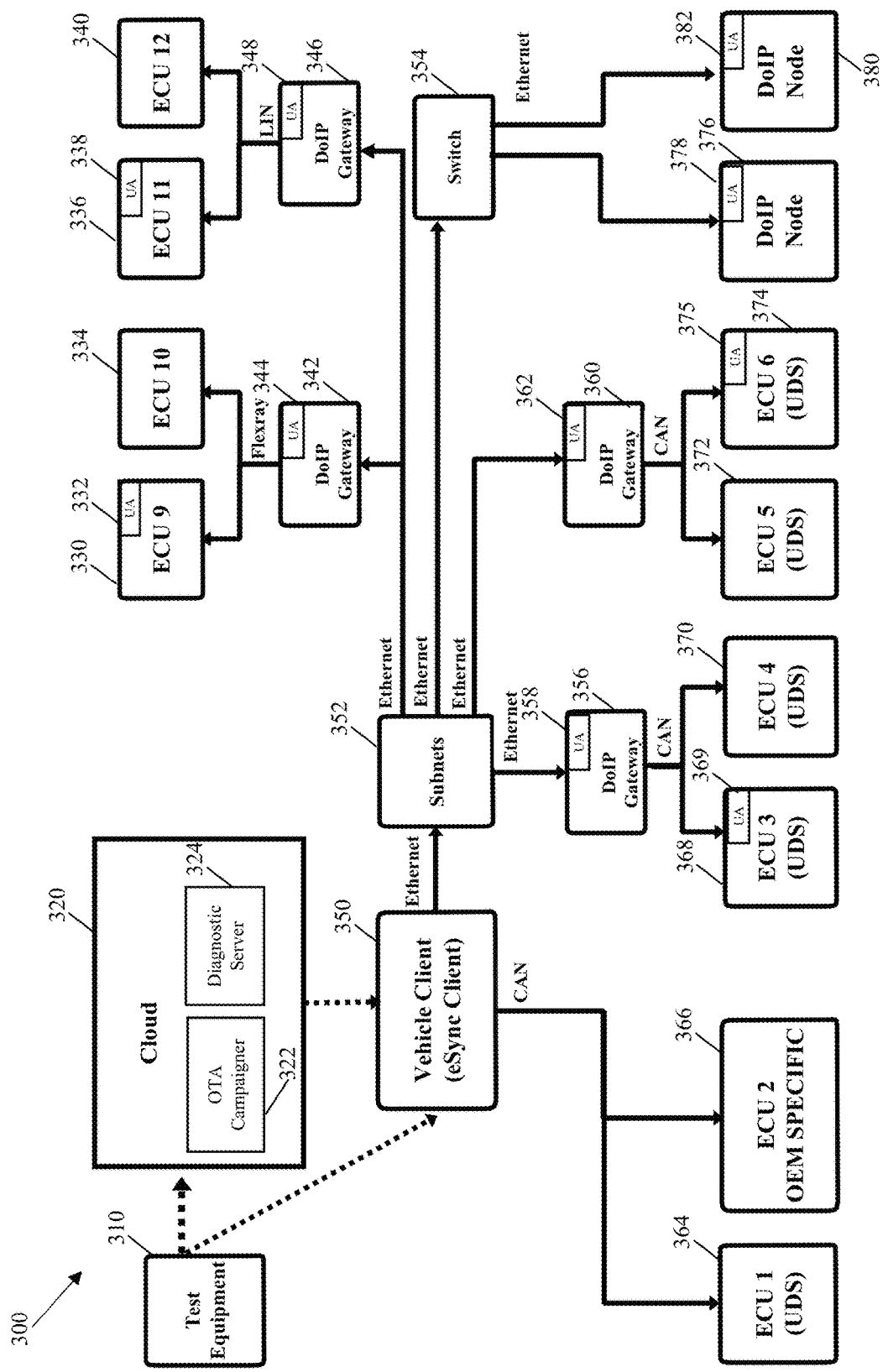
FIG. 3 illustrates a third block diagram of device interconnect in next generation in-vehicle architecture for updating software in a vehicle.

Further, even though FIG. 1 does not illustrate an update agent, an update agent may be present in vehicle 110, such as present in an eSync Client module, an ECU or in a gateway (see FIG. 3). One, some, or all update agents in the vehicle may be associated with a default group membership for exchanging messages (e.g., unique addresses).

One, some or all eSync Agents are provided with a respective certificate during instantiation and the respective eSync agent may be assigned membership subscription as indicated by the respective certificate associated with the respective eSync agent. This membership defines which type of messages on the bus the node associated with the respective eSync agent is privy to. Further, as discussed below, membership to groups may be changed (added or deleted) for a respective eSync agent based on changing the respective certification for the respective eSync agent (e.g., using GW+Certificate Management 118). In practice, broker 120 may know how to route messages to specific groups, but does not have the capacity to decipher messages being routed. In this regard, the messages are transparent to broker 120. In this regard, the configuration looks like the Application level VLAN, which is agnostic to the physical interfaces, and provides isolation, such as to different bus types (e.g., USB, Ethernet, CAN). Broker may simply at as a post office, directing the messages it receives to the specific addresses (e.g., broker 120 may parse a message it receives, identify one or more eSync agents to receive the messages, and then route the message to the identified one or more eSync agents. Further, there is no need for multicast as Groups can be used to listed to specific addresses. Broker may examine a message in order to determine all the devices that are entitled to receive the message, and then route the message to the determined devices.

In a specific implementation, security for the channel may comprise SSL/TLS security. In particular, SSL/TLS uses a combination of public key and symmetric-key encryption. Symmetric-key encryption is much faster than public-key encryption, but public-key encryption provides better authentication techniques. An SSL/TLS session may begin with an exchange of messages called the SSL handshake, with the initial communication between the server and client. The handshake thereby allows the server to authenticate itself to the client using public-key techniques, then allows the client and the server to cooperate in the creation of symmetric keys used for rapid encryption, decryption, and tamper detection during the session that follows. Key-exchange algorithms like RSA and Elliptic Curve Cryptography (ECC) govern the way the server and client determine the symmetric keys to use during an SSL session. The most common SSL cipher suites use RSA key exchange, while TLS supports ECC cipher suites as well as RSA. A Certificate System supports both RSA and ECC public-key cryptographic systems. Thus, a security key may be established using RSA between any two connection points.

In one implementation, in-vehicle network nodes may share Encrypted Payload using AES. The key is symmetric and is shared for a session ahead of time only between verified nodes. The session key may be valid for a predetermined amount of time or during a predetermined event (e.g., lasting for 24 hours after creation or for the time between engine power ups). The TLS session may be established between Server and eSync Client Module. Further, HMAC+AES may be used to sign and encrypt payload inside the vehicle. In this regard, a device may encrypt the payload and sign the payload.

As illustrated in FIG. 1, each connection to the broker is an independent connection. A specific device's membership (such as an ECU's membership) with broker 120 may be established through the use of assigned certificates during configuration or initial flash prior to insertion into network. In this regard, the different channels between the broker and respective devices represent logical independent connections.

Separate from establishing the channels between respective electronic devices and broker 120 (such as a first channel between eSync Client Module 112 and broker 120, a second channel between ECU 1 (130) and broker 120, etc.), validation to send and/or receive the communication may be performed. As one example, the sender of the communication may be validated prior to a device (such as broker 120) allowing the sending of the communication. In particular, a sender, such as eSync Client Module 112 or ECU 1 (130), may seek to send a communication. Prior to sending the communication, another device, such as broker 120, may determine whether to authorize the sending of the communication. In one implementation, broker 120 may perform the authorization. Further, in one implementation, the authorization (such as performed by the broker 120) may take one of several forms including any one, any combination or all of: (i) determining whether the sender is generally authorized to send a communication; (ii) determining whether the sender is authorized to send a type of communication (such as an alert communication, a software update communication (e.g., a software delta), etc.); (iii) determining whether the sender is authorized to send a communication to a specific recipient (e.g., whether eSync Client Module 112 is authorized to send a communication to ECU 1 (130)); and/or (iv) determining whether the sender is authorized to send a communication to a type of recipient (e.g., whether eSync Client Module 112 is authorized to send a communication to any type of ECU). Responsive to the authorization of the sender, the broker 120 may send one or more aspects of information to the sender. For example, in response to the broker determining that the sender is authorized to send a communication to a specific recipient, the broker 120 may send a certificate associated with the specific recipient. Thereafter, the sender may communicate, via the broker 120, in order to validate itself to the specific recipient. Further, in one implementation, the specific recipient may likewise communicate, via the broker, in order to validate itself with the sender. As another example, in response to the broker determining that the sender is authorized to send a communication to a type of recipient, the broker 120 may determine all of the devices that are of that type (e.g., all devices that are ECU) and send the certificate(s) and optionally the listing of all of the devices of that type (e.g., a listing of all the ECUs currently registered in the vehicle).

Alternatively, or in addition, the recipient of the communication may be validated prior to a device (such as broker 120) allowing the receipt of the communication. In particular, a recipient, such as eSync Client Module 112 or ECU 1 (130), may be indicated recipient of a communication that broker 120 is tasked to route. Prior to broker 120 routing the communication sent from sender, broker 120 may determine whether the indicated recipient is authorized to receive the communication. In one implementation, the authorization performed by broker 120 may take one of several forms including any one, any combination or all of: (i) determining whether the recipient is authorized to generally receive a communication; (ii) determining whether the recipient is authorized to receive a type of communication (such as an alert communication, a software update communication (e.g., a software delta), etc.); (iii) determining whether the recipient is authorized to receive a communication from a specific sender (e.g., whether ECU 1 (130) is authorized to receive a communication from eSync Client Module 112; and/or (iv) determining whether the recipient is authorized to receive a communication from a type of sender (e.g., whether ECU 1 (130) is authorized to send a communication from any type of eSync Client module).

In practice, one electronic device subject to the information exchange (such as the eSync Client Module 112) may use a key (such as a random key (e.g., session key) which is not initially known to the other electronic device subject to the information exchange (e.g., ECU 1 (130), ECU 2 (132), ECU 3 (134), and ECU N (136)). So that, any electronic device (or both of the electronic devices) subject to the information exchange (e.g., ECU 1 (130), ECU 2 (132), ECU 3 (134), and ECU N (136)) may send a request to the other electronic device (e.g., eSync Client Module 112) to provide its public key (e.g., eSync Client Module provides its public key). As one example, only one device of the two devices may be validated in order to generate the session key. For example, the requesting device (e.g., an ECU) may verify the origin of the provided key (e.g., verify the origin of the eSync Client Module provided public key). Responsive to the verification, the requesting device (e.g., the ECU) may then send the session key using the Public key of the requesting device. As another example, both devices may be validated in order to generate the session key. In a specific example between an ECU and the eSync Client Module 112, one of the ECU or the eSync Client Module 112 may send the initial communication to the other device to establish the session key. After validation of the key by the other of the ECU or the eSync Client Module 112, the other of the ECU or the eSync Client Module 112 may then send its key to the one of the ECU or the eSync Client Module 112 for validation. After which, the session key may be generated.

In this regard, respective session keys may be established for each independent connection. For example, a first session key may be established from eSync Client Module 112 to ECU 1 (130), a session key may be established from eSync Client Module 112 to ECU 2 (132), a third session key may be established from eSync Client Module 112 to ECU 3 (134), etc.

Thus, the session key, valid only until a predetermined amount of time and/or even. In this regard, the session key is not simply exchanging keys amongst different devices in the vehicle 110. Rather, generating the session key involves a specific process of handshaking/validation amongst the different devices. As one example, if ECU 1 (130) seeks to communicate (e.g., receive and/or send messages) with eSync Client Module 112, ECU 1 (130) may send a message to broker 120, with the message indicating to broker 120 that ECU 1 (130) wishes to communicate with eSync Client Module 112. In one implementation, the message from ECU 1 (130) may include the certificate of ECU 1 (130). In response to receiving the message, broker 120 forwards the certificate for ECU 1 (130) to eSync Client Module 112. In response to the forwarded message, eSync Client Module 112 reviews the certificate of ECU 1 (130) and determines if the certificate is valid to receive messages from eSync Client Module 112. As one example, after broker 120 authorizes eSync Client Module 112 and ECU 1 (130) for registration, broker 120 simply acts to route communications between eSync Client Module 112 and ECU 1 (130) (and optionally may route keys to devices in vehicle 110). In particular, eSync Client Module 112 may access the key (e.g., the public key) of ECU 1 (130) (e.g., that ECU 1 (130) forwarded to broker 120) and then generates a random session key and send it back to the ECU 1 (130) (via the broker 120). Thereafter, communications that are encrypted with the public key of ECU 1 (130) can be decoded by ECU 1 (130). In this regard, there's a division of labor whereby broker 120 acts as the router but does not perform the certification analysis based on the ECU 1 (130) public key, whereas eSync Client Module 112 does not perform routing but does perform the certification analysis and does generate the session key based on the public key of ECU 1 (130).

Figure 2:
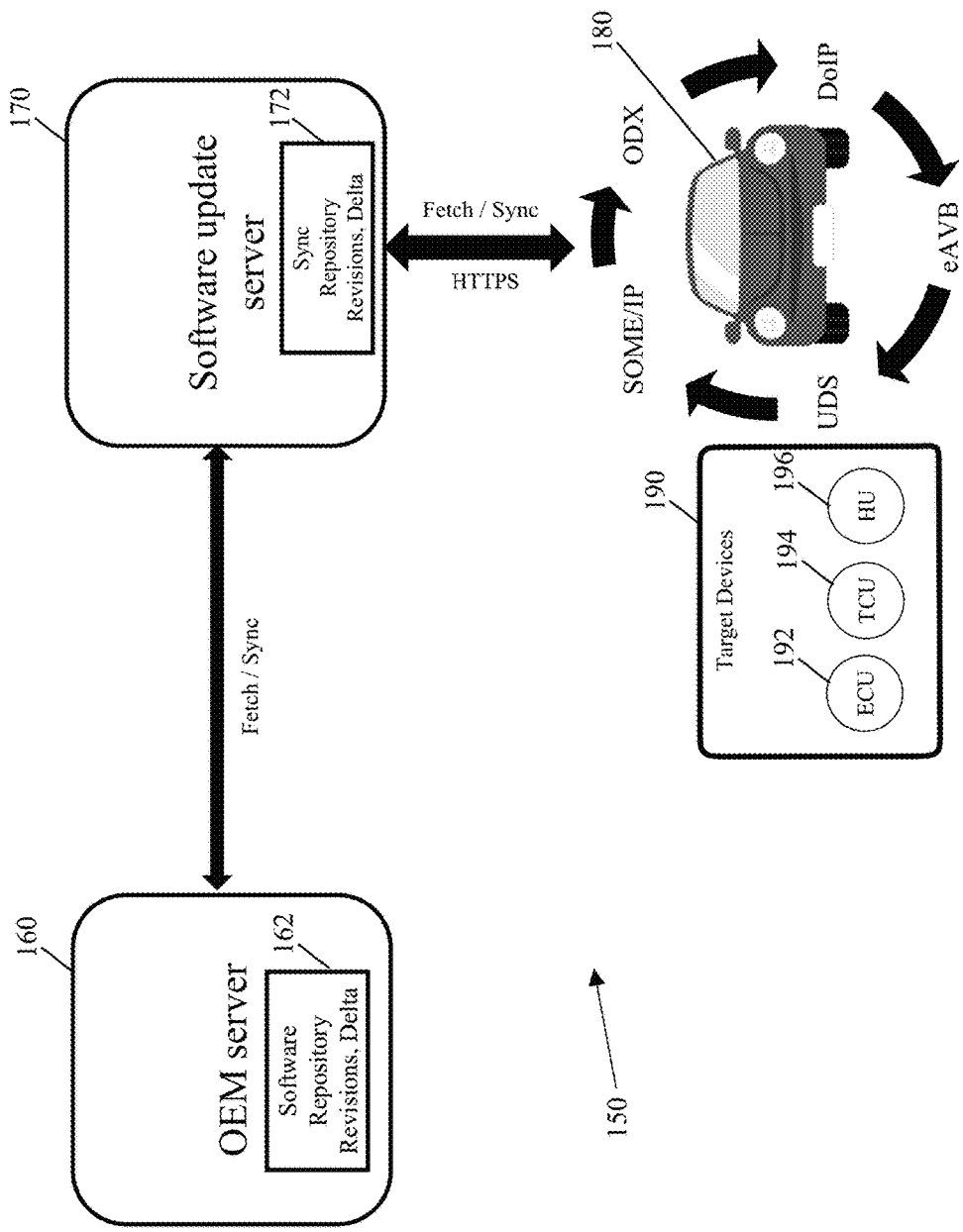
FIG. 2 illustrates a first block diagram of devices for updating software in a connected vehicle.

FIG. 2 illustrates a first block diagram 150 of devices for updating software in a vehicle. Specifically, FIG. 2 illustrates an OEM server 160 with a software repository of revisions (e.g., delta updates) 162. The OEM server 160 is in communication with software update server 170 such as in order for the software update server to fetch updates (e.g., delta updates) or sync with the OEM server 160. After synching, software update server 170 includes a synched repository of revisions (e.g., delta updates) 172.

Software update server 170 communicates with vehicle 180 via wired and/or wireless protocols, such as via HTTPS. Further, as discussed in more detail below, various electronic devices within the vehicle 180 may communicate with one another. One type of electronic device is the target device(s) 190, which is/are the device(s) subject to the software update. Examples of the target device(s) 190 include, but are not limited to, engine control unit (ECU) 192, telematics control unit (TCU) 194, and/or head unit (HU) 196. Other devices subject to software updates are contemplated. Within the vehicle, communications may use one or more protocols, such as eVAB (Ethernet Audio Video Bridging), DoIP (Diagnostics over IP), ODX (Open Diagnostics eXchange), SOME/IP (Scalable service Oriented MiddlewarE over IP), or UDS (Unified Diagnostic Services). Other communication protocols are contemplated.

FIG. 2 illustrates a second block diagram 200 of software components used for updating software in a vehicle. In particular, the software updates may comprise various components 210 (such as updates) in the form of component (COM) P-1 212, COM P-2 214, COM P-N 216. Any number of components are contemplated. The components may be transmitted to a campaign block 220, which may schedule the various components for update on the vehicles 180. Specifically, adaptive delta update 222, discussed further below, may organize one or more packages (package 1 226, package 2 228, etc.), and using policy filters (such as vehicle lists, policies for updates, filters, and dependencies), perform the scheduling of the updates using scheduler 240.

FIG. 3 illustrates a third block diagram 300 of devices for updating software in a vehicle. Test equipment 310 may communicate directly with cloud 320 and/or vehicle client 350. Cloud 320 may include over-the-air (OTA) campaigner 322, configured to manage the over-the-air updates, and diagnostic server 324, configured to monitor the software updates and diagnose and/or correct failures in the software updates.

Vehicle client 350 is configured to interface with various systems in the vehicle. For example, vehicle client 350 may communicate directly with certain vehicle devices via a Controller Area Network (CAN) bus. As illustrated in FIG. 3, vehicle client 350 communicates with ECU 1 (364) and ECU 2 (366) via the CAN bus. Various types of ECUs are contemplated, such as a Uniform Diagnostic Service (UDS) compliant ECU and/or an OEM specific ECU.

Alternatively, or in addition, the vehicle client 350 may communicate with other devices within the vehicle via subnets 352. Specifically, subnets 352 may communicate with one or more gateways, such as DoIP gateways 342, 346, 356, 360, via Ethernet. Each of the DoIP gateways 342, 346, 356, 360 may have update agents (UA) 344, 348, 358, 362.

Update agents may be used to implement the software update in a device. For example, ECU 9 (330) includes update agent 332, and thus need not use update agent 344 in DoIP gateway 342. However, ECU 10 (334) does not include an update agent, and may thus rely on update agent 344 in DoIP gateway 342 to perform a software update for software resident in ECU 10 (334). Similarly, ECU 11 (336) includes update agent 338, but ECU 12 (340) does not, instead relying on update agent 348 in DoIP gateway 346 to perform a software update for software resident in ECU 12 (340). Likewise, ECU 3 (368), which includes update agent 369, and ECU 4 (370), which does not include an update agent, communicates via the CAN bus with DoIP Gateway 356. ECU 5 (372) and ECU 6 (374), which includes update agent 375, communicates via the CAN bus with DoIP Gateway 360. Finally, DoIP node (376), which includes update agent 378, and DoIP node (380), which includes update agent 382, communicates via Ethernet with Switch 354.

The update agent may be configured to support the software upgrade and installation (e.g., automated patch delivery and installation) and may perform any one, any combination, or all of: receive the software update; decrypt the software update; decrypt the software update; and install the software update. In instances where the software update is divided into sections, the software update may manage the process, including receiving an indication as to the section of software to use with the delta to recreate the image of the software in memory and installing the recreated image into the volatile and/or non-volatile memory. As discussed below, certain devices (such as ECU 3 (UDS) 368) have an update agent instantiated within. In this regard, these certain devices may perform the installation of the software upgrade. Alternatively, other devices (such as ECU 4 (UDS) 370) do not have an update agent instantiated within. In this instance, these other devices may rely on an update agent instantiated in a nearby node to perform any one, any combination or all of decryption, decompression, recreation of the image prior to saving of the software upgrade in the target device.

Though broker is not illustrated in FIG. 3, broker may be present in various blocks illustrated, such as in DoIP gateway 342, 346, 356, 360. In this regard, the functionality ascribed to broker may likewise be implemented in a system as illustrated in FIG. 3.

Figure 4:
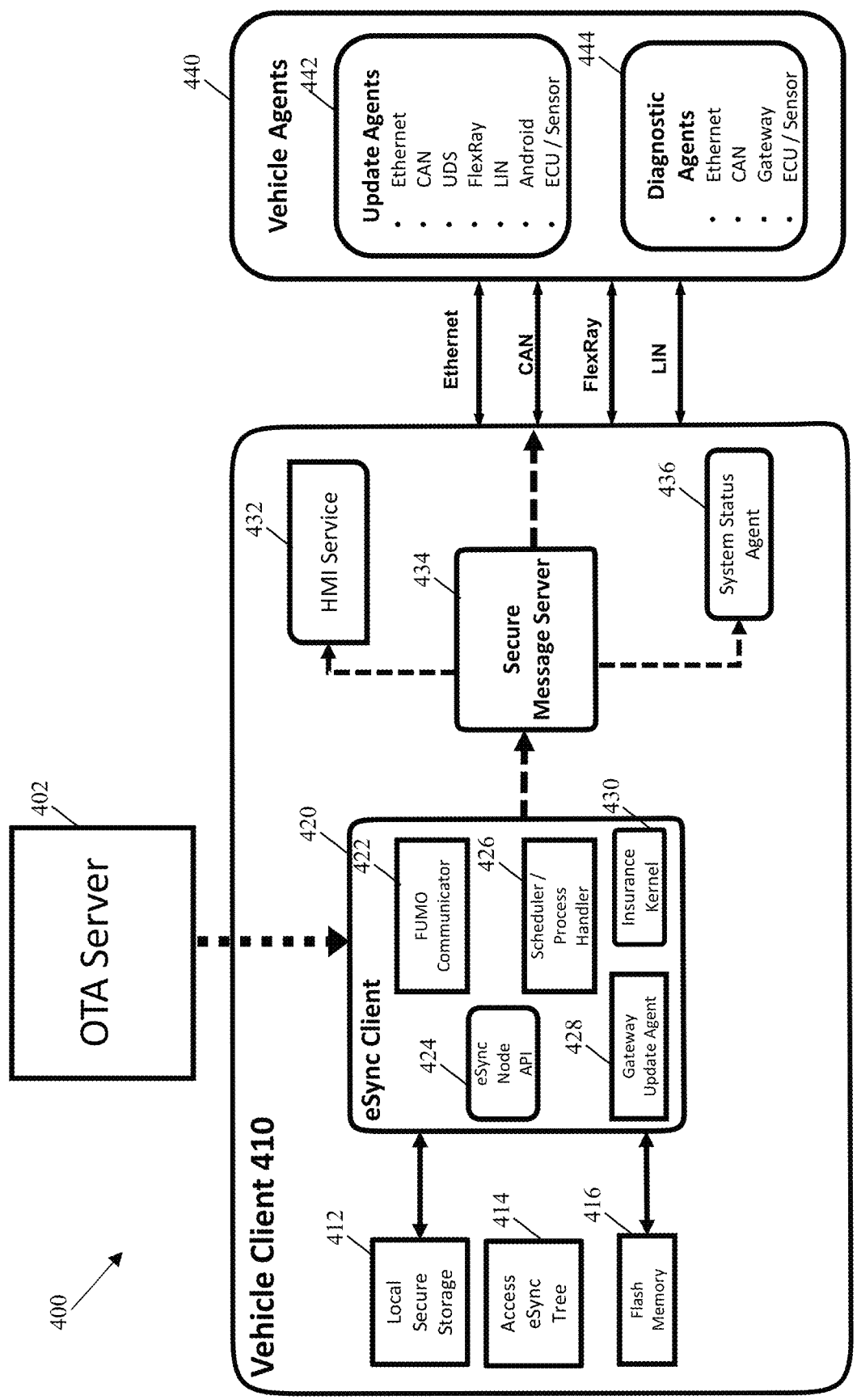
FIG. 4 is a first block diagram of an in-vehicle Server, Client and Agent architecture.

FIG. 4 is a first block diagram 400 of in-vehicle gateway components. In particular, OTA server 402 communicates with vehicle client 410. Vehicle client 410 may comprise eSync Client Module 420, local secure storage 412, access eSync tree 414, flash memory 416, HMI service 432, secure message server 434, and system status agent 436.

eSync Client Module 420 comprises various sub-elements including FUMO communicator 422, DM node API 424, schedule/process handler 426, gateway update agent 428, and insurance kernel 430. Vehicle client 410 communicates with vehicle agents 440, including update agents 442, and diagnostic agents 444. Though broker is not illustrated in FIG. 4, broker may be present in various blocks illustrated, such as in vehicle client 410.

Figure 5:
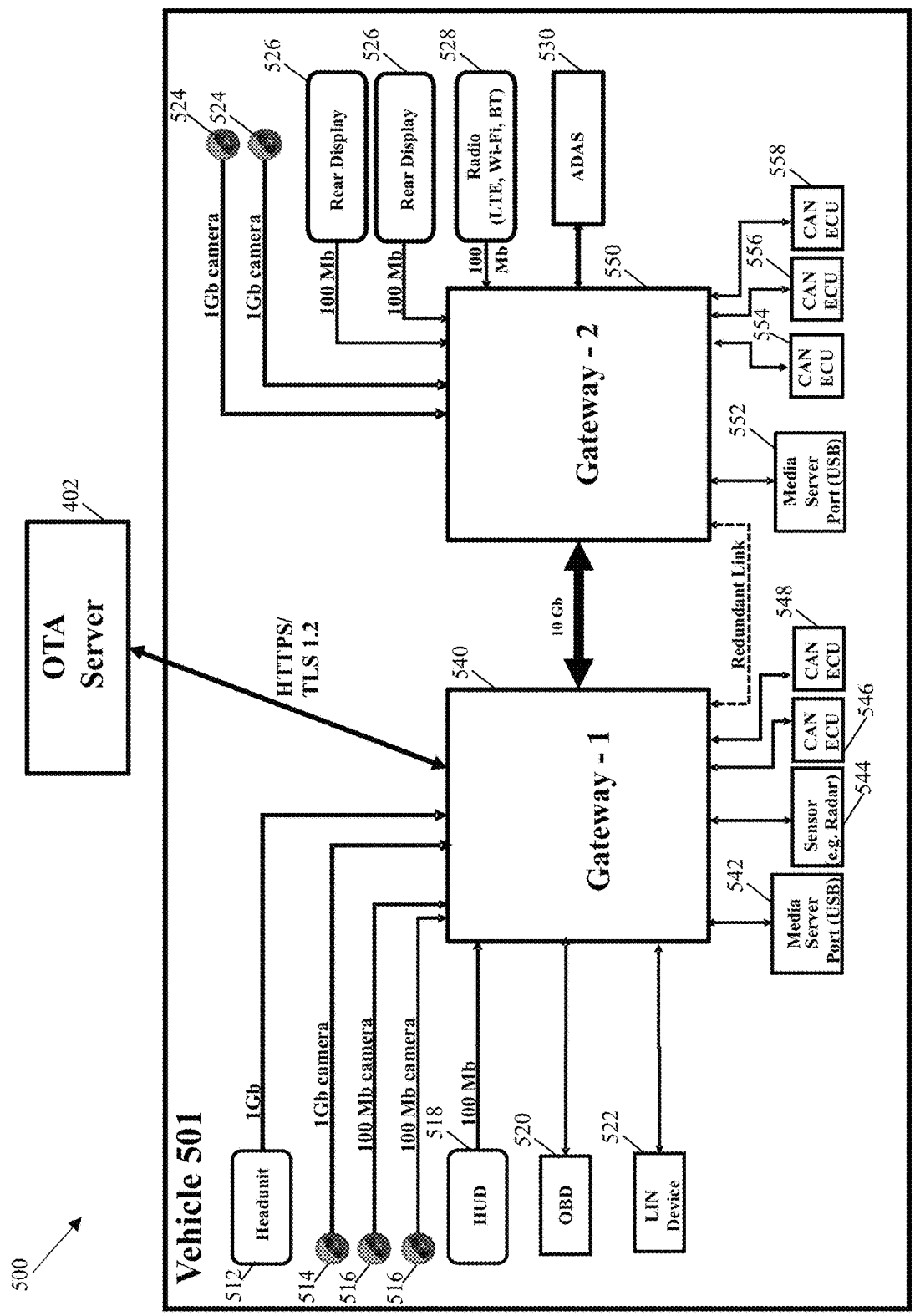
FIG. 5 is a second block diagram of an in-vehicle network architecture using multiple gateways.

FIG. 5 is a second block diagram 500 of a network architecture using multiple gateways. OTA server 402 communicates with various components within vehicle 501, including Gateway—1 (540). In this regard, Gateway—1 (540) acts as a conduit to the OTA server 402, relaying communications to different devices, such as Gateway—2 (550). Various devices with vehicle 501 may communicate with Gateway—1 (540) including: headunit 512, 1 Gb camera 514, 100 Mb cameras 516, heads-up display (HUD) 518, on-board diagnostics (OBD) 520, local interconnect network (LIN) 522, media server port (for USB) 542, one or more sensors (e.g., for Radar) 544, and one or more CAN ECUs 546, 548.

Likewise, various devices with vehicle 501 may communicate with Gateway—2 (550) including: 1 Gb cameras 524, 100 Mb displays configured to receive a rear image (e.g., for a backup camera) 526, radio 528, Advanced Driver Assistance Systems (ADAS) 530 (e.g., adaptive cruise control, blind spot detection, collision avoidance systems, forward collision warning, etc.), media server port (for USB) 552, and one or more CAN ECUs 554, 556, 558. Though broker is not illustrated in FIG. 5, broker may be present in various blocks illustrated, such as in gateway—1 (540) and/or gateway—2 (550).

Figure 6:
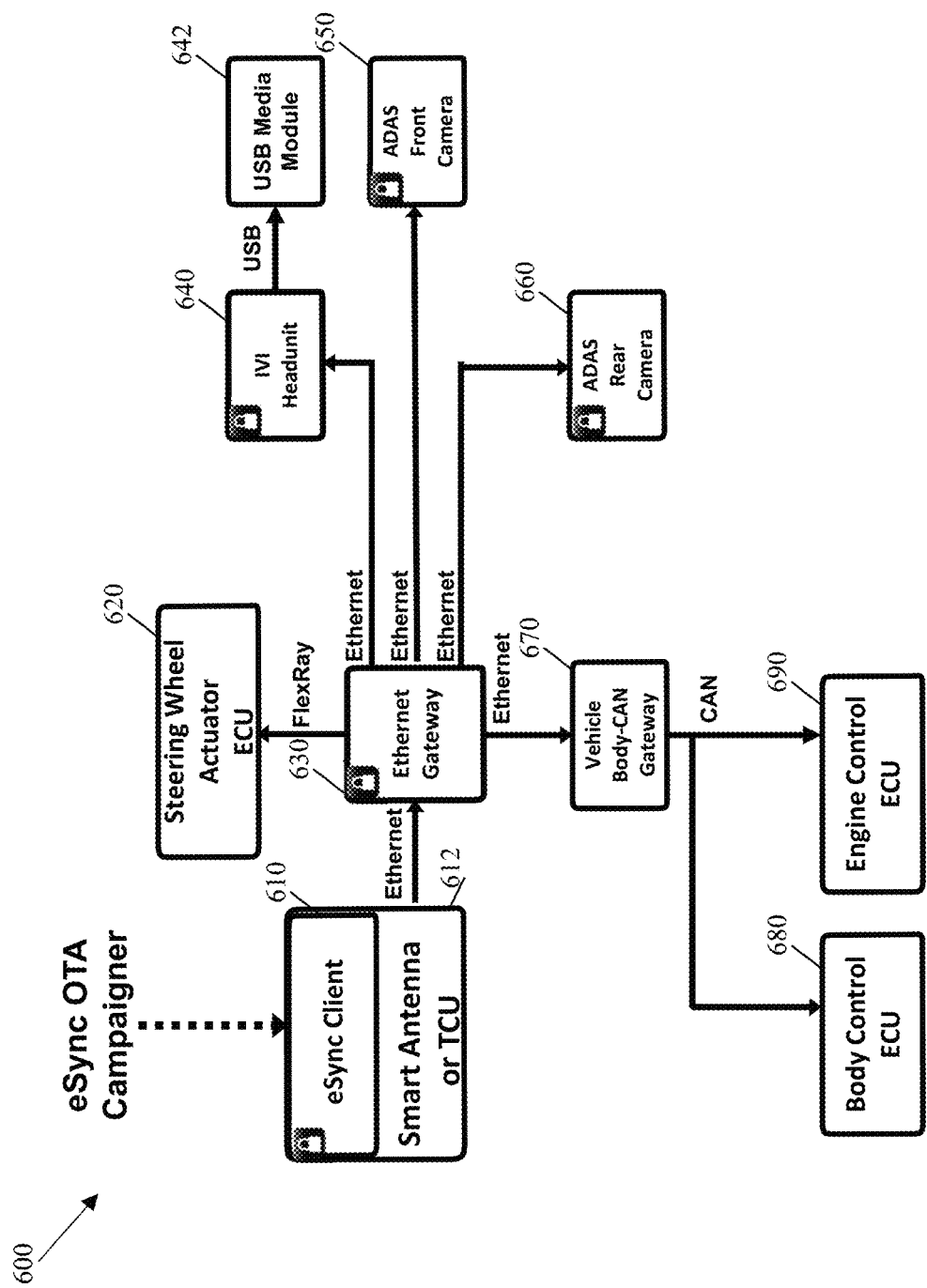
FIG. 6 is a third block diagram of an in-vehicle gateway with interconnected ECUs for next generation vehicles such an electric vehicle.

FIG. 6 is a third block diagram 600 of an in-vehicle gateway for an electric vehicle. eSync Client Module (eSync Client Module) 610 may be placed in any high computing ECU in a connected network, such as being integrated with another electronic device within the vehicle (e.g., incorporated into smart antenna or telematics control unit (TCU) 612). Smart antenna or telematics control unit (TCU) 612 may communicate with an Ethernet gateway 630, which in turn may communicate with other devices, such as steering wheel actuator ECU 620, in-car entertainment (IVI) headunit 640 (which is in turn provides communication via a USB port to a USB media module 642), ADAS front camera 650 (e.g., for adaptive cruise control, collision avoidance systems, forward collision warning, etc.), ADAS rear camera 660, vehicle body CAN gateway 670 (which in turn is in communication with body control ECU 680 and engine control ECU 690). Though broker is not illustrated in FIG. 6, broker may be present in various blocks illustrated.

Figure 7A:
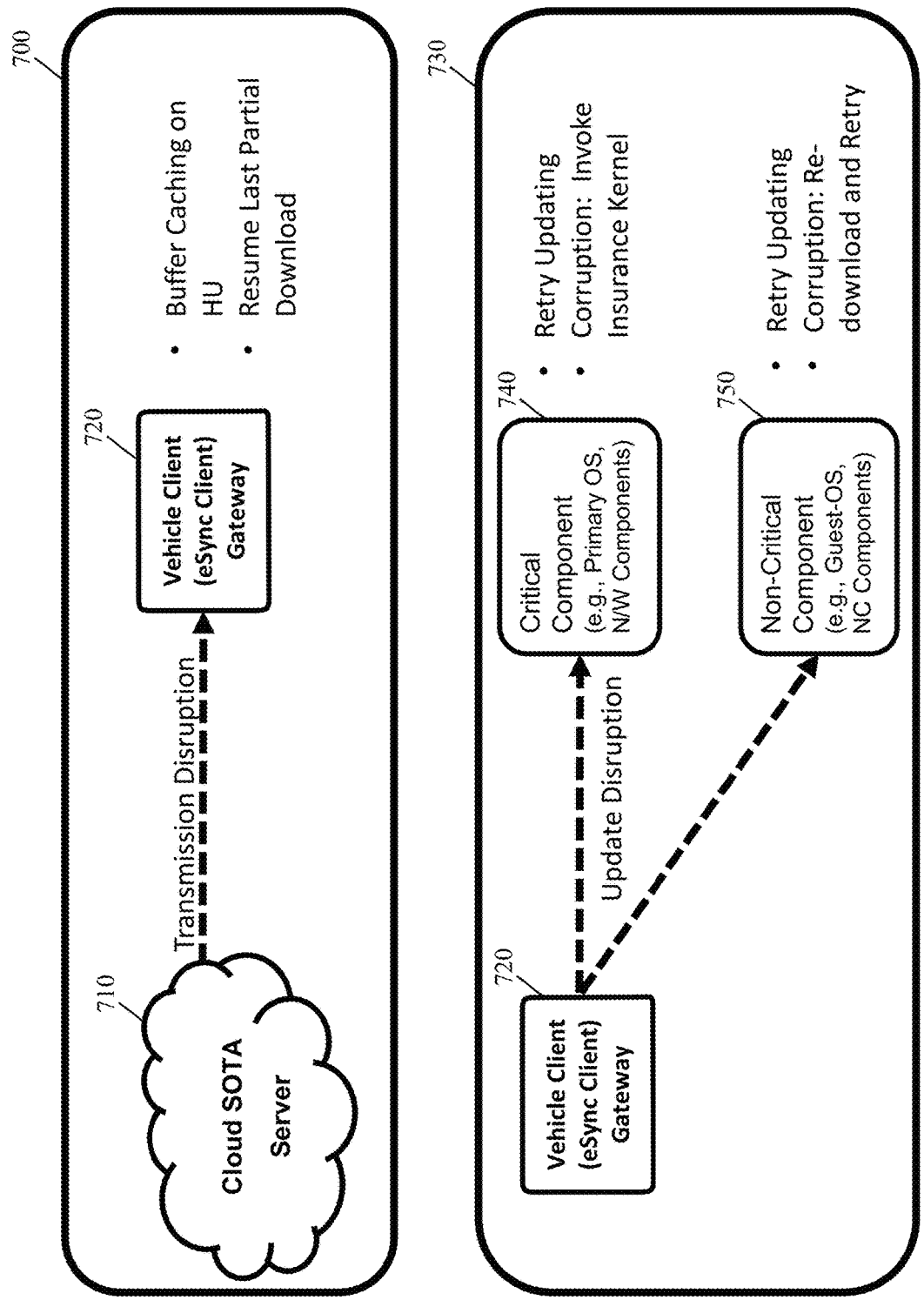
FIG. 7A is a block diagram illustrating disruption recovery procedures from the server to the vehicle and within devices in the vehicle.

FIG. 7A is a block diagram illustrating recovery procedures responsive to disruptions from the server to the vehicle and within devices in the vehicle. Specifically, block diagram 700 illustrates transmission disruptions (e.g., a connection failure) between the Cloud Software Over The Air (SOTA) server 710 communicating with vehicle client gateway 720. The download may be cached in a buffer in a device within the vehicle, such as in a headunit. Further, responsive to a transmission disruption, the last partial download may be resumed.

Figure 7B:
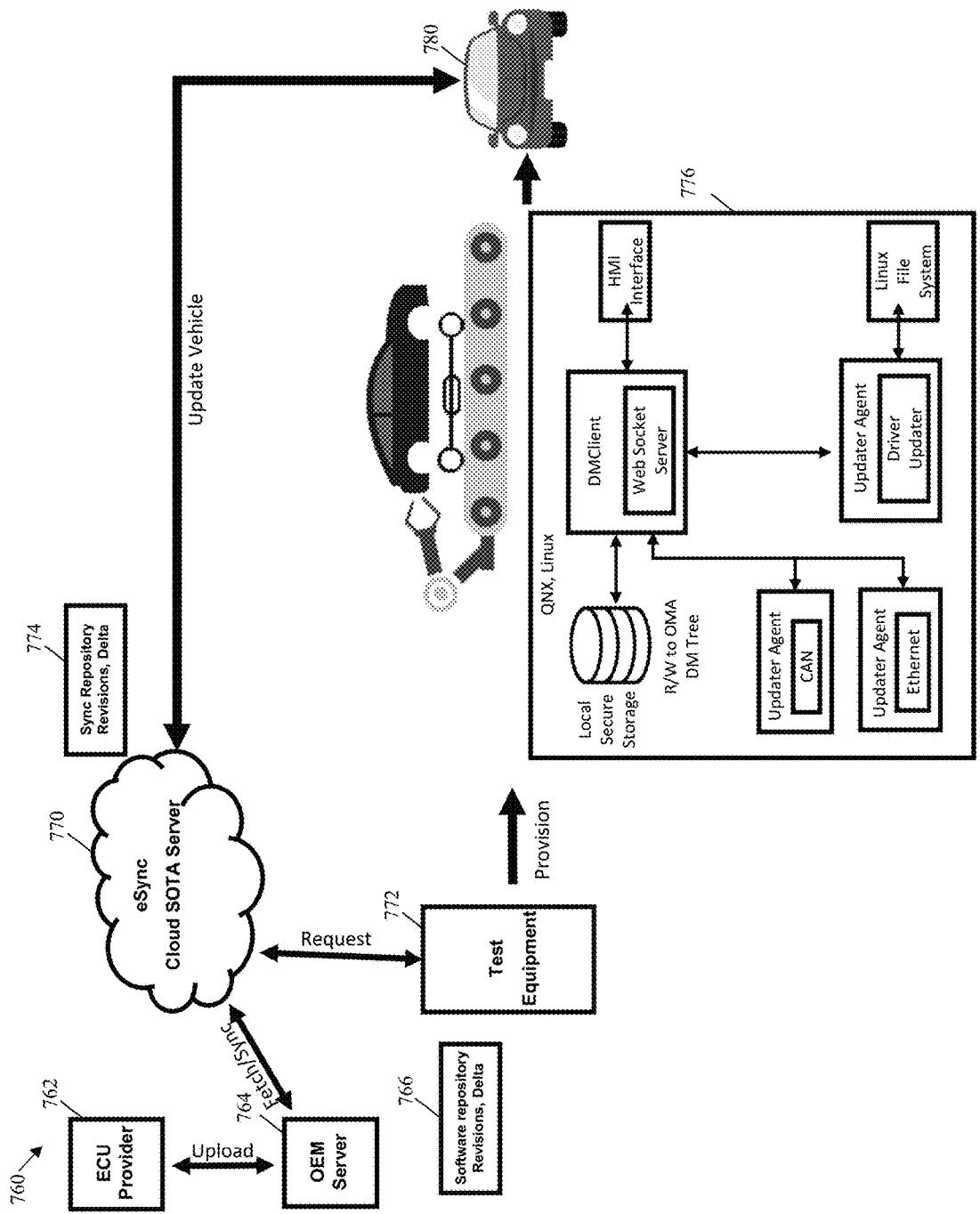
FIG. 7B is a block diagram illustrating Software Over-the-Air (SOTA) for manufacturing in bootstrap mode on assembly line.

FIG. 7A further illustrates transmission disruptions within the vehicle, such as between vehicle client gateway 720 and one or more components within the vehicle, such as critical component 730 and non-critical component. In the event of an update disruption between vehicle client gateway 720 and critical component 730, one or both of vehicle client gateway 720 and critical component 730 may retry performing the software update using the update agent, as discussed herein. In the event of corruption of the update, the critical component 730 may be rolled back to a previous software version using insurance kernel 430. In the event of an update disruption between vehicle client gateway 720 and non-critical component 750, one or both of vehicle client gateway 720 and non-critical component 750 may retry performing the software update using the update agent. In the event of corruption of the update, the software update may be downloaded again; after which, the update agent may attempt to perform the installation of the software update. In this regard, the configuration enables a highly fault tolerant and fail-safe system FIG. 7B is a block diagram 760 illustrating Software Over-the-Air (SOTA) for manufacturing in bootstrap mode. The bootstrap mode may comprise the process of initiating the first programming of the devices in a vehicle while the vehicle moves along an assembly line. The OEM server 764 may communicate with ECU provider(s) 762 in order to obtain the upload software, dependencies, revisions etc. for the specific model of the vehicle (e.g., the update software for upload to the vehicle). Further, the OEM server 764 may save the upload to a memory, such as software repository revisions, delta 766, which may store the various revisions of software that may be resident in the vehicle, including the software subject to upload and previous versions of the software, and the deltas for transmission to the vehicle. The OEM server 764 may communicate with eSync Cloud SOTA Server 770, which may itself communicate with a memory, such as software repository revisions, delta 774, which may likewise store the various revisions of software that may be resident in the vehicle, including the software subject to upload and previous versions of the software, and the deltas for transmission to the vehicle 780. Further, test equipment 772 may be used to mimic the same communication protocols used to program vehicles from the Cloud SOTA server. These protocols may include DOIP, SOME/IP, DOCAN, UDS, etc. The interface from the cloud to the vehicle ECUs may be simulated or implemented using test equipment just as well. In particular, test equipment may comprise the primary method for flashing the ECUs in the assembly line in absence of a cloud server arrangement.

Figure 8:
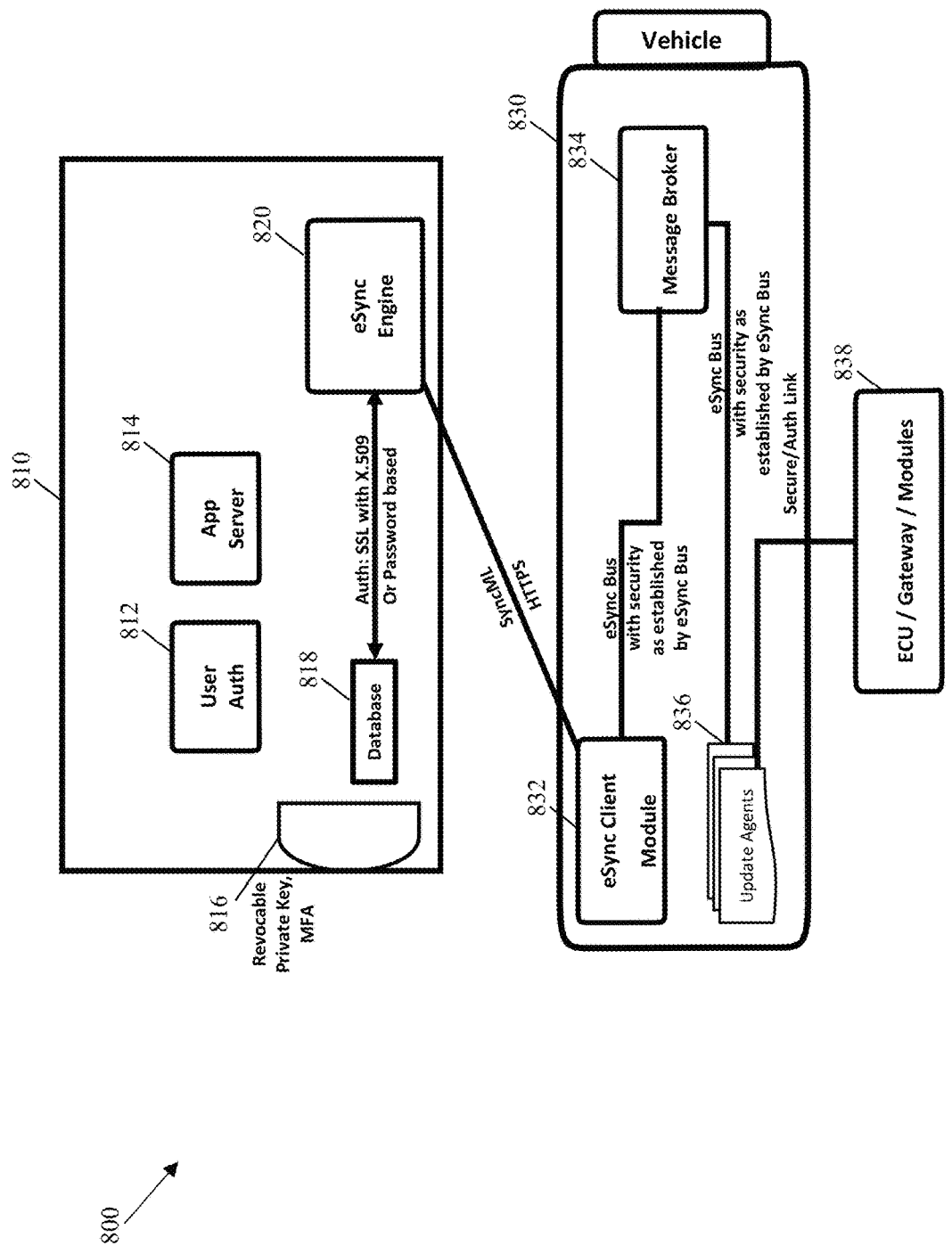
FIG. 8 is a block diagram of security architecture from the server in the cloud to in-vehicle client.

FIG. 8 is a block diagram 800 of security from the cloud to within the vehicle. Server 810 may include user authorization 812, app server 814, revocable private key, multi-factor authentication (MFA), database 818, and eSync engine 820. Vehicle 830 includes eSync Client Module 832, message broker 834 (an example of broker 120), and one or more update agents 836. In practice, eSync Client Module 832 communicates with eSync engine 820, such as via Hyper Text Transfer Protocol Secure (HTTPS) or SyncML (Synchronization Markup Language). Further, eSync Client Module 832 communicates with message broker 834 via one or more buses, such as via the bus protocol disclosed herein or via another type of bus protocol (e.g., security may be as established by the eSync bus protocol, such as Transport Layer Security (TLS) 1.2, which may be established between message broker 834 and eSync Client Module 832, and message broker 834 with any other device). In turn, message broker 834 communicates with one or more update agents 836, such as illustrated in FIG. 3, which in turn may communicate with other devices, such as an ECU, a gateway or other modules 838.

Thus, in one implementation, the peer encryption (e.g., the encryption by the sender for the final recipient destination) may be as follows:

When the sender is composing the message, the sender may have a list of bus addresses to deliver the message to. Rather than query the recipient directly, the sender may query the broker to obtain one or more identification information associated with the recipient. In one implementation, the identification information comprises the list of certificates matching the destination addresses of the recipients (which may be received as list of certificate fingerprints). For each fingerprint, the sender may have a certificate that matches the fingerprint. If one or more certificates are not found, the sender may issue a certificate request to the broker, and wait until all certificates are received. All received certificates may be fully authenticated, and authorized for delivery to at least one of the specified address. In one implementation, the address delivery validation is performed even for a cached certificate (e.g., in some implementations, the broker may not be trusted to return certificate hashes for authorized destinations).

Various types of addressing schemes are contemplated in order to identify an electronic device (e.g., for identifying a sender of or a recipient to a communication). In one implementation, a unique identifier may be associated with the electronic device. Alternatively, or in addition, the electronic device may be associated with a group of devices. As one example, a tree address structure may be used to identify one or a group of devices, such as illustrated in FIG. 9.

Specifically, FIG. 9 illustrates a classic binary tree address structure with various nodes indicative of different elements within a vehicle. For example, a vehicle may have one or more types of ECUs, including an Engine Control Module (ECM), a Powertrain Control Module (PCM), a Transmission Control Module (TCM), a Brake Control Module (BCM or EBCM), a Central Control Module (CCM), Central Timing Module (CTM), a General Electronic Module (GEM), a Body Control Module (BCM), a Suspension Control Module (SCM), or the like. Taken together, these systems may be referred to as the vehicle's computer, though typically, the computing functionality may be divided either logically or physically in different elements. Further, one assembly may incorporate several of the individual control modules (e.g., the PCM may be both for control of the engine and the transmission).

The hierarchical tree address structure may be used for addressing of various types of messages (e.g., software update messages/commands, status message, error message, query command, rollback command/message, user interface (UI) message, etc.). For example, a command may include the receiver identifier as "/gw*". In one implementation with the "*" indicative of a wild card meaning all the messages below that address level are received by the subscriber, the receiver identifier as "/gw*" may include all nodes in the hierarchical tree address structure under "/gw", such as "/gw/ECU1", "/gw/ECU2", "/gw/ECU1/BDC", "/gw/ECU2/TCM". Thus, an endpoint may claim any number of hierarchical addresses, such as, for example, /root1/point1, /root2, /root3/point1/sub4. With this example, such an endpoint will receive all messages with destination to either of /root1/point1/*, /root2/* and /root3/point1/sub4/*, with the use of the wild card (*). This may allow representation of addresses in a tree-like manner, and have destinations in a message (such as a control message) that are intended for multiple lower-level devices that may not be able to participate in the eSync bus protocol.

In an alternate implementation, the receiver identifier may send a tree structure message, with an indication therein of the node identified and 1 level of the tree structure below the indicated node (e.g., "/gw!" may indicate "/gw", "/gw/ECU1", "/gw/ECU2"). Alternatively, a separate arrangement may indicate the recipient as only a single node in the tree address structure (e.g., /gw/ECU1/BDC to only address the BDC module).

In still another implementation, an electronic device may set a secondary address for a primary address so that all messages that go to the secondary address also go to the primary address. For example, /gw/ECU1/BDC with secondary /gw indicates that all messages that go to /gw should also go to /gw/ECU1/BDC (with the secondary address being /gw). As another example, a single endpoint may declare to receive messages for both "/tbox" and "/gw"; in response, the single endpoint will receive messages for both the addresses that start with "/tbox" and "/gw". In this regard, the electronic device may either filter the messages (e.g., only receive messages directly addressed to the respective electronic device) or additional subscriptions may be added, thereby increasing the number of messages that go to a node based on indicating a secondary address.

Thus, in one implementation, a respective address, such as for the broker or the eSync Client module, may be a constant value, such as an integer exact match, which is defined once and cannot be changed. Further, a string-based address may be used for groups, so that any number of groups may be used. Finally, a tree-like string value for Update Agents, such as illustrated in FIG. 9, allows for hierarchical delivery. In one implementation, the broker may send an indication of the devices registered. For example, the broker may send to an eSync Client Module the hierarchy, such as that displayed in FIG. 9, which does not include the addresses. Instead, the eSync Client Module may receive the string address (e.g., /gw/ECU2, thereby indicating that ECU2 is part of gw). In this way, the eSync Client Module may learn of the existence of electronic devices registered to the broker.

Separate from the hierarchical tree address structure, routing may be based on a type of message. As discussed above, various types of messages are directed to alerts, updates, rollbacks, UI, etc. The certificate may indicate allowance to receive certain types of message(s). In this regard, the message may indicate its respective type, with the broker (or other routing device) reviewing the respective type and accessing a table or other data construct that correlates respective types of messages with recipient(s) previously validated as having associated certificate(s) granting access to the respective type of message, in order to route the message with the respective type to electronic devices previously validated to receive messages of the respective type.

One or more devices may determine the recipient electronic devices as indicated in a command. In one implementation, broker 120 may analyze the indication of the recipient electronic devices indicated in the command, and determine which recipient electronic device to send the command to. For example, responsive to receive a command to route, with the command indicating "/gw" (indicating the node /gw and all nodes underneath), the broker may perform the determination as to which recipient devices to route the message to.

In one implementation, address subscriptions may be performed during certificate provisioning. In this regard, any change to the addressing may necessitate a new certificate. This type of dynamic provisioning of the certificates may be performed, such as by GW & Certificate Management 118 in the system as shown in FIG. 1. Specifically, GW & Certificate Management 118 may revoke a certificate and change the message subscription for any node. Thus, in one implementation, separate from identifying a group of recipient electronic devices, a device (such as one or both of the sender electronic device or the broker) may validate whether one, some, or all of the electronic devices in the group of recipient electronic devices are allowed to receive the communication. As one example, the sender may wish to send an "Alert" message, and may determine whether the certificates for the respective recipient electronic device(s) indicate that the respective recipient electronic device(s) should receive "Alert" messages. As another example, in-vehicle infotainment (IVI) may wish to send a communication to all the nodes including and beneath/gw. Separate from identifying all of the nodes for receipt of the communication, in one implementation, the IVI may then validate, based on the certificate from the respective recipient electronic device, whether the respective recipient electronic device is allowed to receive the communication from the specific sender (IVI). In this regard, certification (which may associate a functional element to a subscription of messages) may be dynamically programmed or modified on a device, such as an ECU, to modify membership privileges based on some a priori information in the system. Thus, for a functional element to change the subscription (either to reduce or to add subscription of message) may be performed by changing the certification associated with the functional element.

Alternatively, or in addition to the sender node validating the certificates of the recipient(s), one, some or all of the nodes in the hierarchical tree address structure may perform an intelligent voluntary determination whether to receive messages. In particular, a respective recipient electronic device may, based on its certificate, be allowed to receive certain types of messages (e.g., alert messages, etc.) to receive messages from certain types of senders, etc. For example, a UI device may have a respective certificate that indicates being allowed to receive UI messages. The respective recipient electronic device may perform an analysis, such as its memory and/or processing capabilities, to determine whether to request amending of the certificate in order to stop receiving certain type(s) of message (even though under the current certificate, the respective electronic device has subscribed to those certain type(s) of messages). For example, an ECU may determine that its processor usage is getting beyond a certain limit. Responsive to this determination, the ECU may seek to restrict the number of messages it is processing to the limited number that it absolutely needs (e.g., request the GW & Certificate Management 118 to issue a new certificate to indicate fewer messages it is allowed to receive (e.g., the ECU certificate is amended so that the ECU is no longer allowed to receive alert messages).

The sender may choose a key for each destination, based on the fingerprint of the destination certificate. In one implementation, the key (such as an AES content key) is randomly generated using a secure random algorithm, and is rotated every predetermined amount of time (e.g., 24 hours) or every predetermined event (e.g., turning on the vehicle).

Each message may be encrypted with the key (such as the randomly generated AES content key). In one implementation, the JWx library may perform this function when the selected key management is a key wrap. Thus, in one implementation, the content key is wrapped with the destination key, and in the case of multiple destinations, the content key may be wrapped multiple times.

Each destination key may be referenced using a key ID (KID), with the value of KID being:

Let A=SHA-256 fingerprint of the source (sender's) certificate (same value as used in x5t #S256, but in binary form)

Let B=SHA-256 fingerprint of the destination certificate (same value as used in x5t #S256, but in binary form)

Let K=destination key

Let KID=Base64 (ABSHA-256(ABK)) (" " operation is the concatenation of binary strings)

The CJOSE encryption may comprise:

alg—AxxxKW (such as A256KW)

enc—AxxxCBC-HSyyy (such as A256CBC-HS512)

Thus, the message may be encrypted with the key (such as the public key or the private key) of the destination. In one implementation, a certain set of messages are encrypted with the public key of the destination. In this case, the following CJOSE values may be used:

enc—AxxxCBC-HSyyy (such as A256CBC-HS512)

alg—RSA1_5, RSA-OAEP, or RSA-OAEP-256

Key identification may be performed using a web signature, such as a JSON Web Signature (X.509 Certificate SHA-256 Thumbprint: x5t #S256)

Alternatively, or in addition, another set of messages may be encrypted with the private key of the destination. In this case, the following CJOSE values may be used:

alg—RSxxx (such as RS256)

Key identification may be performed using: x5c (e.g., if it reasonable to believe that the destination does not have the certificate of the sender); or x5t #S256 (e.g., if the destination is expected to know the certificate of the sender).

In one implementation, the recipient device performs peer decryption (e.g., the decryption by the recipient from the original destination). As discussed above, messages received from the original destination are encrypted. The receiver may iterate through available KIDs, and find the (first) KID that matches the fingerprint of its public key. If none are found, the message may be discarded, and the stream may be aborted.

The receiver may look up the certificate matching the fingerprint of the sender. If such certificate is not found, the receiver may request the certificate from the broker using the request certificate details message. Once received (e.g., certificate details message), the recipient may authenticate the certificate, and may store the authenticated certificate for future look-ups.

The recipient may further access, based on the KID, the destination key. If the key for the KID is not found, the recipient may request it from the broker using the request key message. The recipient may hold onto the original message until the key is received. Responsive to sending the request key message, the broker sends the key response message, which may contain the key.

In one implementation, the key response message includes certain attributes, including any one, any combination, or all of:
   (i) key response message is encrypted using public key of the recipient;
   (ii) key response message is signed using the private key of the sender;
   (iii) key response message may first have been encrypted, and then signed; and
   (iv) the public key of the sender matches the fingerprint of the request made.

In one implementation, if any of (i)-(iv) is not satisfied, the recipient discards the message, and the stream aborted. Otherwise, the recipient extracts the destination key from the key response message, and uses the extracted destination key to decrypt the incoming message before passing it to the application. In one implementation, the authorization of the message is performed from the corresponding certificate of the sender, as was determined during key look-up process. The message is therefore considered trusted, because encryption may have included hash-based message authentication code (HMAC) authentication along with it.

Once a new key has been received for the same pair of sender/receiver public keys, the new key information may be requested, and may be retained for all such keys. In one implementation, keys may be retired after a predetermined time (e.g., if the key has been created more than 25 hours ago) and/or after a predetermined event (e.g., responsive to the vehicle being turned off).

As discussed above, prior to a client-sender sending messages via the eSync bus protocol, the client-sender establishes a connection with the broker. In one implementation, the establishment of the connection with the client may comprise one, or both, of the broker authorizing the client and/or the client authorizing the broker. With regard to the broker authorizing the client, when a client connects to the broker, the broker may establish that the client is authorized to use eSync bus infrastructure. In one implementation, the broker may perform the authorization of the client by performing any one, any combination or all of:
   the broker signing its first outgoing message with its private key;
   the registration request of the client is signed with the private key of the client, and is encrypted with the public key of the broker;
   the broker determines whether the certificate used in the registration request sent from the client to the broker includes the necessary authorization to communicate via the eSync bus;
   a separate key is also present in the registration request, with the separate key being used as a session key for further messages (as discussed above, in one implementation, the session key may be valid only for a certain period of time (e.g., 25 hours after initial issuance) and/or until a certain event occurs (e.g., re-starting the vehicle).

Thereafter, all further messages from client to the broker may be signed with the following CJOSE parameters: alg—HSxxx (such as HS256); and key alg—"dir".

Conversely, the client may verify the broker. In this regard, when connecting to the broker, the client may receive an algorithm message from the broker. The client may determine whether the algorithm message is signed by the private key of the broker. If not, the connection request may be denied. Further, the client may determine whether the certificate, used by the broker and included in the message, is validated for broker authorization. As discussed above, the client may generate a random AES key for signing the message to the broker, and deliver it in the registration request.

In addition, messages thereafter from the broker are to be signed with the same CJOSE parameters as expected by the broker. Similar to above, the client regenerates the session key every predetermined time period (e.g., every 24 hours) or after a predetermined event, and sends a new registration request, with that registration request signed with the public key of the client, and encrypted with the private key of the broker.

Initialization:

As part of the initialization process, the client device may register with the broker.

Figure 10A:
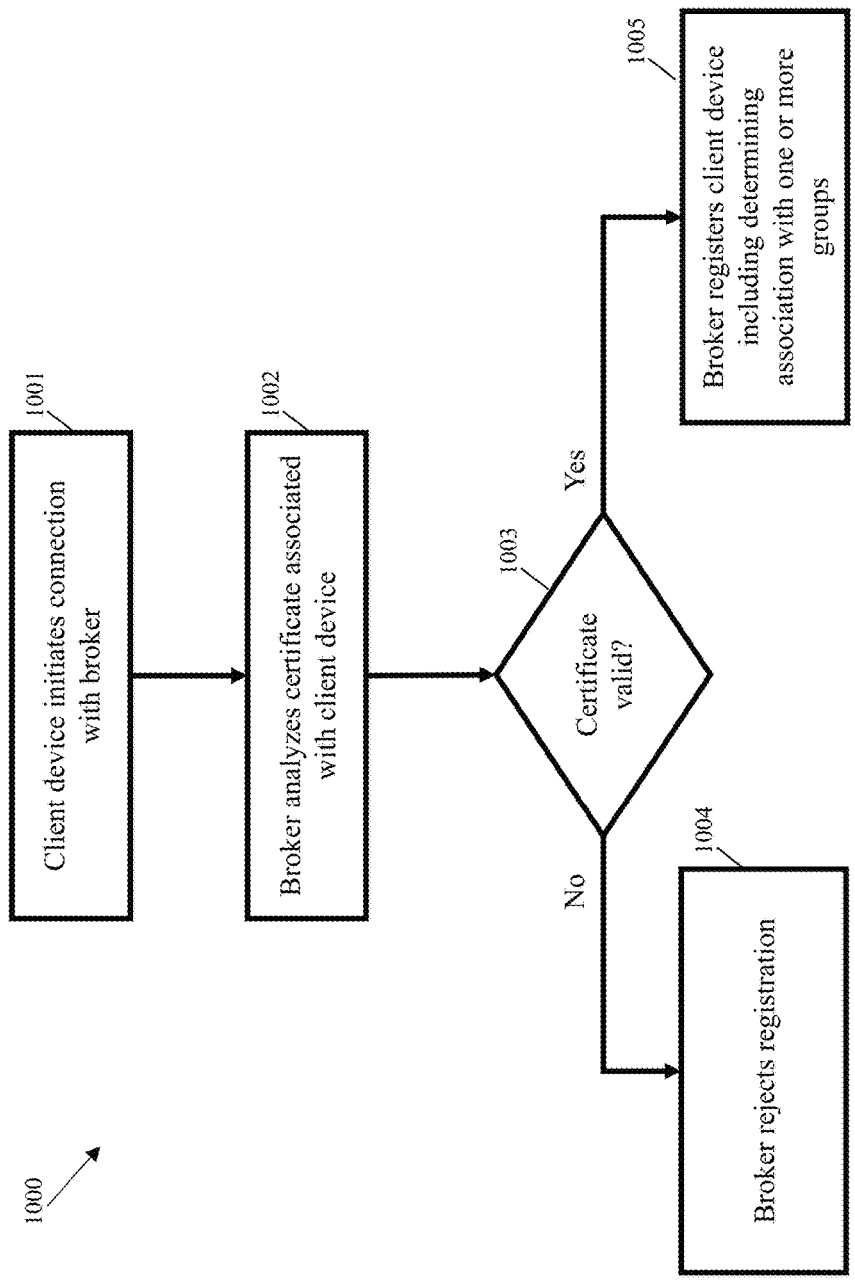
FIG. 10A illustrates a flow diagram for initializing or registering a device with the broker.

In one implementation, only after registration of the client device is completed (e.g., registration confirmation is fully sent), the broker may send other messages to the client device. Further, the client device may not send any normal messages before the registration is finished. For connectionless transports, an external mechanism for guaranteed delivery may be used during the initialization phase (though it may not be necessary for normal operations). Finally, the presence message may contain "connected" information on all currently connected clients. For example, in one implementation, the presence message may include, for each connected device, an identifier and a corresponding address. Alternatively, or in addition, the presence message may include, for each disconnected device, an identifier and a corresponding address. An example of this process is illustrated in the flow diagram of FIG. 10A.

In practice, at least one of the broker or client devices may initiate the connection in order to begin the registration process. In one implementation, at 1001, the client device may initiate the connection (e.g., based on the broker address being pre-programmed upon manufacture of the client device). For example, the broker may be at a generic IP address in the vehicle, with the generic IP address assigned by a given OEM. In this regard, with a fixed topology, the broker may be assigned a fixed address. Alternatively, auto discovery may be used in order to establish the connection with the broker. As one example, the broker may transmit a broadcast message requesting all devices that are not currently registered to respond. In particular, multicast or broadcast messages may indicate where the broker sits. For example, SOME/IP includes discovery provisions, whereas ARXML description carries static address for configuration.

As discussed above, various algorithms may be used including, without limitation, RS256, RS384, and RS512.

Further, one or both of the client devices and the broker may send a registration request. The registration request may include various items, such as various keys (e.g., a session key).

Thus, the initial connection from the client device to the broker may include one or more of the following: (1) an indication of the request by the client device to register with the broker; and (2) a certificate associated with the client device. Alternatively, the client device may send the certificate in a separate communication from the initial connection message. In still an alternate implementation, the client device may send its respective identification indication, with the broker communicating with an external certificate authority in order to obtain the certificate associated with the client device.

At 1002, the broker may analyze the certificate associated with the client device. At 1003, the broker may determine, based on the analysis, whether the certificate is valid. If not, at 1004, the broker rejects registration of the client device. If so, at 1005, the broker registers the client device. Registration of the client device may comprise any one, any combination, or all of: registering the address of the client device; determining association of the client device with one or more groups (e.g., alert message group (indicative that the client device is to receive alert messages), UI message group (indicative that the client device is to receive UI messages), etc.); or determining hierarchical association of the client device (e.g., a determining where the client device is positioned in the hierarchy, such as illustrated in FIG. 9, in order to determine the routing of messages such as discussed above). The broker's registration may result in a table or other data construct that correlates the registered data (e.g., correlates the indication of the client device to the one or more groups).

Alternatively, or in addition, the client device may validate the broker. Similar to the discussion above, the client device may obtain the certificate of the broker (such as received directly from the broker or from a certificate authority). The client device may then determine whether the certificate is valid. If not, the client device may refuse further communication with the broker, and if so, the client device may accept further communications from the broker.

As discussed above, after a client has registered with the broker, the client may send messages under what is termed normal operations. In one implementation, one, some, or all messages under normal operations are encrypted for their final destinations. To be able to encrypt messages with the keys of all of the recipients, the sender of the message may discover the connected recipients before sending each message. As discussed further below, the sender of the message may discover the connected recipients by communicating with the broker. Further, the sender of the message may communicate with the certificate bodies for those certificates that have not been seen previously (or were previously disposed of) in order to validate those certificates.

Figure 10B:
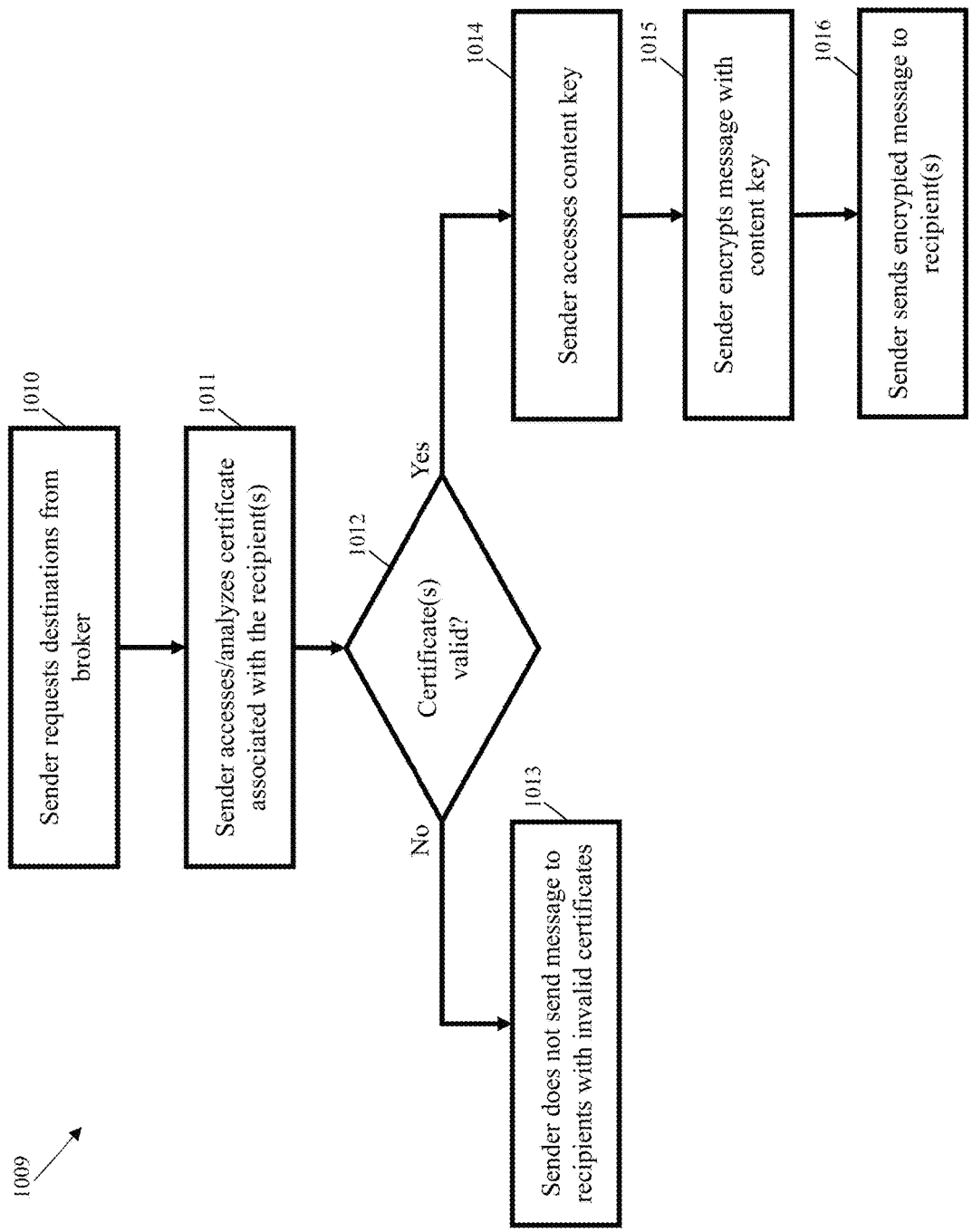
FIG. 10B illustrates a flow diagram for a sender to send a message via the broker.

Various sequences for sending a message are contemplated. One implementation flow diagram 1009 is detailed in FIG. 10B. At 1010, the sender requests destinations from the broker. As discussed above, different address types are contemplated, such as special addresses, update agent addresses, group addresses, etc.

Responsive to sending the destination request, the broker may send the destinations. Further, at 1011, the sender may access/analyze the certificates associated with the recipient(s) of the message. For example, responsive to the sender determining that it does not have a certificate associated with a certain recipient, the sender may request the certificate from another device, such as a certification authority. Responsive to receiving/accessing the certificate details, at 1012, the sender may authenticate at least one aspect of the certificate. As one example, the sender may authenticate the certificates for each of the destination addresses that the respective destination address is authorized for delivery. Responsive to a certificate being invalid, at 1013, the sender does not send the message to recipient(s) whose associated certificate is not considered valid.

In one implementation, the sender may send the message as is, without the message being wrapped. Alternatively, at 1014, the sender may select a content key (e.g., session key) for each destination address based on the fingerprint of the destination certification, and at 1015, the sender may encrypt message with the content key (e.g., with the content key being wrapped with the destination key). After which, at 1016, the sender sends the encrypted message to broker with the list of destination addresses.

Figure 10C:
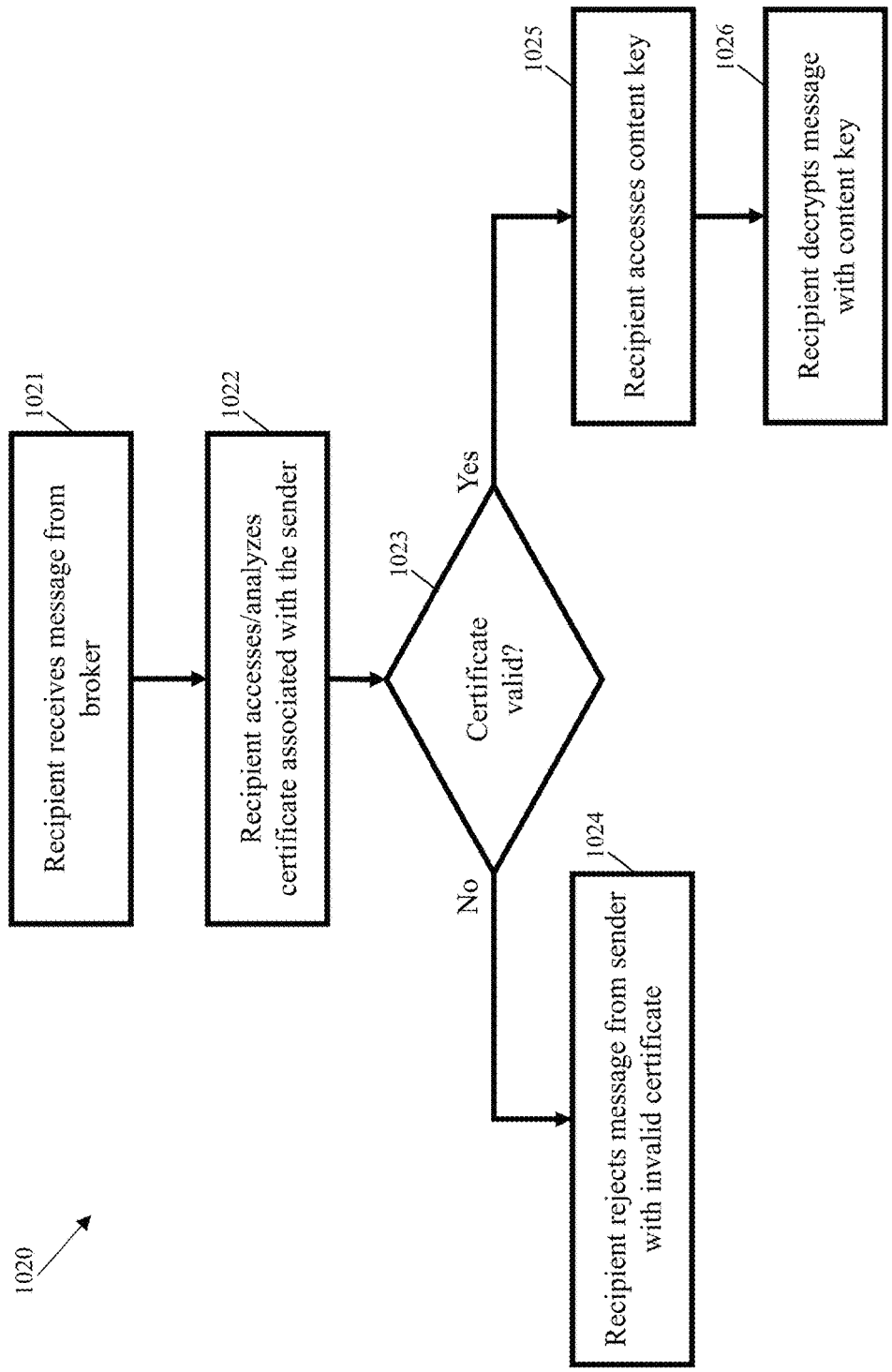
FIG. 10C illustrates a flow diagram for a recipient to receive a message via the broker.

The broker may then receive the message, with the broker delivering the message to the recipient(s), as illustrated in flow diagram 1020 of FIG. 10C. At 1021, the recipient receives the message from the broker. At 1022, the recipient accesses the certificate associated with the sender (which may be obtained from the certificate authority or from the broker). At 1023, the recipient may authenticate at least one aspect of the certificate. As one example, the recipient may authenticate the certificate for the sender is authorized to send the message. Responsive to a certificate being invalid, at 1024, the recipient rejects the message from the sender. If the certificate is deemed valid, at 1025, the recipient accesses the content key, and at 1026, decrypts the message with the content key.

Figure 10D:
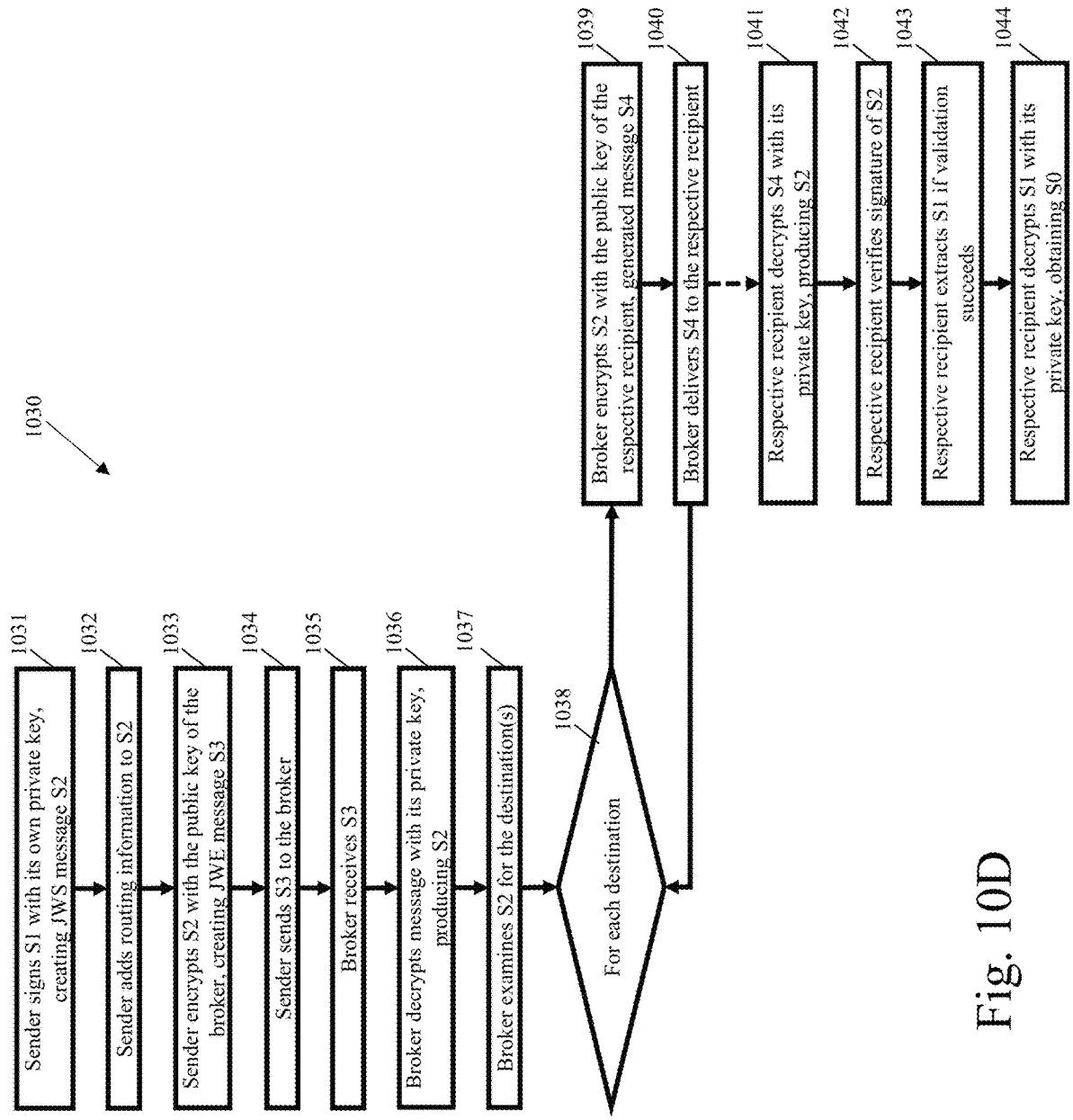
FIG. 10D illustrates a flow diagram of a sender sending a message to recipient(s) via the broker.

FIG. 10D illustrates a flow diagram 1030 another example of a sender sending a message to the recipient via the broker. Flow diagram 1030 assumes that the sender has the public key(s) of the receiver and that the sender is sending private message S0. At 1030, sender encrypts the message with the public key(s) of the receiver, creating JWE message S1. Optionally, private message S0 may be compressed first, with the JWE standard supporting compressing the original body as part of encryption.

At 1031, sender signs S1 with its own private key, creating JWS message S2. At 1032, sender adds routing information to S2. At 1033, sender encrypts S2 with the public key of the broker, creating JWE message S3. At 1034, sender sends S3 to the broker.

At 1035, broker receives S3 and at 1036, decrypts it with its private key, which must produce S2 (or results in a failure). At 1037, broker examines S2 for the destination(s), and the following steps apply per each recipient (1038): at 1039, broker encrypts S2 with the public key of the respective recipient, generated message S4; at 1040, broker delivers S4 to the respective recipient; at 1041, respective recipient decrypts S4 with its private key, which must produce S2 (or results in a failure).

At 1042, the respective recipient verifies signature of S2, and at 1043, extracts S1 if validation succeeds. At 1044, respective recipient decrypts S1 with its private key, obtaining S0.

As discussed above, keys may be sent between the sender and the broker (such as the sender requesting a key from the broker, and the broker requesting a key from the sender), and between the recipient and the broker (such as the recipient requesting a key from the broker, and the broker requesting a key from recipient).

Figure 10E:
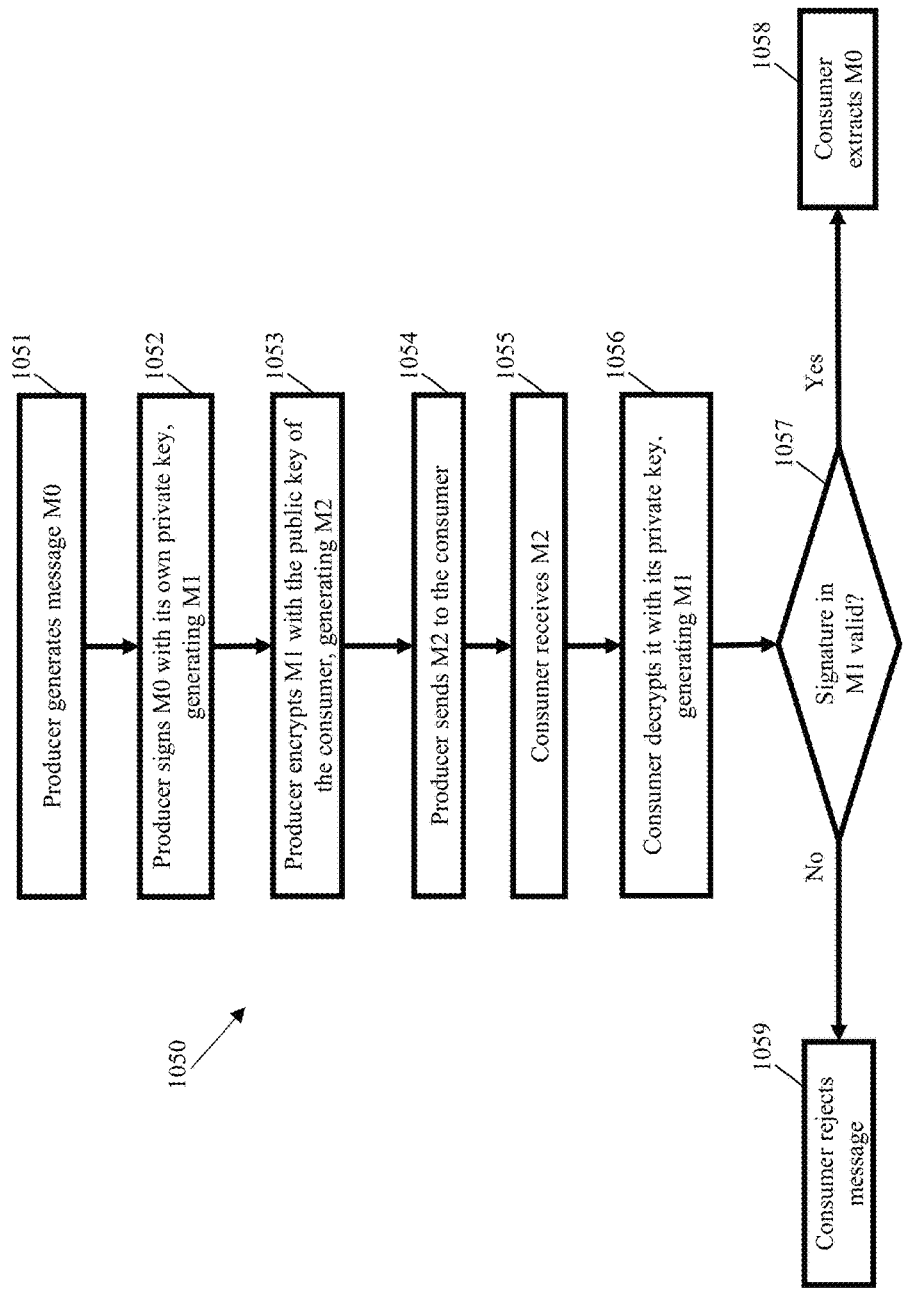
FIG. 10E illustrates a flow diagram of a client device communicating with the broker.

Separate from sending a message from the sender to the recipient via the broker, the client device may communicate with the broker. For example, when broker seeks to send a message to the client device, or the client device seeks to send a message to the broker itself (e.g., not using the broker as an intermediary for sending a message to a receiver), the process is simpler than depicted in FIG. 10D. Further, in one implementation, the process may also be symmetric. For terminology, one may designate either the client device or broker as producer and consumer. In one implementation, each device must know the public keys of the other, which may be learned during the connection initialization process (e.g., the client device previously sent its public key to the broker during initialization and vice-versa). FIG. 10E illustrates a flow diagram 1050 of the client device-broker communication. At 1051, producer generates message M0. At 1052, producer signs M0 with its own private key, generating M1. At 1053, producer encrypts M1 with the public key of the consumer, generating M2. At 1054, producer sends M2 to the consumer. At 1055, consumer receives M2. At 1056, consumer decrypts it with its private key, generating M1. At 1057, consumer determines whether signature in M1 is valid. If so, at 1058, consumer extracts M0, with the consumer now having the original message for use by the consumer. If validation fails, at 1059, consumer may reject the message.

Figure 11A:
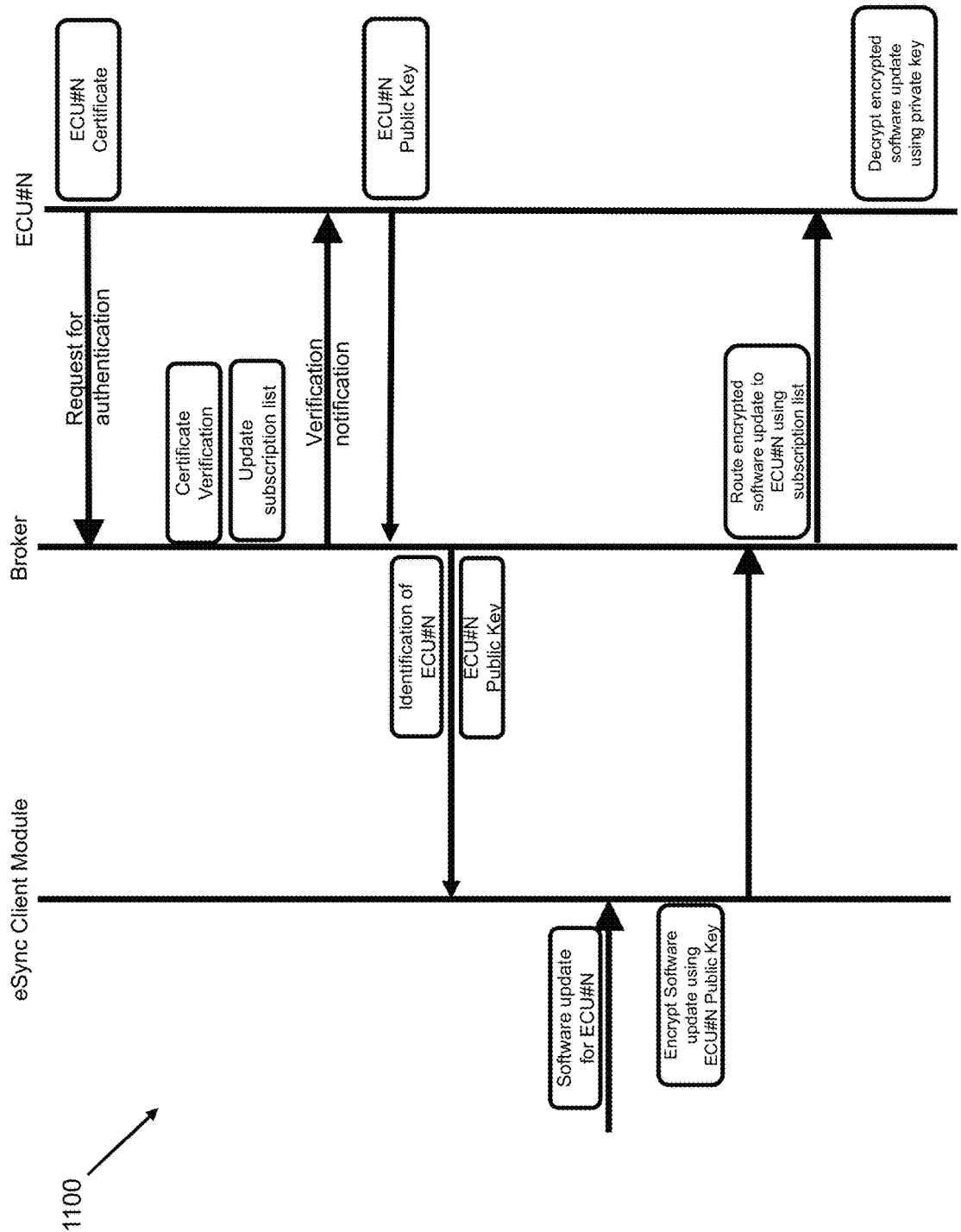
FIG. 11A illustrates a first sequence diagram for broker authentication and transmission of keys.

FIG. 11A illustrates a sequence diagram for broker authentication and transmission of keys, with a subsequent software update routed to an endpoint device. In particular, ECU #N may request authentication from broker, with the request for authentication including ECU #N certificate. In response to receiving the request (and ECU #N certificate), the broker may verify the authenticity of the ECU #N certificate. If the broker verifies the authenticity of the ECU #N certificate, the broker may update its subscription list, which as discussed above may include any one, any combination, or all of: the message(s) that ECU #N is allowed to receive; the groups that ECU #N is associated with; the placement of ECU #N in the tree hierarchy; etc. The broker may further send a communication to ECU #N notifying ECU #N of verification. If so, ECU #N may send its key (such as its public key).

Further, broker may send the identification associated with ECU #N along with the public key of ECU #N. In one implementation, broker may send this message (including the identification associated with ECU #N along with the public key of ECU #N) as part of a presence message to all devices currently registered with broker (e.g., responsive to the broker registering a device (or a set of devices), the broker may push a presence message to the currently registered devices). In another implementation, broker may send this message responsive to a request from a specific device, such as a request from eSync Client Module for presence information (e.g., responsive to eSync Client Module receiving a software update for ECU #N, eSync Client Module may request the presence message from broker).

Thereafter, eSync Client Module may receive a software update for ECU #N. eSync Client Module encrypts the software update for ECU #N using the public key of ECU #N, and transmits the encrypted software update to broker. Broker receives the encrypted software update, and routes the software update to ECU #N using the subscription list generated during registration of ECU #N. Upon receipt, ECU #N decrypts the encrypted software update using its private key.

Figure 10F:
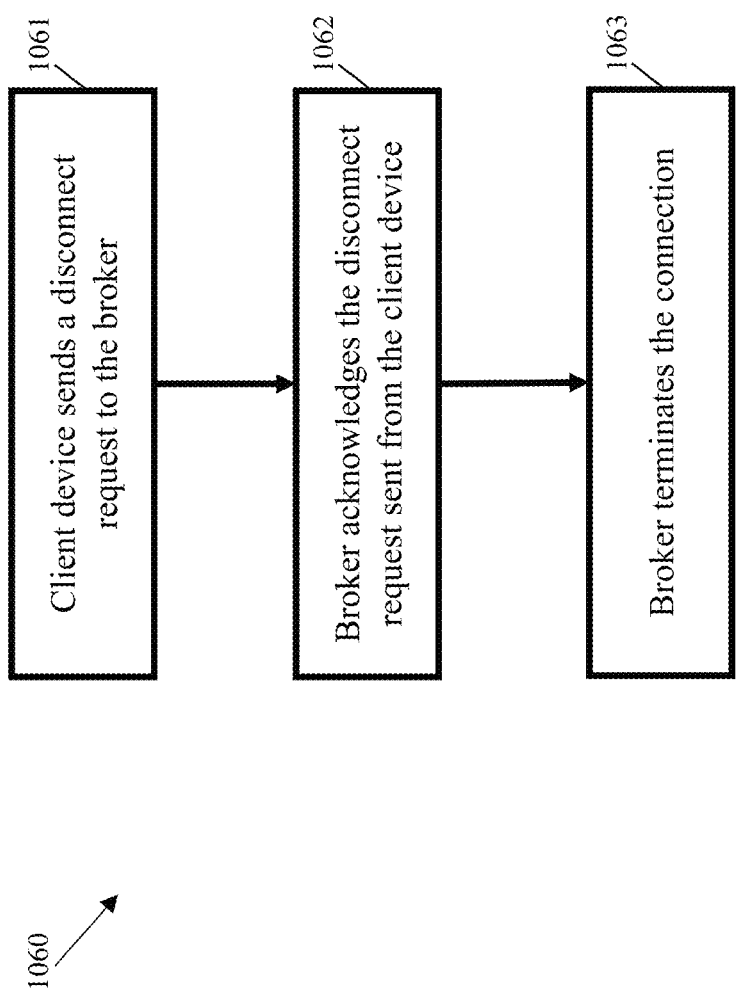
FIG. 10F illustrates a flow diagram of a client device requesting disconnection from the broker.

After a client device is registered with the broker, the client device may request to disconnect from the broker, as illustrated in flow diagram 1060 in FIG. 10F. At 1061, the client device sends a disconnect request to the broker. At 1062, the broker acknowledges the disconnect request sent from the client device. At 1063, the broker terminates the connection. The termination of the connection may comprise any one or all of: removing the client device from lists managed by the broker for delivering messages; and sending a presence message indicating that the client device has terminated the connection.

Further, in one implementation, the client device may perform a connectivity test. In particular, the client device, within certain intervals, may conduct the connectivity test (such as when the underlying connection requires to do so). Alternatively, a client device may select not to perform the connectivity test; the client device may simply incur a higher risk of encountering a dead connection when the client device seeks to send a message. The connectivity test may comprise the following sequence: participant1 sends a ping to participant2; participant2 sends a pong to participant1. The client device may only perform the connection test responsive to the client device determining that there has been no data received from the connection within a certain amount of time.

Separate from connectivity test, a presence message may be sent. For example, when a new client connects to, or disconnects from the broker, the presence information may be distributed to one, some or all other connected clients. The sequence may comprise the broker sending the presence message to all of the other connected clients.

In one implementation, the broker may aggregate multiple presence events into a single presence message, such as combining multiple presence events by new clients into the single presence message, or waiting to send the single presence message until presence events cancel each other out (e.g., one client device is added and one client device is disconnected). In one implementation, the broker may wait no longer than a predetermined amount (e.g., no more than 1 second) when combining multiple presence events.

In one implementation, the broker may treat connection events differently from disconnect events. For example, the broker may aggregate or buffer multiple connections with the same address, and not issue disconnect events; however, the broker may always issue connect events. In this implementation, when a new client is connected, the broker sends a presence message to that new client regardless. However, there may be multiple clients with the same group, special address, or update agent address. If one, then another update agent with the same address connects, between presence messages, the broker may generate a connection event. If only one client device disconnects, the broker does not issue a disconnect event; rather, in one implementation, the broker only issues a disconnect event for an address when there are no more clients for that address. This may create an imbalance in the amount of connect and disconnect events, which is envisioned.

As discussed above, various forms of authentication, such as X.509 authentication, may be used. When authenticating X.509, the following may be performed:

(1) the certificate path is validated against known trust anchors, according to RFC #4158 and RFC #5280.

(2) extended key usage is validated, eSync Bus signature and eSync Bus encryption extended key usage (EKU) may be present respectively (OID base 1.3.6.1.4.1.45473.3). Key usage may also be present, and may have "digitalSignature" for signing and "keyEncipherment" for encryption. The sender may refuse to encrypt the message if the receiver's certificate has no necessary KU. The broker may also filter those certificates out because messages for any receiver will be encrypted.

(3) if sending a message to a group, the sender may verify the recipient has group listed in the corresponding attribute (1.3.6.1.4.1.45473.1.7).

(4) When sending a message to a destination, verify destination value. Value is governed by ASN.1 definition of the value attribute. Special destinations have matching OID, where UpdateAgent destination uses the destination value matching the destination. In one implementation he rule for destination matching in:

(a) have the destination be converted to an array of strings, where elements of the array are strings of the destination broken at the '7' characters. Multiple '/' characters should not create empty array points (termed array A).

(b) have the update agent address from the certificate be converted into array the same way (termed array B).

(c) iterate through both arrays of A and B, compare elements of both arrays at the same index. If a comparison of an element fails, stop and skip the destination.

(d) if the array B is exhausted, stop and skip the destination.

(e) if the array A is exhausted, or both are exhausted simultaneously, then the destination may receive the message.

As discussed above, the message broker may comprise the intermediary in terms of routing messages. In this regard, there may be concerns that having the broker, acting in this messaging role, may be a security threat unless the broker is deemed trusted. Additionally, the broker may include a permissions table, thereby taking the ability to make such decisions away from the end-points.

In order to reduce the security issue, the authentication and authorization may be shifted from the transport protocol to the message payload (e.g., through encryption), as discussed above. As discussed above, the communication that the broker receives from the sender includes different sections, such as an envelope (that the broker has access to) and the payload or message (that the broker does not have access to, such as the payload or message being encrypted with a public key of the recipient or the session key).

Nevertheless, the possibility still exists for an entity to receive a message that is not intended for it (such as a message that is a request). In order to reduce this possibility, the broker may have a collection of certificates from peers. In this regard, when a peer intends to send a message to another peer, the peer validates the certificate, then encrypts the message with a symmetric key, encrypts the key with the public key of the validated recipient(s), and then transmits the message, as discussed above. Thus, in this case, the SSL may no longer be necessary, as the application protocol takes care of the encryption as well as authentication and authorization (though it may still use X.509). This is in contrast to a broker-less system, which requires a discovery mechanism (such as an IP broadcast or multicast) to discover other devices in the system.

Figure 10G:
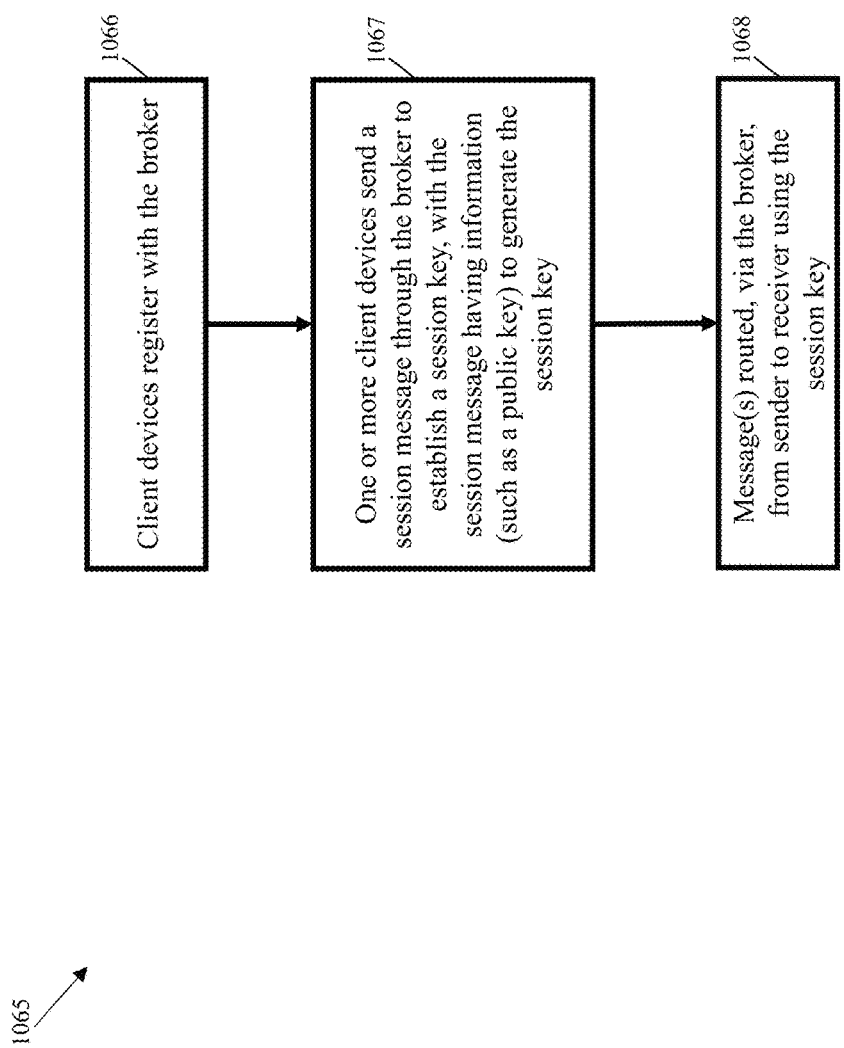
FIG. 10G illustrates a flow diagram of client devices registering with the broker, sending message(s) via the broker to establish a communication session with a session key, and thereafter sending communication(s) encrypted with the session key in the communication session via the broker.

FIG. 10G illustrates a flow diagram 1065 of client devices registering with the broker, sending message(s) via the broker to establish a communication session with a session key, and thereafter sending communication(s) encrypted with the session key in the communication session via the broker. As discussed above, the broker may be a trusted device. As such, at 1066, one or more client devices may register with the broker, which may comprise a validation process as discussed above. After registration, at 1067, one or more client devices may send a session message via the trusted broker channel (e.g., encrypted with the broker key and routed through the broker) to establish a session key that is known to the client devices but not to the broker. For example, a first registered client device may send a first session message (encrypted with a broker key received responsive to registering with the broker) through the broker to establish the session key (e.g., a broker communication channel session key). To do this, the first session message may have information, such as a public key, of the first client device that is sending the session message. The broker, after checking that the first client device and the second client device (e.g., the ultimate recipient as indicated in the session message) are both registered with the broker, routes the first session message to the second client device. In turn, upon receipt of the first session message, the second client device decrypts the first session message with the broker key, accesses the public key of the first client device, and then generates the session key (e.g., a broker communication channel session key) using its private key and the public key of the first client device. The reverse may occur as well, whereby the second client device may send a second session message, encrypted by the broker key, with its public key to the broker, with the broker routing the second session message to the first client device. In turn, the first client device may decrypt the second session message with the broker key, access the public key of the second client device, and then independently generate the session key (e.g., a broker communication channel session key) using the public key of the second client device and the private key of the first client device. Thus, after these two session messages (e.g., the first session message from the first client device to the second client device and the second session message from the second client device to the first client device), the session key (e.g., a broker communication channel session key) is known to and independently generate by both the first client device and the second device. After which, at 1068, one or more messages may be routed, via the broker, from a sender device (e.g., one of the first client device or second client device) to a receiver device (e.g., the other of the first client device or second client device). The message, which may be encrypted with the broker key, may likewise be encrypted with the session key that is known to the first client device and second client device, but is not known to the broker. Thus, the first client device and the second client device may send communication(s) via the trusted broker channel in order to establish the session key, and thereafter use that session key to encrypt further communications sent via the trusted broker channel (and encrypted with the broker key).

Figure 10H:
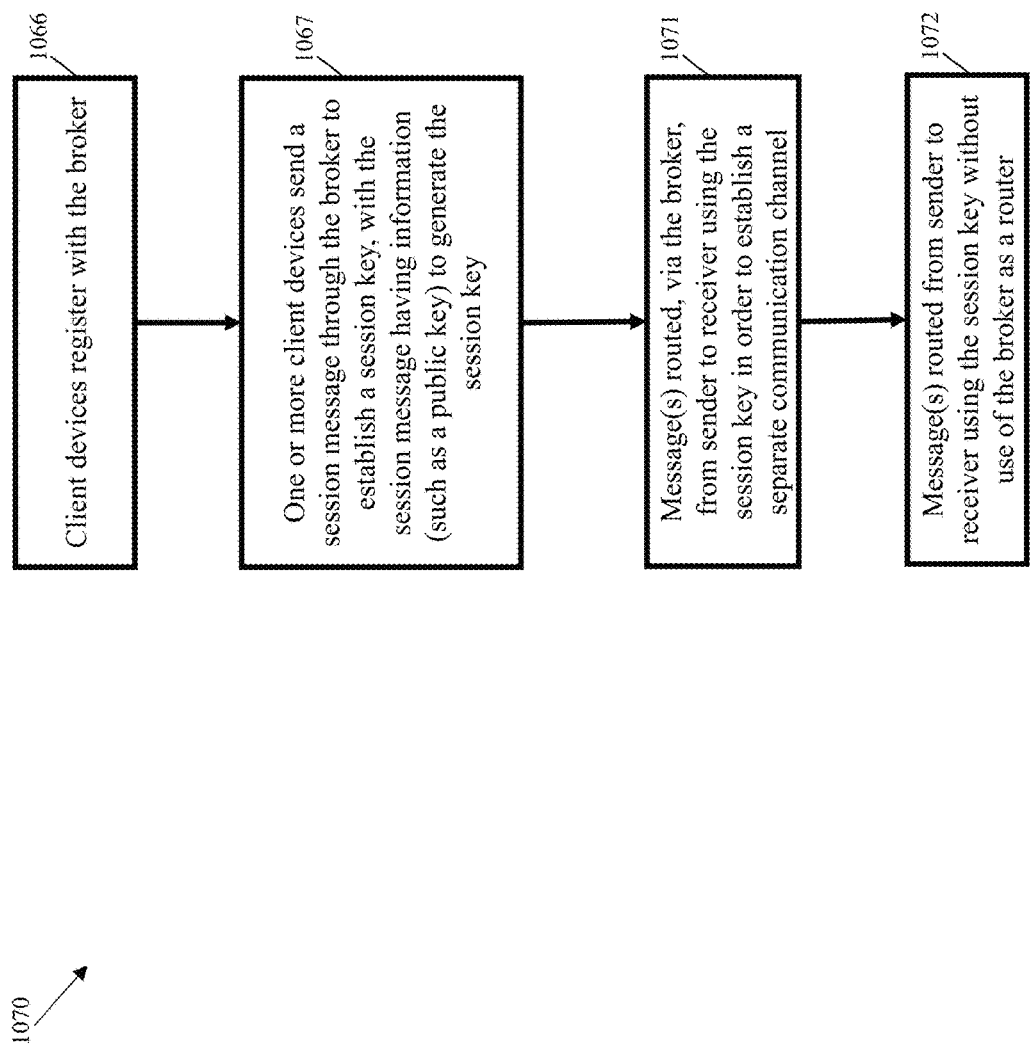
FIG. 10H illustrates a flow diagram of client devices registering with the broker, sending message(s) via the broker to establish a communication session with a session key, sending communication(s) encrypted with the session key in the communication session via the broker, and thereafter communicating in the communication session without use of the broker (such as without routing messages during the communication session via the broker).

FIG. 10H illustrates a flow diagram 1070 of client devices registering with the broker, sending message(s) via the broker to establish a communication session with a session key, sending communication(s) encrypted with the session key in the communication session via the broker, and thereafter communicating in the communication session without use of the broker (such as without routing messages during the communication session via the broker). As shown, FIG. 10H is different from FIG. 10G in that FIG. 10H further includes a modification of 1068 (in the form of 1071) and an addition of 1072. As discussed above, at 1068, after establishing the session key, the first electronic device and second electronic device may send messages that are encrypted with the session key. The messages may, in one instance, include data. Alternatively, or in addition, the messages encrypted with the session key may comprise, at 1071, information to establish a communication channel separate from the trusted broker channel. For example, the separate communication channel may comprise a DDS channel, a UDP channel, a TCP channel, or the like which does not route communications via the broker. In order to establish the separate communication channel, the trusted broker channel is leveraged by sending data needed to establish the separate communication channel (encrypted with the session key so that the broker is unable to decrypt the data needed to establish the separate communication channel). After the data needed to establish the separate communication channel is sent, communications may be sent via the separate communication channel. In the instance of a DDS channel, one or both of a topic or a DDS channel key may be sent as information at 1071. The topic and DDS channel key may thereafter be used to route message via the DDS channel. In particular, at 1072, message(s) may be routed from the sender device to the receiver device using the separate communication channel (e.g., messages that include the topic previously sent at 1071 and encrypted using the DDS channel key).

Figure 10I:
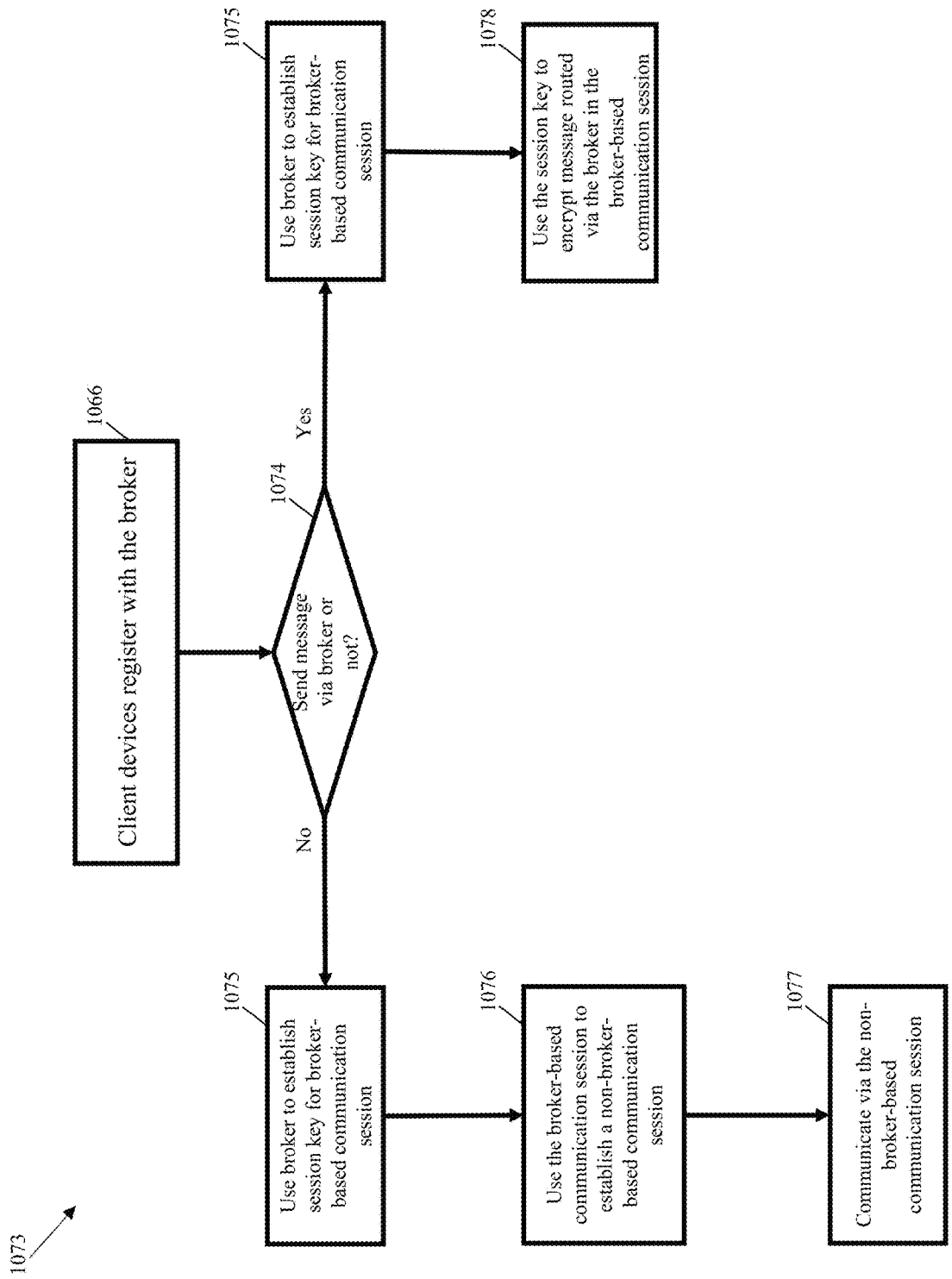
FIG. 10I illustrates a flow diagram of a client device, after registering with the broker, deciding whether to send messages via the broker or not.

As discussed above, sending communications via the trusted broker channel may include encryption using at least one key, and potentially at least two keys. For example, communications sent via the trusted broker channel may be encrypted using the broker key. In addition, in certain instances, the communications sent via the trusted broker channel may also be encrypted using the session key (which is not known to the broker). Having these two levels of encryption and/or having to route communications through the broker may be computationally expensive. As such, in certain instances, a device, such as any one, any combination, or all of the sender client device, the receiver client device, or the broker may determine whether to send communication(s) via the broker (and in turn at least route via the broker and encrypt with the broker key) or not. An example of this is illustrated in FIG. 10I, which is a flow diagram 1073 of a client device, after registering with the broker at 1066, deciding at 1074 whether to send messages via the broker or not. Responsive to determining to send the message via the broker, at 1075, the broker may be used to establish a session key for a subsequent broker-based communication session. In particular, as discussed above, establishing the session key may comprise sending two session messages, each with a public key of one of the first client device or second client device. After the session messages are routed, the first client device and second client device may generate the session key for the broker-based communication session. Thereafter, at 1078, the session key may be used in the broker-based communication session in order encrypt message(s) that are routed via the broker.

Conversely, if at 1074, it is determined not to send messages to the broker, 1075 is still performed in order to establish the session key. At 1076, the broker-based communication session is used to establish a non-broker based communication session. For example, information to establish the non-broker based communication session, such as the topic and the non-broker based communication session key (e.g., the DDS channel key) may be encrypted using the session key (generated in 1075 and not known to the broker) and sent via the trusted broker channel from a first device to a second device. After which, this information (such as the topic and the DDS channel key) may be used at 107 to communicate via the non-broker-based communication channel.

Various bases may be used to determine whether to send messages to via broker or not. By way of example, any one, any combination, or all of the following may be used to determine whether to send messages to via broker or not: (1) a type of message; (2) a destination of the message (e.g., an ultimate destination of the message; (3) an amount of data in the message (or in a set of messages); or (4) the sender of the message. As one example, a type of message may indicate whether to send the message via the broker or not. In particular, the message may be diagnostic in nature so that the message is to be sent without routing via the broker. As another example, the destination of the message, such as the ultimate destination of the message, may indicate whether to send the message via the broker or not. For example, where the destination is an eSync bridge, which is configured to send the message to an external server (external to the vehicle) in the cloud, the message may be sent without routing via the broker. As still another example, responsive to determining that a large amount of data is to be sent, the data may be sent without routing via the broker. In particular, routing via the broker may necessitate additional encryption/decryption (e.g., because of encrypting with the broker key) and necessitate additional routing/processing (e.g., routing to the broker and having the broker decrypt/encrypt the message). In such instances of a large amount of data, the additional computational overhead of routing via the broker may be avoided.

Figure 10J:
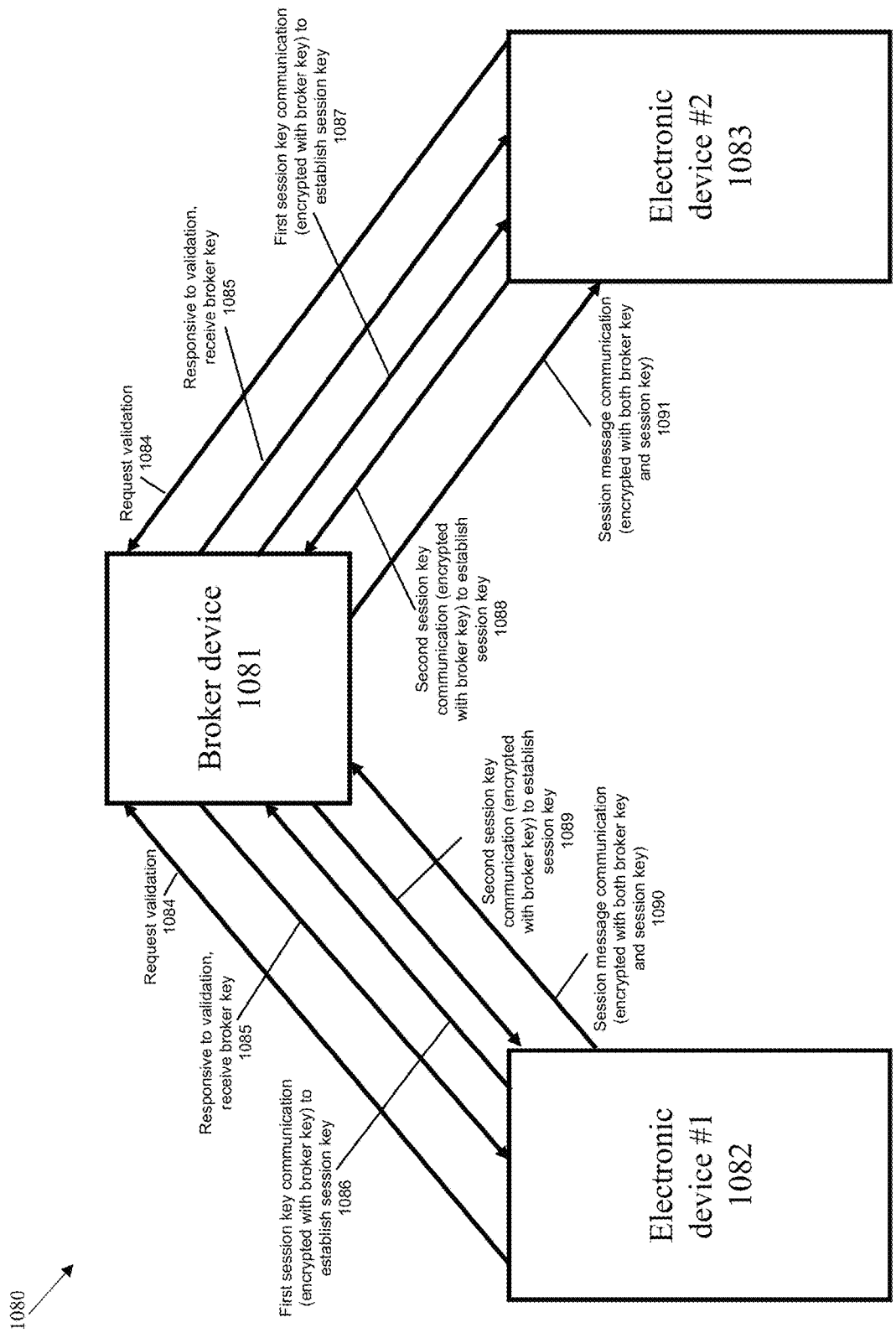
FIG. 10J illustrates a communication flow diagram of communications between two electronic devices in the vehicle and the broker in order to: validate the electronic devices to the broker; establishing a communication session via the broker (e.g., to establish a session key); and communicating in the communication session via the broker using the session key.

FIG. 10J illustrates a communication flow diagram 1080 of communications between two electronic devices (electronic device #1 (1082) and electronic device #2 (1083)) in the vehicle and the broker device 1081 in order to: validate the electronic devices 1082, 1083 to the broker device 1081; establishing a communication session via the broker device 1081 (e.g., to establish a session key); and communicating in the communication session via the broker device 1081 using the session key. For example, 1084 is a communication from electronic device #1 (1082) to broker device 1081 requesting validation. As discussed above, responsive to receiving 1084, the broker device 1081 may review one or more certificates to validate electronic device #1 (1082). After validation, the broker device 1081 may send communication 1085 that is responsive to the validation of electronic device #1 (1082) and includes the broker key, which may be used to encrypted communications with the broker device 1081 on the broker trusted channel. Likewise, communications 1084, 1085 may be performed in order to validate/send the broker key for electronic device #2 (1083).

After validation, one or more communications (e.g., session key communications) may be sent to establish the session key. In particular, 1086 is a first session key communication that is encrypted with the broker key and sent from electronic device #1 (1082) to broker device 1081. The first session key communication may include the public key of electronic device #1 (1082). Responsive to receiving 1086, the broker device 1081 may determine that electronic device #1 (1082), the sender of 1086, and electronic device #2 (1083), the recipient of 1086, have previously been validated. If so, broker device 1081 routes 1086 (as shown by 1087). Responsive to receiving 1087, electronic device #2 (1083) may generate the session key using the public key of electronic device #1 (1082) and the private key of electronic device #2 (1083). In turn, electronic device #2 (1083) may send a communication 1088, which is a second session key communication, that includes the public key of electronic device #2 (1083) and is encrypted with the broker key. Responsive to receiving 1088, the broker device 1081 may determine that electronic device #2 (1083), the sender of 1088, and electronic device #1 (1082), the recipient of 1088, have previously been validated. If so, broker device 1081 routes 1088 (as shown by 1089). Responsive to receiving 1089, electronic device #1 (1082) may generate the session key using the public key of electronic device #2 (1083) and the private key of electronic device #1 (1082).

After the session key is established, session messages (encrypted by the session key) may be sent via the broker device 1081. For example, electronic device #1 (1082) may send session message communication 1090, which may be encrypted with both the broker key and the session key. In turn, after validation of the sender and the recipient, the broker device may forward the session message communication (shown as 1091) to electronic device #2 (1083).

Figure 10K:
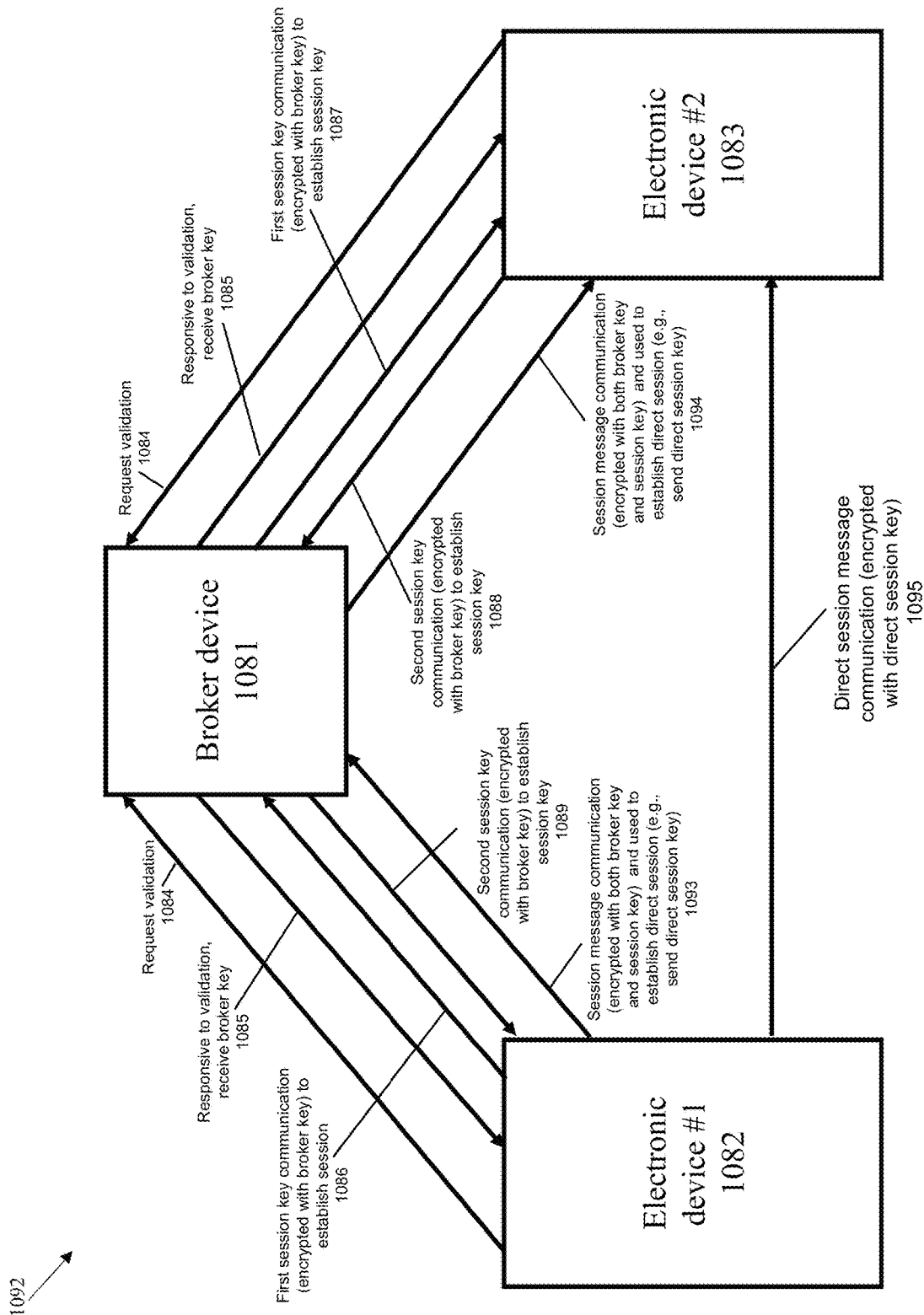
FIG. 10K illustrates a communication flow diagram of communications between two electronic devices in the vehicle and the broker in order to: validate the electronic devices to the broker; establishing a communication session via the broker (e.g., to establish a session key); communicating in the communication session via the broker using the session key (in order to determine the direct session key); and communicating directly (without routing via the broker) using the direct session key.

FIG. 10K illustrates a communication flow diagram 1092 of communications between two electronic devices (electronic device #1 (1082) and electronic device #2 (1083)) in the vehicle and the broker device 1081 in order to: validate the electronic devices to the broker; establishing a communication session via the broker (e.g., to establish a session key); communicating in the communication session via the broker using the session key (in order to determine the direct session key); and communicating directly (without routing via the broker) using the direct session key. Thus, FIG. 10K is similar to FIG. 10J using 1084-1089. FIG. 10K is different in 1093, 1094, and 1095. In particular, 1093 is a communication that is encrypted with both the broker key and the session key and is used to establish the direct communication session. As discussed above, various protocols may require certain information to establish the direct communication session. For example, DDS may require both the topic and the DDS session key. As such, electronic device #1 (1082) may generate the DDS session key and the topic, encrypt the DDS session key and the topic using the session key, and transmit them in communication 1093. Broker device 1081 may route 1093 (becoming 1094) to electronic device #2 (1083). In turn, both electronic device #1 (1082) and electronic device #2 (1083) have the information necessary to communicate via the direct communication session. After which, direct session message communication(s) 1095 may be sent, with the direct session message communication(s) being encrypted using the direct session communication key (e.g., the DDS channel key).

As such, FIG. 10K illustrates at least three layers including: (1) a device to broker layer (e.g., an addressing layer which may be encrypted using the broker key); (2) a device to device end-to-end via the broker device layer (payload layer which may be encrypted using the session key); and (3) a device to device end-to-end not via the broker device layer (e.g., communications not routed via the broker device and encrypted using the DDS session key).

Figure 11B:
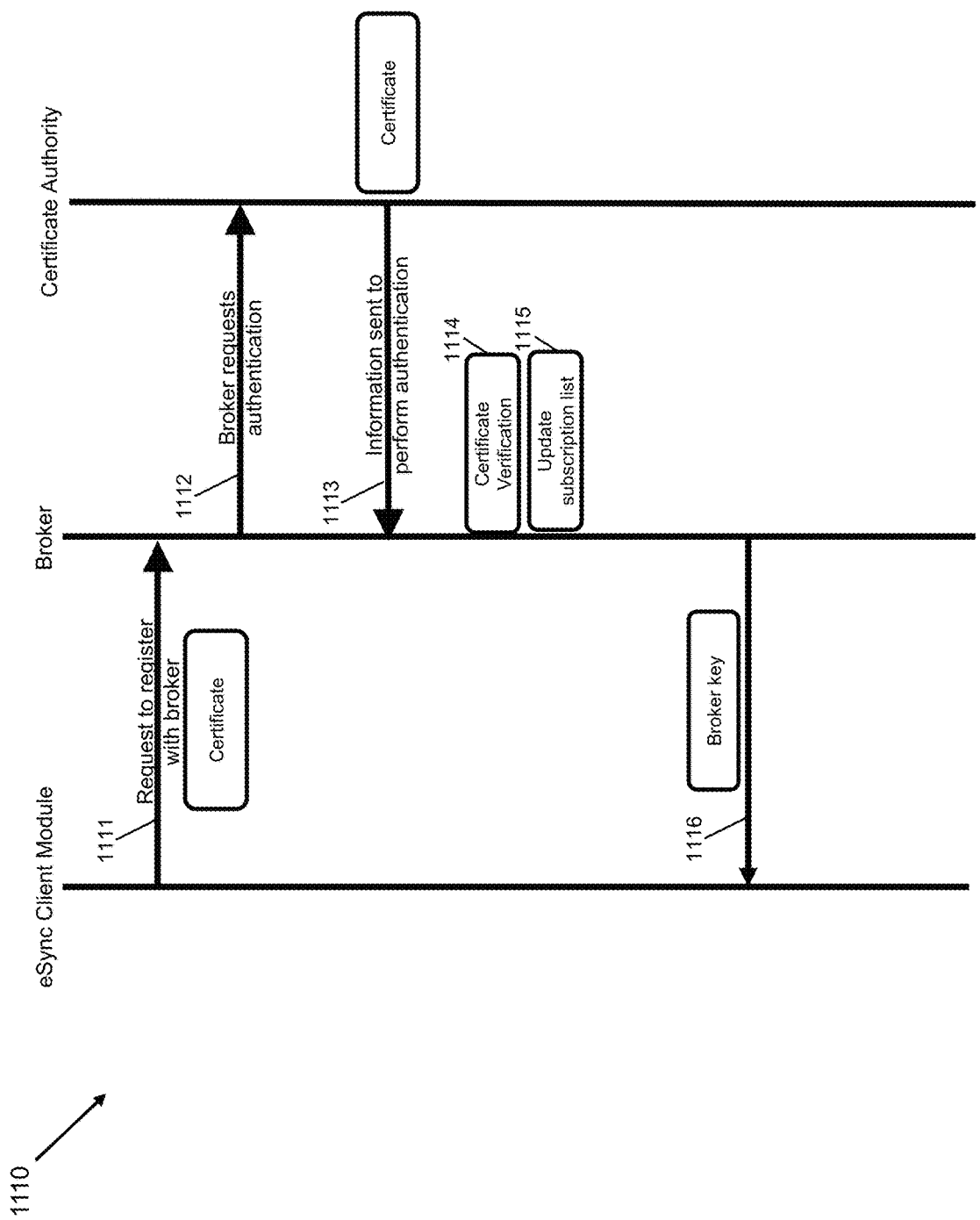
FIG. 11B illustrates a second sequence diagram for broker authentication and transmission of keys.

FIG. 11B illustrates a second sequence diagram 1110 for broker authentication and transmission of keys. 1111 is a communication from the eSync client module to the broker, which may include a certificate, such as the public key of the eSync client module. In turn, 1112 is a communication from the broker to the certificate authority to request authentication. At 1113, the certificate authority may send a certificate to the broker in order for the broker to perform certificate verification 1114 of the certificate that was sent at 1111. If the certificate was verified by the broker, the broker updates the subscription list at 1115, indicating that the eSync client module is verified. In turn, at 1116, the broker may send communication 1116 that includes the broker key, which may be used to encrypt subsequent communications routed via the broker on the trusted broker channel.

Figure 11C:
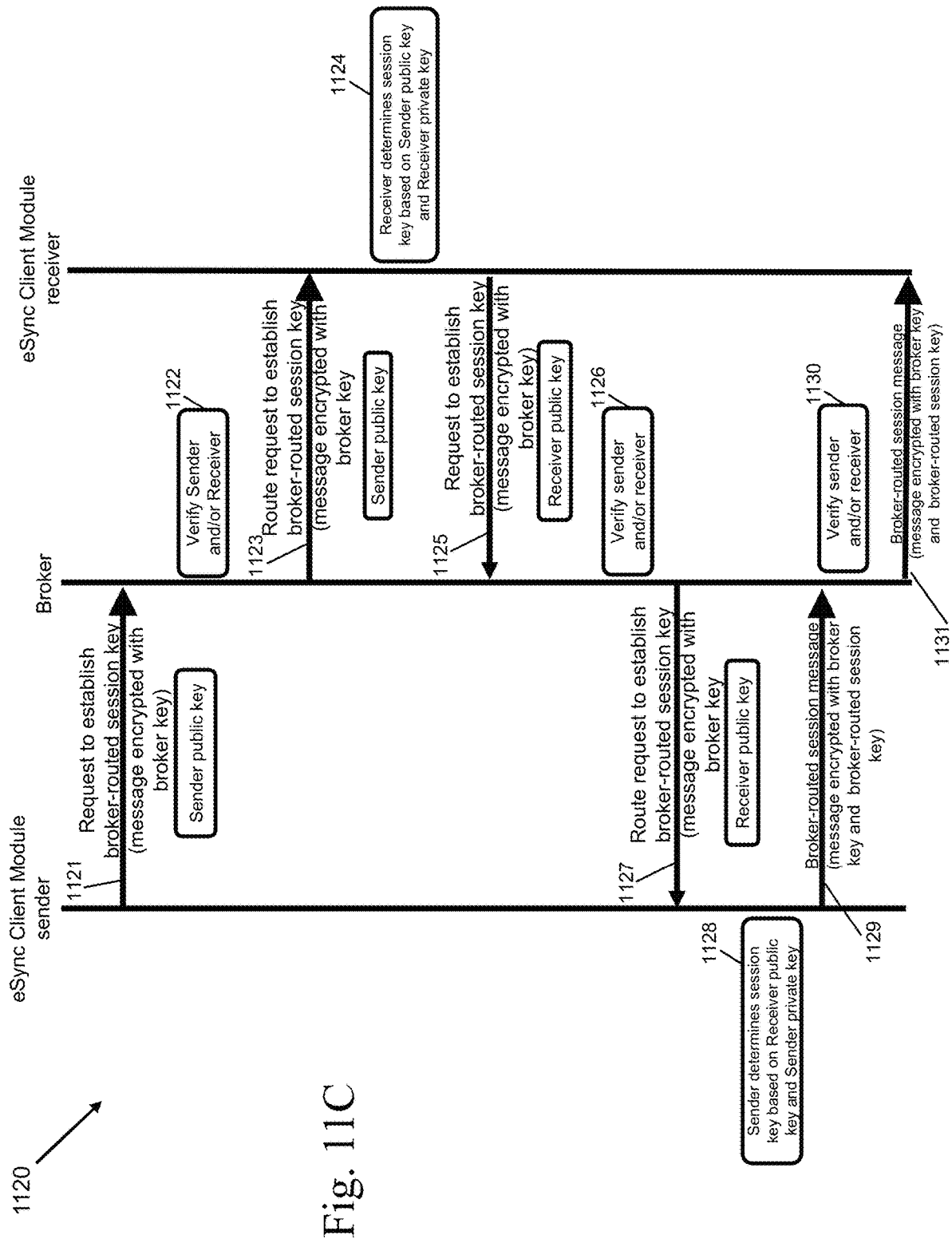
FIG. 11C illustrates a sequence diagram, after the electronic devices are validated to the broker, to: (i) communicate in order for the electronic devices to establish a broker-routed session key; and (ii) after establishing the broker-routed session key, communicating via the broker with the broker-routed session key.

FIG. 11C illustrates a sequence diagram 11120, after the electronic devices are validated to the broker, to: (i) communicate in order for the electronic devices to establish a broker-routed session key; and (ii) after establishing the broker-routed session key, communicating via the broker with the broker-routed session key. In particular, at 1121, the eSync client module sender ("sender") may send a request to establish a broker-routed session key (with the message encrypted with the broker key and including the public key of the sender). At 1122, the broker may verify the sender and/or the receiver. If verification occurs (e.g., the sender and/or the receiver were previously validated), at 1123, the broker routes the request to establish the broker-routed session key to the eSync client module receiver ("receiver"). At 1124, the receiver determines the session key (e.g., the broker-routed session key) based on the public key of the sender and the private key of the receiver. In turn, at 1125, the receiver may send a request to establish the broker-routed session key (with the message encrypted with the broker key and including the public key of the receiver). At 1126, the broker may verify the sender and/or the receiver. If verification occurs (e.g., the sender and/or the receiver were previously validated), at 1127, the broker routes the request to establish the broker-routed session key to the sender. At 1128, the sender determines the session key (e.g., the broker-routed session key) based on the public key of the receiver and the private key of the sender. At 1129, a broker-routed session message is sent from the sender with the ultimate destination of the receiver. The broker-routed session message may be encrypted with the broker key and with the broker-routed session key (previously determined at 1128). At 1130, the broker may verify the sender and/or the receiver. If verification occurs, at 1131, the broker routes the broker-routed session message to the receiver.

Figure 11D:
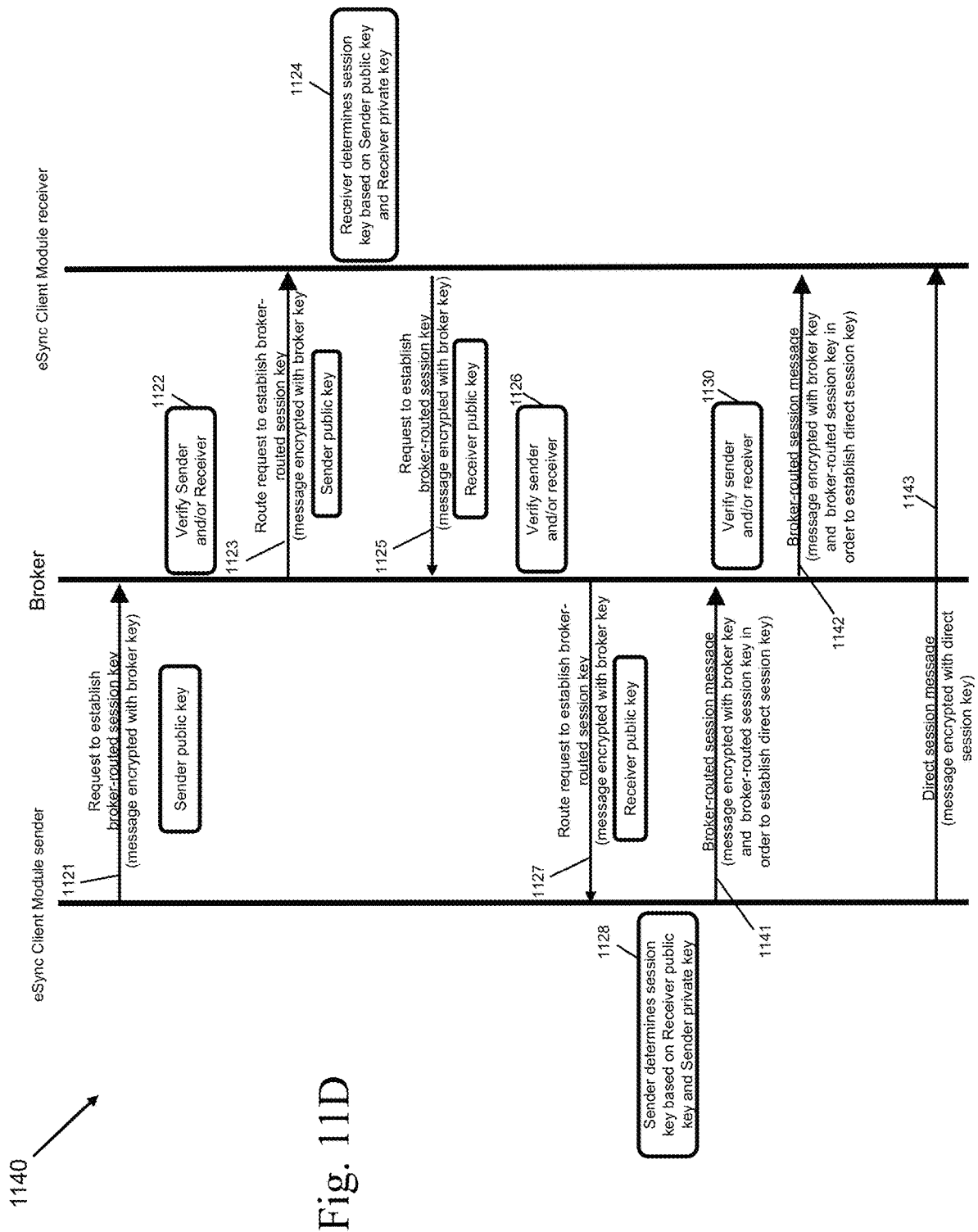
FIG. 11D illustrates a sequence diagram, after the electronic devices are validated to the broker, to: (i) communicate in order for the electronic devices to establish a broker-routed session key; (ii) after establishing the broker-routed session key, communicating via the broker with the broker-routed session key in order to establish a direct session key; and (iii) communicating, without routing via the broker, between the electronic devices with the direct session key.

FIG. 11D illustrates a sequence diagram 1140, after the electronic devices are validated to the broker, to: (i) communicate in order for the electronic devices to establish a broker-routed session key; (ii) after establishing the broker-routed session key, communicating via the broker with the broker-routed session key in order to establish a direct session key; and (iii) communicating, without routing via the broker, between the electronic devices with the direct session key. Thus, FIG. 11D includes 1121-1128 of FIG. 11C and additional steps of 1141-1143. In particular, the broker-routed session message (which is encrypted with the broker-routed session key) is used to establish the direct session. In particular, at 1141, the broker-routed session message is sent, with part or all of the broker-routed session message being encrypted with the broker key and with another part or all of the broker-routed session message encrypted with the broker-routed session key. For example, the payload of the broker-routed session message may include information, such as the topic and the direct session key, that is encrypted with the broker-routed session key. If verified at 1130, at 1142, the broker-routed session message is routed to the receiver. After which, both the sender and the receiver have the information needed to communicate via the direct channel (e.g., the topic and the direct session key). As such, at 1143, the sender sends a direct session message that is encrypted with the direct session key and is transmitted to the receiver without being routed via the broker.

Figure 12A:
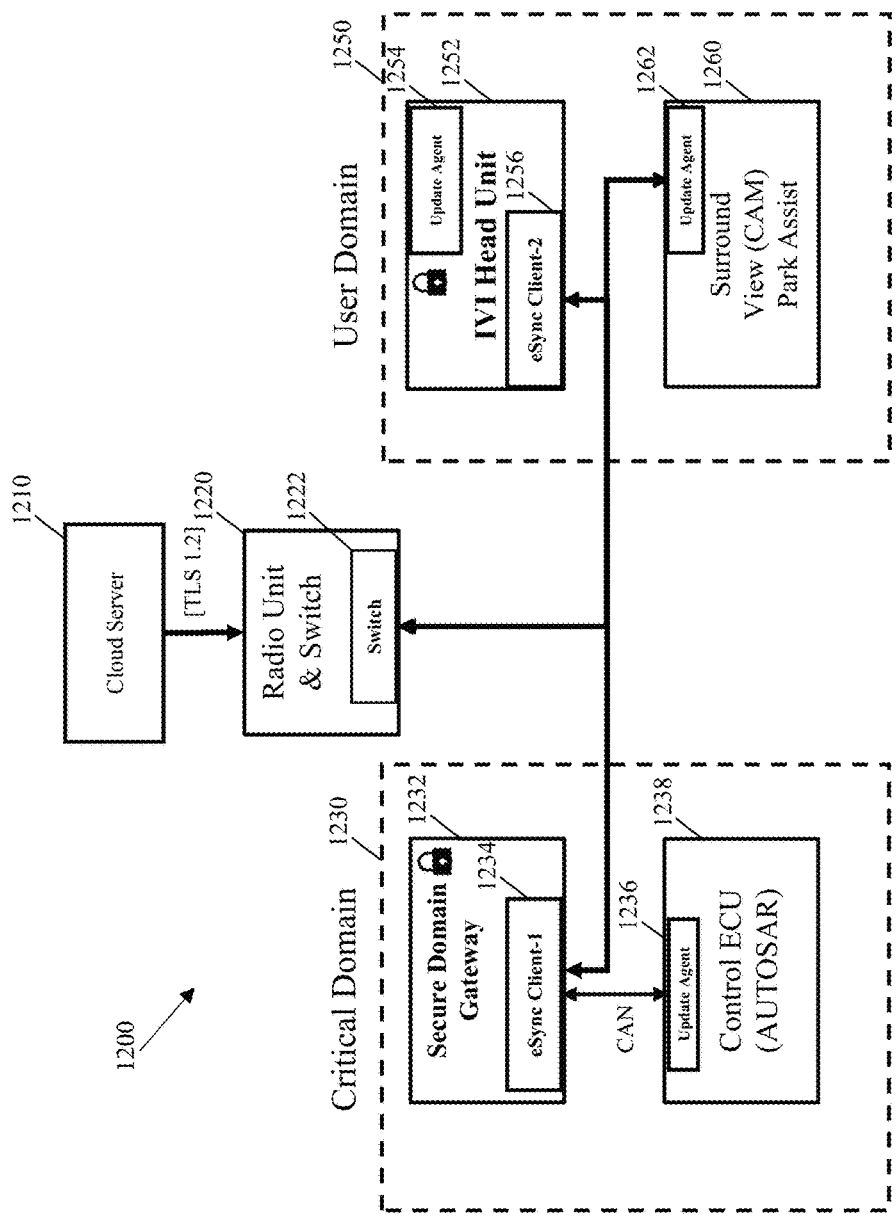
FIG. 12A is a block diagram of independent dual domains within a vehicle.

FIG. 12A is a block diagram 1100 of independent dual domains within a vehicle. As illustrated in FIG. 12A (and in FIGS. 12B and 13A-B, discussed below), the vehicle includes multiple domains, with each of the domains including at least one eSync Client. For example, as illustrated in FIGS. 12A-B and 13A-B, the vehicle is classified into separate domains of critical and non-critical. Further, in one implementation, the eSync Client devices may manage electronic devices that are mutually exclusive of one another (see FIG. 12A and FIG. 13A). Alternatively, the eSync Client devices may manage electronic devices that are not mutually exclusive of one another (see FIG. 12B and FIG. 13B). This is unlike solutions in which the entire vehicle includes a single eSync Client architecture, which may be vulnerable to attack and hence may be less secure. In this regard, in one implementation, a multi-client approach is used.

As discussed further below, the multi-client approach may increase the complexity of control and/or synchronization management. As one example, the multi-client approach addresses failures in the different stages of the software process in different ways. As an initial matter, the different stages of the software process include, but are not limited to: (1) communication with the OTA server; (2) performing a software update; and (3) completing the software update. As discussed in more detail below, failures may occur at the different stages including: (i) losing connection with the OTA server prior to download of all of the updates to the eSync Clients (including the master eSync Client device (also termed a master software update module) and/or the follower eSync Client device(s) (also termed follower software update modules)); (ii) losing connection with the OTA server after download of all of the updates to the eSync Clients (including the master eSync Client device and/or the follower eSync Client device(s)), but prior to verification to the OTA server that the downloads have been installed and completed; or (iii) failure in the installation process of the software update for one, some or all of the eSync Clients.

As discussed in more detail below, one of the eSync Clients, such as the master eSync Client device and/or the follower eSync Client device(s), may resolve the failures, including: in response to a communication disruption with the OTA server, determining whether and/or when to resume last partial download; and determining whether the software update has been implemented, and determining what actions to take in response to a failure in implementing the software update (e.g., whether to roll back to a previous software version for one, some, or all of the target devices that the eSync Client device controls).

Further, the timing of the failures may determine the course of action taken by the master eSync Client device. With regard to a failure to download the update, the master eSync Client device may determine whether the failure is considered a short-term failure or a long-term failure. For example, a first set of the eSync Client devices (e.g., the first half of the eSync Client devices) have received the download of the update whereas a second set of the eSync Client devices (e.g., the second half of the eSync Client devices) have not received the download of the update. Responsive to the master eSync Client device determining that the failure, resulting from an inability to connect to the server in order to perform the download of the updates, is less than a predetermined amount of time (e.g., 1 day), the master eSync Client device may determine that the failure is short-term. Because the failure is deemed short-term, the master eSync Client device may continue attempting to download for the second half of the eSync Client devices, and will not perform a re-download for the first half of the eSync Client devices. Responsive to the master eSync Client device determining that the failure to connect to the server in order to perform the download of the updates is greater than or equal to the predetermined amount of time (e.g., 1 day), the master eSync Client device may determine that the failure is long-term. Because the failure is deemed long-term (which may indicate that even the downloads that have already been received may be out-of-date, such as for the first half of the eSync Client devices), the master eSync Client device may attempt to perform the download for all of the eSync Client devices, including the first half of the eSync Client devices where the downloads have already been received. In this way, in the event that a newer download update has been issued for the first half of the eSync Client devices, the new download update may be obtained.

With regard to a failure to update the flash, the master eSync Client device may likewise determine whether the failure is considered a short-term failure or a long-term failure. If the master eSync Client device determines that there have been fewer than X number of times that the update to flash has been tried and failed, the master eSync Client device may consider the failure a short-term failure. If the master eSync Client device determines that there have been X number of times or greater that the update to flash has been tried and failed, the master eSync Client device may consider the failure a long-term failure, may roll back the software, and may send a report of the defect to the server.

Figure 12B:
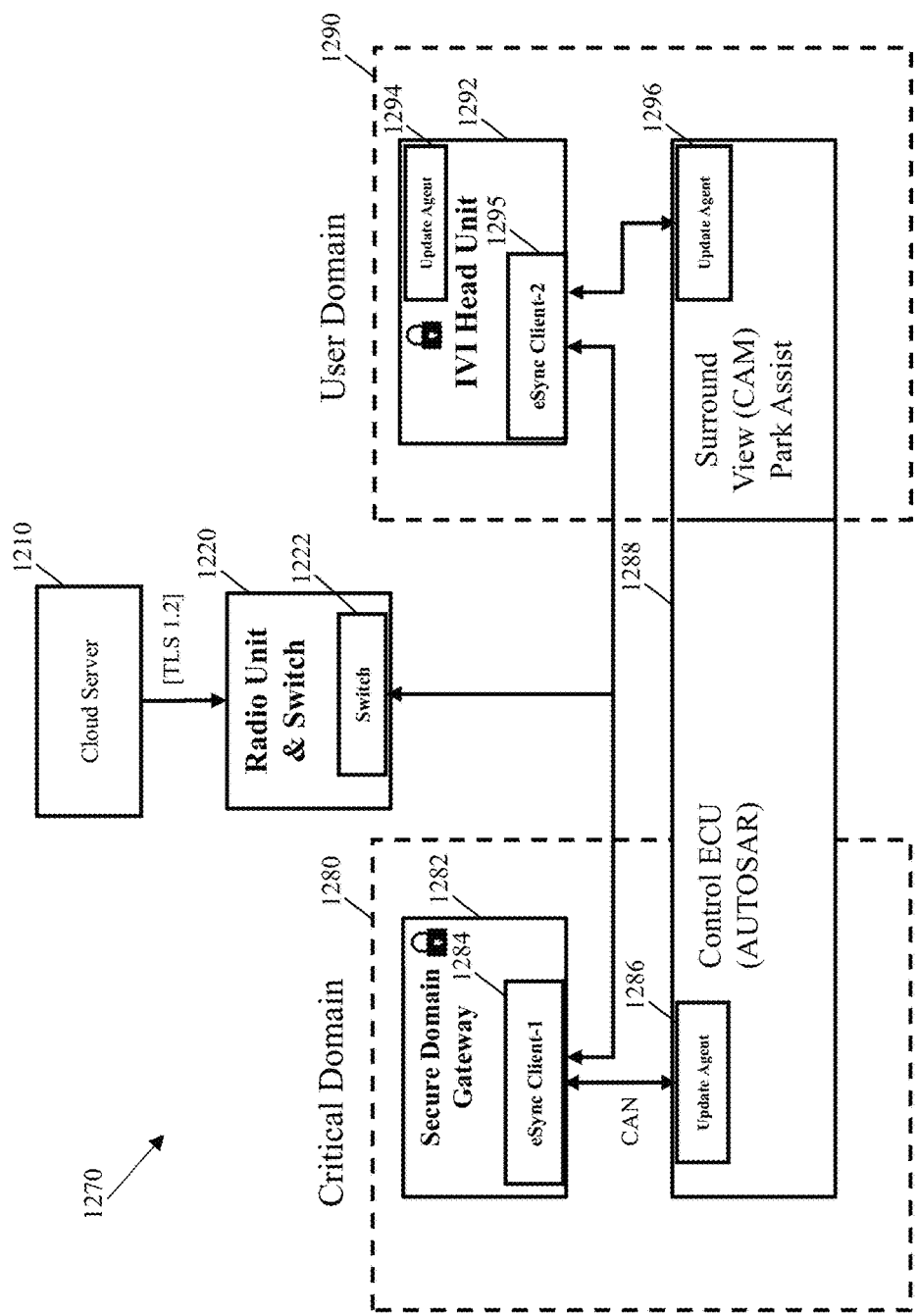
FIG. 12B is a block diagram of dependent dual domains within a vehicle.

FIGS. 12A and 12B illustrate different types of multi-client architectures. As illustrated in FIG. 12A, the multi-client architecture 1200 includes two domains in the vehicle, including the critical domain 1230 and user domain 1250. The number of domains shown in FIGS. 12A-B and 13A-B are merely for purposes of illustration. Two, three, four, or more domains may be present within the vehicle. As a general matter, the different domains in the vehicle may be managed by an electronic device, such as each domain having a respective eSync Client device. In this regard, the architecture, with the separate domains, may be used for isolation of different electronic portions of the vehicle.

In FIG. 12A, the critical domain 1230 and user domain 1250 are mutually exclusive to one another. This is illustrated in FIG. 12A as the secure domain gateway 1232 in the critical domain 1230 being isolated from the IVI head unit 1252 in the user domain 1250. For example, the functions performed by one domain are entirely independent of the other domain. Functions include, but are not limited to and one, any combination, or all of: downloading software updates (such as software delta(s)); decompressing the software updates; decrypting the software updates; reconstructing the image; and storing the reconstructed image in non-volatile memory. Thus, the separate domains may be controlled completely separately and independently. For example, all aspects, including download of the software update, decompression of the software update, decryption of the software update, preparing/flashing software update, rolling back the software update (in the event of a failure in the software update), may be performed independently for each domain. In particular, the OTA updates to each of the critical domain 1230 and the user domain 1250 may be performed separately. Further, one OTA update may reach both of the critical domain 1230 and the user domain 1250. In addition, failure of one or more functions in one domain may not interfere with OTA to another of the domains. For example, failure in download of the OTA to the user domain 1250 may not affect the download in the critical domain 1230.

Alternatively, only certain aspects of the software update process may be performed independently whereas other aspects of the software update process may be performed dependently. For example, a first domain may perform the download, decompression, decryption, and preparing/flashing of the software update independently of a second domain. However, the rollback of the software update (in the event of a failure in performing the software update) in the first domain may be performed dependently on the whether there was a failure in the software update in the second domain, as discussed further below. In this regard, the separate domains within the vehicle may operate independently for certain functions, and dependently for other functions (in order for the domains to be synchronized).

Authentication may first be established between Cloud Server 1210 and the radio unit (TCU) 1220, which may use switch 1222, using TLS1.2 security protocol. In practice, both the critical domain 1230 and user domain 1250 may request downloads from cloud server 1210. Specifically, each of the critical domain 1230 and user domain 1250 may include a respective eSync Client, with the respective eSync Client controlling (or being involved in some manner, such as overseeing) the various functions in the software update process including downloading, decompressing, decrypting, reconstructing and/or storing. Thus, both eSync Client—1 (1234) (an example of a first software update module) and eSync Client—2 (1256) (an example of a second software update module) may request downloads and the cloud server 1210 can send a single packet to the TCU (Telecomm Unit) in the radio unit (TCU) 1220. Further, in one implementation, each of eSync Client—1 (1234) and eSync Client—2 (1256) are configured to update only the electronic devices within its respective domain. Further, in one implementation, the network layout for the critical domain 1230 is different from the network layout for the user domain 1250 (such as one of the domains including a plurality of networks, such as CAN, while the other does not). Alternatively, the network layout for the critical domain 1230 and the user domain 1250 is the same.

In FIG. 12A, secure domain gateway 1232 may comprise eSync Client—1 (1234). Likewise, in-vehicle infotainment (IVI) head unit 1252 may comprise an eSync Client—2 (1256). As shown in FIG. 12A, the eSync Client may reside within an electronic device subject to a software update, such as IVI head unit 1252 (which includes update agent 1254). As shown in FIG. 12A, eSync Client—1 (1234) is instantiated in secure domain gateway 1232 and eSync Client—2 (1256) is instantiated in IVI head unit 1252. Alternatively, the eSync Client may reside within an electronic device not subject to a software update, such as secure domain gateway 1232. In devices that are subject to an update (and that have the capability to perform the software update), an update agent (UA) is present within the device in order to perform the software update. Thus, both eSync Client—1 (1234) and eSync Client—2 (1256) may request downloads. In response to the requests, cloud server 1210 may send a single packet to the TCU (Telecomm Unit).

After download, the different domains may use different paths to the target device for the software update. For example, the critical domain 1230 may use a path, such as CAN, with a higher level of security to Control ECU 1238 (which may have critical function software resident therein) than the path used in user domain 1250 to send software updates from IVI head unit 115 to surround view (CAM) park assist 1260 (which includes update agent 1262 and which may have non-critical function software resident therein).

FIG. 12B is a block diagram 1270 of dependent dual domains within a vehicle. As illustrated in FIG. 12B, at least one target device transcends both the critical domain 1280 and the user domain 1290. In particular, ECU 1288 transcends both the critical domain 1280 and the user domain 1290, wherein the control of ECU 1288 is administered through eSync Client—1 (1284) in secure domain gateway 1282. Specifically, a portion of ECU 1288 (e.g., control aspects of the ECU 1288, such as AUtomotive Open System ARchitecture) is controlled via eSync Client—1 (1284) in the critical domain 1280. Conversely, other parts of ECU 1288 are administered through eSync Client—2 (1295) in IVI head unit 1292 (which includes update agent 1294). One aspect of non-critical control in ECU 1288 may comprise a camera display (such as surround view (CAM) park assist). This is one example in which interdependent elements within a single device (such as ECU 1288) may be managed by multiple eSync Client devices. Thus, in one implementation, eSync Client—1 (1284) may be configured to update the software, working in combination with update agent 1286, for the critical functional aspects of element 1288 (such as control ECU), and eSync Client—2 (1295) may be configured to update the software, working in combination with update agent 1296, for the non-critical functional aspects of element 1288 (such as surround view (CAM) park assist). This division of the updates may necessitate synching of the updates.

Thus, in one implementation, the version of the software that is updated through the critical domain and the version of the software that is updated through the user domain are to be in sync. In practice, if one domain update fails, then both update agents 1286, 1296 revert back to the older working version of the software. For example, in the event that update agent 1296 in user domain 1290 fails to perform the software update, eSync Client—2 (1295) may receive notice of this failure. In turn, eSync Client—2 (1295) may notify eSync Client—1 (1284) of the failure. In one implementation, eSync Client—1 (1284) may determine that because there was a failure in an update to the non-critical part of ECU 1288, the entire ECU 1288, including the update to the critical part of the ECU 1288, is rolled back to a previous version. In this regard, eSync Client—1 (1284), in the role of master eSync Client, may order eSync Client—2 (1295) update agent 1296 to roll back to the previous version of software for the non-critical part of ECU 1288. Alternatively, even in response to eSync Client—1 (1284) receive notice of failure to update in the non-critical domain (such as user domain 1290), eSync Client—1 (1284) may determine to command roll back only to the non-critical part of ECU 1288 (such as surround view (CAM) park assist), but not to the entire ECU 1288 (such as the update to the critical part of the ECU (Control ECU (AUTOSAR))).

As another example, in the event that update agent 1286 in critical domain 1280 fails to perform the software update, eSync Client—1 (1284) may receive notice of this failure. In one implementation, eSync Client—1 (1284) may determine that because there was a failure in an update to the critical part of ECU 1288, the entire ECU 1288, including the update to the non-critical part of the ECU 1288, is rolled back to a previous version. In this regard, eSync Client—1, as the master eSync Client, (1284) may order eSync Client—2 (1295) update agent 1296 to roll back to the previous version of software for the non-critical part of ECU 1288. Alternatively, even in response to eSync Client—1 (1284) receive notice of failure to update in the critical domain 1280, eSync Client—1 (1284) may determine to roll back only to the critical part of ECU 1288, but not to the entire ECU 1288 (such as the update to the non-critical part of the ECU 1288).

Figure 13A:
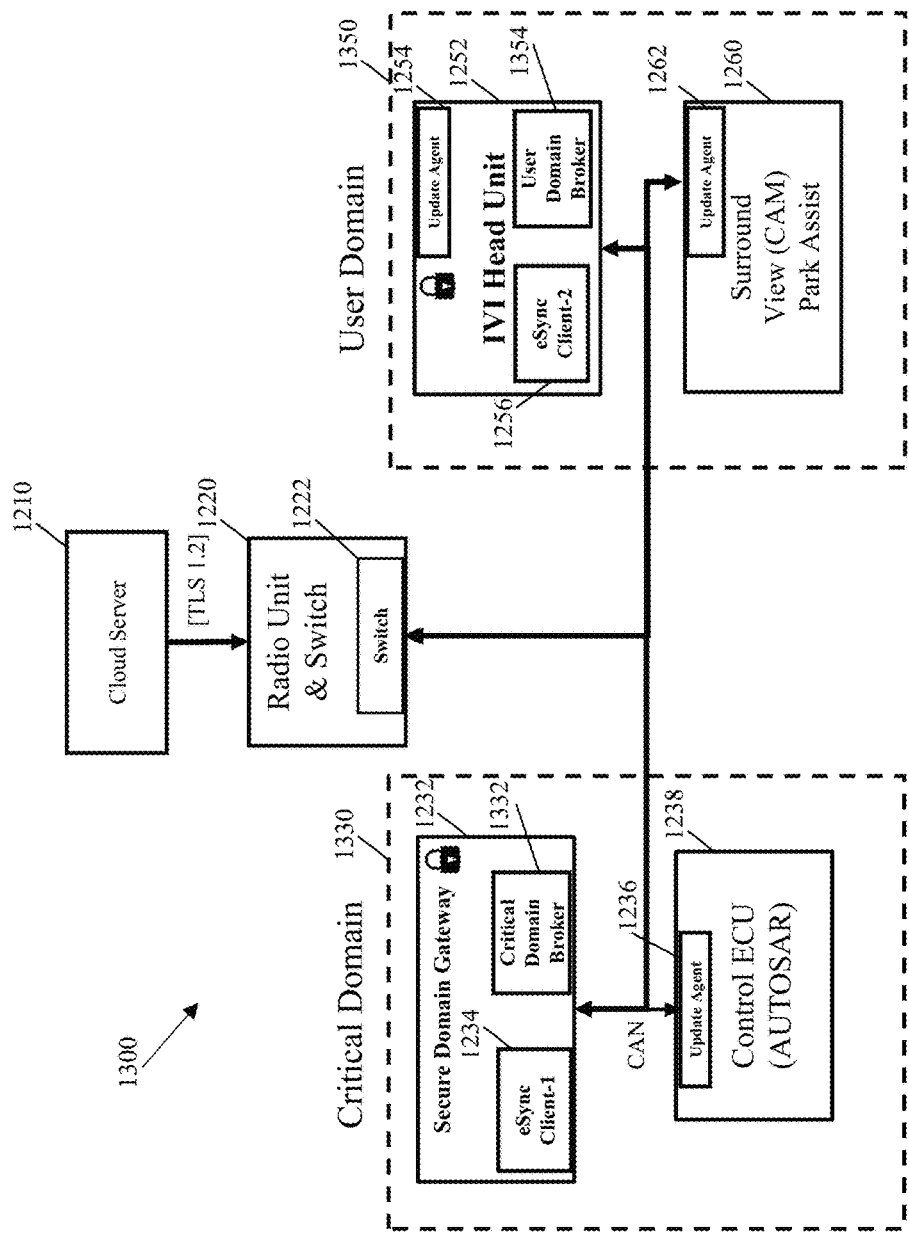
FIG. 13A is a block diagram of independent dual domains within a vehicle where each independent domain includes a broker through which communications within the respective domain communicate.

FIG. 13A is a block diagram 1300 of independent dual domains within a vehicle where each independent domain includes a broker through which communications within the respective domain communicate. In particular, each respective domain, including critical domain 1330 and user domain 1350 has a respective broker (critical domain broker 1332 and user domain broker 1352). Alternatively, more than one broker may reside in each domain. As discussed above, within an architecture, one or more brokers may be present. In the implementation illustrated in FIG. 13A, the devices within the critical domain, including eSync Client—1 (1234) and Control ECU 1238, may be pre-programmed with the address of critical domain broker 1332 in order to register with critical domain broker 1332. Likewise, the devices within the user domain, including eSync Client—2 (1256) and surround view (CAM) park assist 1260, may be pre-programmed with the address of user domain broker 1352 in order to register with user domain broker 1352. As discussed above, the broker may reside in one of several places, including in a standalone device or within another device (such as illustrated in FIG. 13A, where critical domain broker 1332 resides within secure domain gateway 1232.

In practice, after registration, eSync Client—1 (1234) may send a message to critical domain broker 1332 in order communicate with Control ECU 1238. As discussed above, eSync Client—1 (1234) need not know the address of Control ECU 1238, only its designation (such as indicated in the certificate of Control ECU 1238), and vice-versa.

Figure 13B:
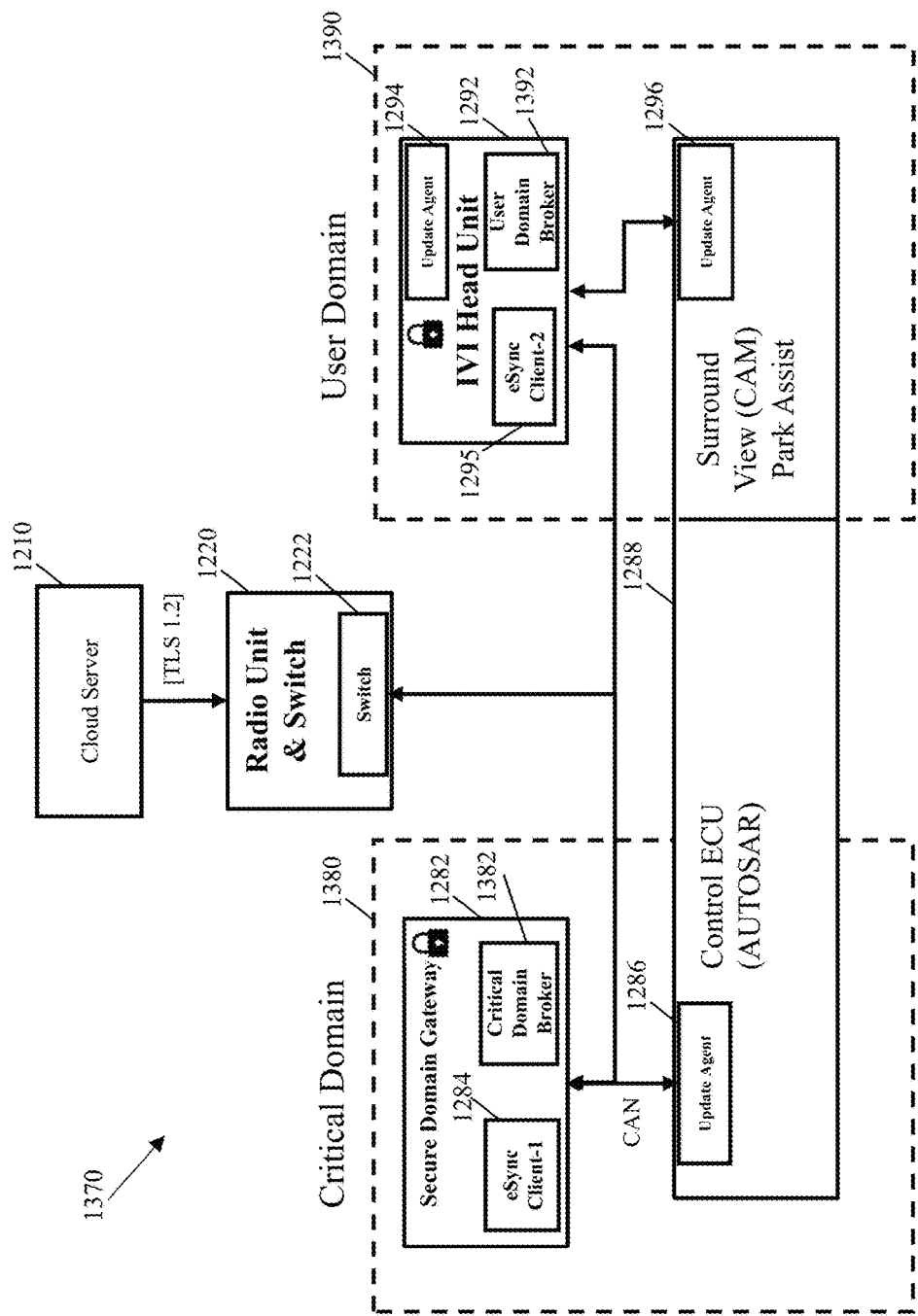
FIG. 13B is a block diagram of dependent dual domains within a vehicle where each dependent domain includes a broker through which communications within the respective domain communicate.

FIG. 13B is a block diagram 1370 of dependent dual domains within a vehicle where each dependent domain includes a broker through which communications within the respective domain communicate. In particular, each respective domain, including critical domain 1380 and user domain 1390 has a respective broker (critical domain broker 1382 and user domain broker 1392). As discussed above, within an architecture, one or more brokers may be present. In the implementation illustrated in FIG. 13B, the devices within the critical domain, including eSync Client—1 (1284), may be pre-programmed with the address of critical domain broker 1332 in order to register with critical domain broker 1332. Likewise, the devices within the user domain, including eSync Client—2 (1295), may be pre-programmed with the address of user domain broker 1392 in order to register with user domain broker 1392.

In one implementation, a device that transcends multiple domains may be pre-programmed with the address of the respective brokers for the respective domains, including ECU 1288 pre-programmed with the address of critical domain broker 1332 and user domain broker 1392 in order to communicate with brokers residing in separate domains. Alternatively, a device that resides within multiple domains may only communicate with a broker in one domain. In this way, the separate domains are isolated in terms of communication. However, in the event that a communication needs to be sent between domains, such as from a master eSync client device to a follower eSync client device, the master eSync client device may create an exception thread to communicate with the follower eSync client device. The exception thread may comprise a message link but not a data link in order to determine status or control (e.g., the master eSync client device pols the follower eSync client device to determine whether the follower eSync client device received the update and if so, the follower eSync client device may send a response to the master eSync client device accordingly; the master eSync client device pols the follower eSync client device to determine whether the follower eSync client device completed the update and if not, the follower eSync client device may send a response to the master eSync client device accordingly, whereby the master eSync client device will command the rollback).

As discussed above, using a multi-client architecture may present unique challenges. For example, one challenge in the multi-client architecture is state synchronization between the various different clients. In one implementation, the clients are mutually exclusive and have their unique data requirements for their update payloads. This is particularly important when eSync Client devices come from multiple suppliers.

Further, the software update process may result in a variety of types of failures. One type of failure relates to a connection failure. For example, the system, with multiple clients, may determine how to address an intermittent or poor wireless connection to the vehicle eSync Client device from the Cloud Server. Another type of failure is at the update agent. For example, when an update agent determines that there is a failure in the software update (such as a failure in updating the software in the ECU), the system may perform a synchronized rollback of the software or synchronized updates.

Apart from these general type of problems, the software update process has specific problem use cases including: only a part of the eSync Client devices that have interdependent modules (such as illustrated in FIGS. 12B and 13B) have new payloads downloaded and connectivity to cloud server 1210 is lost; all the eSync Client devices have payloads downloaded and connectivity to cloud server 1210 is lost; state management during short-term connection failure and long-term connection failure; state management when all updates need to be rolled-back; and state management when there are dependent payloads (e.g., this is the situation when a system or component has both critical system related control updates and user updates. Critical updates may be transmitted through the secure client and user updates may be transmitted through non-critical client).

Synchronization may be performed in a variety of devices in the system. In one implementation, the synchronization may be performed at the server level, such as by cloud server 1210. For example, all the eSync Client devices may directly connect with cloud server 1210, with the eSync Client devices being mutually exclusive and with no internal dependencies on each other. Cloud server 1210 may manage all version information and update status.

In an alternate implementation, the synchronization is performed by one of the eSync Client devices in the vehicle. For example, one of the eSync Client devices in the vehicle may be designated as the master client device, and may be responsible for determining how to synchronize the remaining eSync Client devices in the vehicle.

To implement the synchronization by a device in the vehicle, various criteria may be defined including:

eSync Client Organization: Each eSync Client device may have a DMTree with a DeviceID to identify the eSync Client device uniquely to the cloud server 1210. Each of the DeviceID may be appended to the vehicle VIN (or other unique identifier of the vehicle) as all the eSync Client devices belong to a single vehicle and are identified with the single vehicle.

eSync Client Master: Among the multiple eSync Client devices in a system, one eSync Client device is designated as the master to securely update the vehicle. In one implementation, any eSync Client device may be a master; however, there is only one master eSync Client device in the system.

Payload Session Token: Every cloud connection established between cloud server 1210 and a respective eSync Client device that results in a transfer of payload, may include a new Payload Session Token. The Payload Session Token indicates that a new payload has been transferred. The Payload Session Token will remain in force until the transfer of the new payload. New payload may be defined as any software update that replaces the update currently in the eSync Client device for updating ECUs. It may be an older version or a newer version of the software currently running in the ECUs.

Virtual Link: When the cloud server 1210 disconnects from the vehicle, all the eSync Client devices may make a connection to the master eSync Client device through a secure link called the virtual link. The link may behave exactly as if the follower eSync Client devices have a connection to the cloud server 1210. This virtual link allows the follower eSync Client devices to verify their respective session key against the one that is in the master eSync Client device. Each follower client session key may have a decay tag (e.g., a programmable time limit in which the key is still valid) that counts down to zero. Upon reaching zero, the follower eSync Client devices may make a secure connection to the master eSync Client device. The master eSync Client device may also have a timer that indicates when the system should contact the cloud server.

Update Flag: Each payload transfer from the server may cause the Update Flag to be reset. In one implementation, an eSync Client device may only set the flag but cannot reset it. In this implementation, only the master eSync Client device has the permissions to reset the flag if needed.

Connection State Flag: This flag lets a follower eSync Client device know that a connection to the cloud server 1210 is available.

Master eSync Client Control Channel: The master eSync Client device may communicate with the cloud server 1210 to download policies that affect all other follower eSync Client devices and list of interdependent ECUs (which may be updated by two different eSync Client devices, such as illustrated in FIG. 12B) in the manifest being downloaded by other clients.

Generic eSync Client Data Channel: This is a method of eSync Client devices communicating with servers (such as cloud server 1210). For example, an eSync Client device may establish a TLS 1.x (currently 1.2) channel with exchange of X509 certificates. After establishment of authentication, the eSync Client device may check for specific downloads available to it.

Update Policy: The update policy for an update is the prescription on the nature of how new updates will be flashed into the various ECUs in the vehicle. Policy provision may include, but is not limited to, the following: time of update; dependencies of software updates between ECUs; updates to different control paths in the same ECU or CAN first updates; etc. Using the update policy, the master eSync Client device may determine the nature of the rollback that may be executed in case of failure of an update. In one implementation, there is no a priori knowledge that one eSync Client device shall have for information about other eSync Client devices in the system.

Further, given the multi-client architecture, procedures regarding security and payload download may follow certain procedures. With regard to security setup, each token may be encrypted by the public key for each eSync Client device, and hence may be made secure as communications may only be decoded by their individual private keys. In addition, even when the master eSync Client device broadcasts the token to the follower eSync Client devices, the token may be encrypted with the public key of the follower eSync Client devices.

With regard to payload download, the precedence order for payload download to the various eSync Client devices may follow a certain sequence. In one implementation, all follower eSync Client devices connect and have their respective payloads downloaded before the master eSync Client device downloads its own respective payload. This may be for establishing precedence order. The master eSync Client device has the old session key to monitor the updates in the system. Further, the master eSync Client device may be tasked with overseeing the downloads, including whether there is a failure in the downloads. In this regard, the master eSync Client device may monitor the order based on its precedence of receiving the download last. Thus, in the event that the master eSync Client device receives its download (and because the master eSync Client device receives the download last), the master eSync Client device may determine that all of the other follower eSync Client devices have already received their respective downloads. Further, this precedence order may be relevant since critical updates may be scheduled for transmission last as a payload. In one implementation, the master eSync Client device is configured to receive the critical updates; hence, the precedence order may facilitate the monitoring of the downloads.

For example, in a system with one master eSync Client device and "N" follower eSync Client devices (where "N" is an integer number greater than 0), the master eSync Client device may determine that all other "N" follower eSync Client devices have received the software update download if the master eSync Client device has received its software update download. Alternatively, the master eSync Client device may poll the "N" follower eSync Client devices to determine whether the "N" follower eSync Client devices have received their respective downloads.

In one implementation, responsive to the master eSync Client device determining that the follower eSync Client devices have received their respective software update downloads, the master eSync Client device may command the follower eSync Client devices to perform the update. In a specific implementation, a part of the download from cloud server 1210 may include a manifest, with the manifest containing information indicative of a sequence of the updates to perform. Responsive to receipt of the manifest, the master eSync Client device may command the follower eSync Client devices to perform in the sequence as indicated in the manifest.

Prior to implementing the manifest, the eSync Client device may review the manifest for potential errors. In one implementation, the eSync Client device may compare the manifest received from the server with the one that the eSync Client device created from version reports from the various ECUs. If the eSync Client device detects a difference in the manifest from the server and the one created by the eSync Client device, the eSync Client device may report the difference to the server. Since the eSync Client device or the TCU may establish the connection to the server, the input as to the difference in the manifest from the server and the one created by the eSync Client device may be used by the server to reform the manifest and/or payload if needed, and thereby send an updated manifest and/or payload for the eSync Client device to implement.

For example, the manifest may indicate that critical updates be performed first. Thus, the master eSync Client device may command that critical domains, such as critical domain 1230 or 1280, perform the update using the respective update agents 1236 or 1286 first prior to performing the update for non-critical domains, such as user domain 1250 or 1290.

In one implementation of the system, all eSync Client devices (including the master eSync Client device and the follower eSync Client devices) connect to the server individually, are able to check for updates, upload their individual status, and match the version number of their payload with that of the server and keep it synchronized. Each connection that necessitates a download may require a token associated with it. In a specific implementation, each respective eSync Client device receives the session token along with an indicator of the time at which the respective eSync Client device is to establish a connection with cloud server 1210 (e.g., a "fuel meter" along with the Session Token, with the respective eSync Client device using the "fuel meter" to determine when to re-establish a connection with the cloud server). In practice, the "fuel meter" may indicate the frequency (e.g., once every 6 months) at which the respective eSync Client device is to contact the cloud server 1210.

In this way, the respective client device may independently determine when to contact the cloud server 1210 and, responsive to the respective client device determining to contact the cloud server 1210, the respective client device may independently contact the cloud server 1210. Thus, in one implementation, all eSync Client devices are independent and request their own connection to the cloud server 1210 and request downloads if necessary. This implementation carries overhead as all the eSync Client devices make contact independently with the cloud server and verify their status. In an alternate implementation, the master eSync Client device may check for connection to the cloud server 1210 through its control channel. Responsive to the master eSync Client device determining that the connection to the cloud server 1210 is available, the master eSync Client device may send a communication to the follower eSync Client devices indicating that the connection to the cloud server 1210 is available. Responsive to the communication sent from the master eSync Client device indicating that the connection to the cloud server 1210 is available, the follower eSync Client devices may initiate communication with the cloud server 1210. Responsive to the master eSync Client device determining that the connection to the cloud server 1210 is unavailable, the master eSync Client device may set a timer (e.g., 1 hour in the future, 1 day in the future, 1 week in the future, etc.) to re-check whether the connection to the cloud server 1210 is available. After successfully retrying the connection, the master eSync Client device may notify the follower eSync Client devices indicating that the connection to the cloud server 1210 is available.

Given the various functions performed by the eSync Client devices, the eSync Client devices may be in one of several states. Specifically, depending on the stage of the update process and whether a failure has occurred, the system may be in one of several states. In state 0, all eSync Client devices are able to connect to the cloud server 1210 and manage their respective downloads independently (including those eSync Client devices that have dependencies, as illustrated in FIG. 12B). Each eSync Client device may report its update status to the cloud server 1210, with the cloud server 1210 knowing the status of each respective eSync Client device. If there is a failure of the update eSync Client device or a dependent eSync Client device, the cloud server 1210 may initiate a roll back to a previous software version.

However, if the connection to the cloud server 1210 is broken without verification of the software update but after the downloads of the software updates are complete, the master eSync Client device may invoke state 1, and the virtual link may be established in one or more of the target devices (e.g., in the TCU) so that all communications now occur with the master eSync Client device (e.g., the follower eSync Client devices communicate with the master eSync Client device rather than with the cloud server 1210). In particular, the master eSync Client device may perform at least one action to maintain the virtual link between a follower eSync Client device and the cloud server 1210. This is illustrated in U.S. Pat. No. 8,761,101, which is incorporated by reference herein in its entirety.

As discussed above, the eSync Client devices, such as the follower eSync Client devices, may perform various functions, including: communicating with the cloud server 1210 in order to obtain the software update download; after receiving the software update download, commencing the software update process; and verifying that the software update has been completed. In one implementation, the eSync Client devices, such as the follower eSync Client devices, may perform any one, any combination or all of these functions independently, such as without any communication with or without approval by the master eSync Client device. Alternatively, the eSync Client devices, such as the follower eSync Client devices, may perform any one, any combination or all of these functions dependent on communication with or approval from the master eSync Client device.

For example, in one implementation, the follower eSync Client devices may communicate with the cloud server 1210 without the master eSync Client device instructing the follower eSync Client devices to do so. Alternatively, the follower eSync Client devices may communicate with the cloud server 1210 only in response to a communication sent from the master eSync Client device instructing the follower eSync Client devices to do so.

As another example, the follower eSync Client devices may commence the software update process (after the follower eSync Client devices receive the software update download) without the master eSync Client device instructing the follower eSync Client devices to do so. Alternatively, the follower eSync Client devices may commence the software update process only in response to a communication sent from the master eSync Client device instructing the follower eSync Client devices to do so. As one example, the master eSync Client device may wait until the software updates have been downloaded to all eSync Client devices (including the master eSync Client device and all follower eSync Client devices) before instructing the follower eSync Client devices to commence the software update process. As another example, the master eSync Client device may examine the content of one, some, or all of the software update downloads in order to determine whether to instruct the follower eSync Client devices to commence the software update process. In particular, the software update download may include the delta update, and new session keys. In one implementation, the master eSync Client device may inspect the new session keys in one, some or all of the follower eSync Client devices, such as the session keys for software updates that are dependent payloads, and may verify that all session keys match. In response to this inspection/verification, the master eSync Client device may instruct the follower eSync Client device(s) to commence the software update process. For example, FIG. 12B illustrates that ECU 1288 potentially has dependent payloads, such as one payload for the Control ECU and a second payload for surround view (CAM) park assist. The master eSync Client device (such as eSync Client—1 (1284)) may analyze the session keys for the downloads for each of the Control ECU and a second payload for surround view (CAM) park assist. Responsive to the master eSync Client device verifying that the session keys match, the master eSync Client device (such as eSync Client—1 (1284)) may instruct the follower eSync Client device (such as eSync Client—2 (1295)) to commence with the software update process for surround view (CAM) park assist.

Conversely, eSync Client devices that operate independently may initiate their respective updates without any need to verify control; however, in one implementation, the independent eSync Client devices may still have to maintain their respective session keys for validation by the master eSync Client device.

Responsive to a respective eSync Client device commencing the update, the respective eSync Client device may set a flag (e.g., set "update flag" to "1") indicating that an update has occurred.

State 2 in the system results if there is a failure in the update process, such as a failure in the update process for any one, some, or all of the follower eSync Client devices. In practice, the master eSync Client device may communicate with the follower eSync Client devices to determine whether the failure has occurred. In response to this determination, the master eSync Client device may change the state of the system to state 2.

In state 2, the master eSync Client device may determine whether to perform a rollback (e.g., rolling back the software to a previous version), and if so, which target devices to rollback. In particular, the master eSync Client device may access the update policy, discussed above, to determine whether/which target devices to rollback. As one example, the update policy may indicate that a failure in one or some of the update processes in the eSync Client devices results in a global rollback for all eSync Client devices (e.g., a single failure results in all eSync Client devices revert back to their previous versions and report the reversion to the cloud server 1210 is connected). As another example, the update policy may indicate that a failure in one or some of the update processes results in rollback only in the failed devices (e.g., if the update policy indicates that rollback only occurs in failed clients or dependent clients, then the rollback is performed only on those clients that have been marked as having failed). In the example illustrated in FIGS. 12B and 13B, if there is a failure in updating the software for the Control ECU, but not a failure in updating the software for surround view (CAM) park assist, the master eSync Client device (e.g., eSync Client—1 (1284)) may instruct the follower eSync Client device (eSync Client—2 (1295)) to perform a rollback on surround view (CAM) park assist and the master eSync Client device (e.g., eSync Client—1 (1284)) may perform the rollback on Control ECU. Conversely, if there is a failure in updating the software for surround view (CAM) park assist, but not a failure in updating the software for the Control ECU, the master eSync Client device (e.g., eSync Client—1 (1284)) may instruct the follower eSync Client device (eSync Client—2 (1295)) to perform a rollback on surround view (CAM) park assist and the master eSync Client device (e.g., eSync Client—1 (1284)) may perform the rollback on Control ECU.

State 3 in the system results when the master eSync Client device has not received a new session key (e.g., no payload); however, some of the follower eSync Client devices have received new payloads. As discussed above, in one implementation, the master eSync Client device receives the payload/download last from the cloud server 1210. In the event that the connection with the cloud server 1210 is broken after some of the follower eSync Client devices have received their respective payloads/downloads, but before the master eSync Client device receives its respective payload/download from the cloud server 1210, the system enters state 3. In this state, the master eSync Client device may review the policy obtained to determine if any of follower eSync Client devices are dependent clients. An example of a dependent client is illustrated in FIGS. 12B and 13B, with ECU 1288 spanning across the critical domain 1280, 1380 and the user domain 1290, 1390. In the event that eSync Client—2 (1295) has received its respective payload/download, the master eSync Client device may determine to delay commencing the update process until the master eSync Client device (e.g., eSync Client—1 (1284)) receives its respective payload/download. In a first specific implementation, responsive to the master eSync Client device determining that all dependent clients have received the respective payload/download (including the master eSync Client device), the master eSync Client device may instruct the follower eSync Client devices to perform the update. After which, the master eSync Client device may commence its own update of the target device. Alternatively, responsive to the master eSync Client device determining that all dependent clients have received the respective payload/download (including the master eSync Client device), the master eSync Client device may commence its own update of the target device. After which, the master eSync Client device may instruct the follower eSync Client devices to perform the update.

With regard to state 4, this occurs when either a rollback has happened or all software updates have been flashed and a new server connection is being sought by the eSync Client device. For example, in response to the update policy indicating that the respective eSync Client device independently communicates with the cloud server 1210 to report the flash of the software update, the respective eSync Client device initiates the communication with the cloud server 1210. As another example, in response to the update policy indicating that the master eSync Client device communicates with the cloud server 1210 to report the flash of the software update for the follower eSync Client devices, the master eSync Client device initiates the communication with the cloud server 1210. As discussed above, a "fuel meter" may be indicative of the time for the respective eSync Client device to reconnect with the cloud server 1210. In particular, the eSync Client device may wait for the "fuel meter" to count down before attempting to establish connection. If no connection to the cloud server 1210 is possible, then the transition to another state does not occur. Further, the "fuel meter" may be refilled with the time and the eSync Client device (such as the master eSync Client device) may wait again for the "fuel meter" to indicate that a request to the cloud server 1210 is scheduled, or may have a faster decrement to re-establish connection. For example, there may be instances where the eSync Client device (such as the master eSync Client device and/or follower eSync Client devices) may wish to decrease the time between connection attempts with the cloud server 1210. For example, the "fuel meter" may be decreased from a first predetermined time period (e.g., 1 hour) to a second predetermined time period less than the first predetermined time period (e.g., ½ hour).

As discussed above, the update policy may indicate the nature of how new updates will be flashed in the various target devices, such as in the various ECUs in the vehicle. Specifically, the update policy may include timing aspects (such as under what conditions the updates are to occur). An eSync Client device (such as the master eSync Client device) may review the update policy in order to determine when to perform the update. For example, the update policy may indicate the conditions, such as the communication condition(s) (e.g., whether the vehicle is connected to Wi-Fi; whether the vehicle has a cellular communication signal better than a certain amount); the car vehicle conditions (e.g., is the vehicle turned off; is the vehicle turned on, but in the parked position). In this way, the eSync Client device may determine when to perform the updates.

In one implementation, the eSync Client device (such as the master eSync Client device) may have additional logic (such as a local rules engine) in which to determine when to perform the updates. In a first specific implementation, the eSync Client device may implement the update policy as dictated. In a second specific implementation, the eSync Client device may implement the update at least partly differently (and potentially contrary to) the update policy. For example, the eSync Client device may determine a status (such as a current status) internal to the vehicle and/or external to the vehicle. In one particular example, the vehicle may have one or more diagnostic codes (such as diagnostic trouble codes (DTC)) that may indicate the current status of the vehicle. The eSync Client device may access the one or more diagnostic codes (which may indicate a problem in the vehicle, such as a "Check Engine" designation) and determine not to perform the software update based on the update policy. In this regard, the eSync Client device may reject (at least temporarily) the update policy. For example, the eSync Client device may reject performing the update until the status of the vehicle has changed (e.g., responsive to the eSync Client device determining that the DTC is no longer indicative of a problem with the vehicle, the eSync Client device performs the update). In another particular example, the vehicle may have one or more diagnostic codes that may indicate a future status of the vehicle (e.g., a suspected problem that may occur in the future). Similarly, the eSync Client device may determine not to perform the software update based on the update policy in response to the future status of the vehicle. In still another particular example, the vehicle may receive an alert (such as a traffic alert, a weather alert, or the like), with the alert indicative of a current status external to the vehicle. Responsive to receiving the alert, the eSync Client device may determine not to perform the software update based on the update policy, and in effect, may reject (at least temporarily) the update policy.

In still an alternate implementation, the eSync Client device may determine a "car-safe" level. The "car-safe" level is discussed in U.S. Pat. No. 9,374,423 (incorporated by reference herein in its entirety). As merely one example, the state of the vehicle may be reflected in a determined car safe level. A controller, such as the controller for the eSync Client device, may determine based on one or more inputs, the car-safe level. In one implementation, there may be a predetermined number of car safe levels, such as 0 to 10 (e.g., 0, 1, 2, 3, 4, 5, 6, 7, 8, 9, and 10). The eSync Client device may determine to perform the update responsive to determining that the car-safe level is equal (or less than) a predetermined level (e.g., less than 5).

As one example, a driver is leaving his home at 3:30 PM. It is determined that, based on current traffic conditions, it would take 1 hour to drive to his destination (e.g., the airport). Given these inputs, and no reports of inclement weather (or reports that the weather is acceptable), the controller may determine that the car safe level is 0 (e.g., indicative of very good driving conditions). In response to the eSync Client device determining that the car safe level is 0, the eSync Client device may perform the update. As another example, the driver may be traveling at 55 MPH. The weather is partly cloudy, with good visibility and good traffic conditions. Given the increase in speed of the vehicle, the controller may determine that the car safe level is 6 (e.g., indicative of acceptable driving conditions). In response to the eSync Client device determining that the car safe level is 6, the eSync Client device may determine to temporarily delay performing the update (e.g., until the car safe level is below a 5). As still another example, the driver is driving at 55 MPH. The weather has changed and is raining Traffic likewise is starting to get moderately busy. Given these conditions, the controller determines that the car safe level is 8, reflecting a deterioration in conditions. In response to the eSync Client device determining that the car safe level is 8, the eSync Client device may determine to temporarily delay performing the update. As yet another example, the driver increases his speed to 60 MPH. The weather is still inclement and rainy. The traffic is heavy. Given these conditions, the car safe level may be set to 10 (e.g., indicative of very bad conditions). In response to the eSync Client device determining that the car safe level is 10, the eSync Client device may determine to temporarily delay performing the update. The eSync Client device may thus use the current car-safe level in order to determine whether to perform the update at the current time.

Alternatively, the eSync Client device may analyze the type of update, and the current status (such as inside the vehicle and/or outside of the vehicle) in order to determine whether to perform the update. As one example, machine learning may cause the rules engine to be updated. Specifically, the rules engine may be updated such that, responsive to determining that the software update is directed to the heating system (such as the seat warmers), and responsive to determining that the temperature of the vehicle outside is below a certain predetermined temperature, the rules engine, which may be part of the eSync Client device, may determine that the update is considered directed to a critical region or is considered a higher priority. In response to this determination, the rules engine may delay the software update (even if the update policy indicates that the software update should be updated immediately).

In still an alternate implementation, the eSync Client device may solicit input from an external source prior to determining to perform the update. For example, the eSync Client device may send a communication to a user of the vehicle, such as an app on a smartphone associated with the user of the vehicle, requesting permission to perform the software update. Responsive to receiving an indication of approval to perform the update from the user of the vehicle, the eSync Client device may perform the software update. Responsive to receiving an indication not to perform the update from the user of the vehicle, the eSync Client device may delay performing the software update. For example, responsive to receiving an indication not to perform the update from the user of the vehicle, the eSync Client device may set a timer (such as for 1 day, 1 week, etc.) in which to request approval again. Alternatively, the user of the vehicle, in the communication indicative not to perform the software update, may indicate a time in the future (such as in 1 day, 1 week, etc.) in which to perform the software update. In response to receiving from the user the time in the future in which to perform the software update, the eSync Client device may schedule the software update for the time in the future. In yet another example, the eSync Client device may allow the user to delay the software update for a certain period of time (such as 2 weeks); after which, the eSync Client device will perform the software update regardless of whether the user has given approval to perform the software update.

Figure 14:
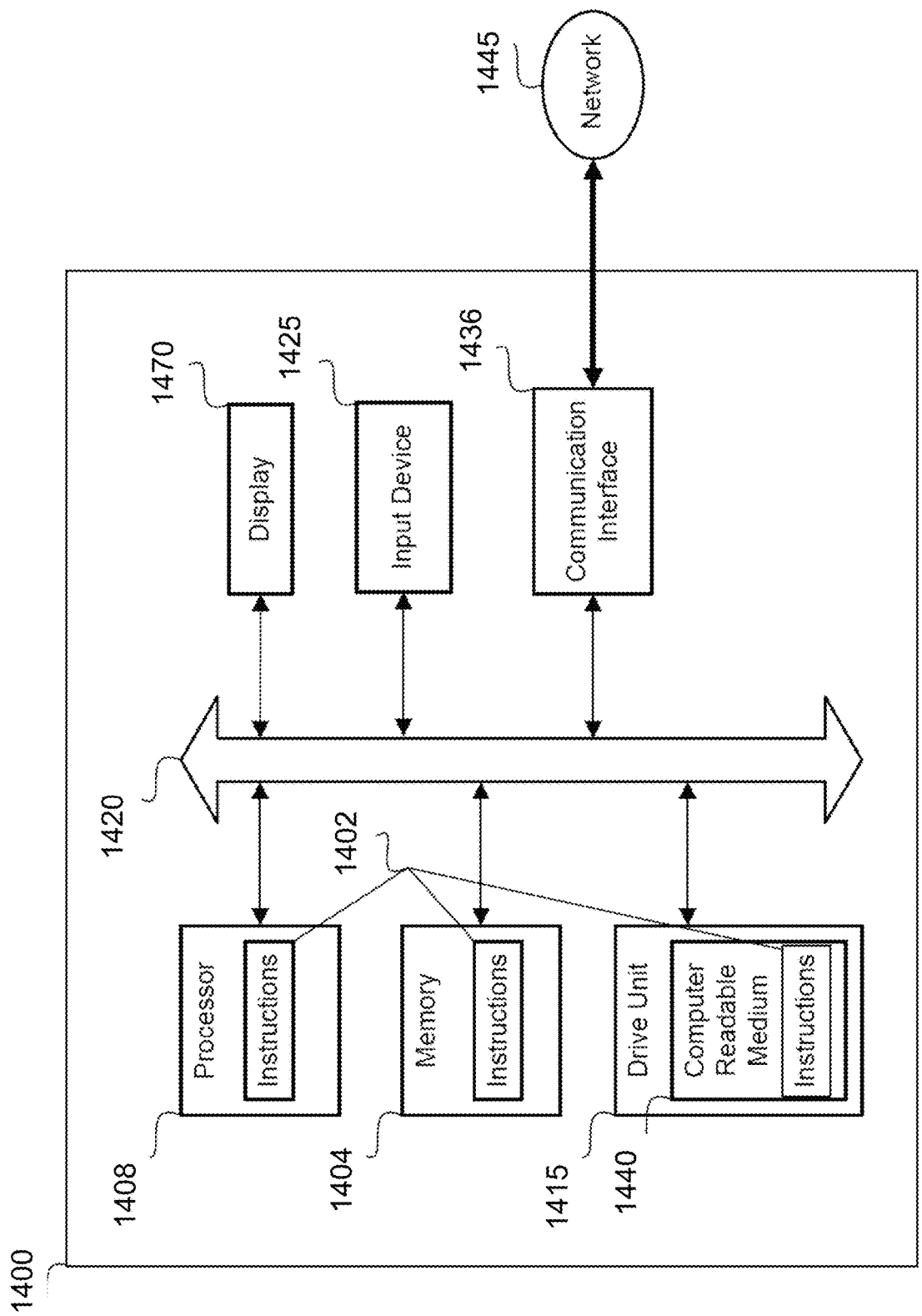
FIG. 14 is a general computer system, programmable to be a specific computer system, which may represent any of the computing devices referenced herein, such as the head unit or the smartphone.

FIG. 14 illustrates a general computer system 1400, programmable to be a specific computer system 1400, which can represent any server, electronic device or electronic component disclosed herein, such as any server, any vehicle client, any ECU, any gateway, any head unit, or the like. The computer system 1400 may include an ordered listing of a set of instructions 1402 that may be executed to cause the computer system 1400 to perform any one or more of the methods or computer-based functions disclosed herein. The computer system 1400 can operate as a stand-alone device or can be connected, e.g., using the network 1445, to other computer systems or peripheral devices.

In a networked deployment, the computer system 1400 can operate in the capacity of a server or as a client-user computer in a server-client user network environment, or as a peer computer system in a peer-to-peer (or distributed) network environment. The computer system 1400 can also be implemented as or incorporated into various devices, such as a personal computer or a mobile computing device capable of executing a set of instructions 1402 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1400 can include a memory 1404 on a bus 1420 for communicating information. Code operable to cause the computer system to perform any of the acts or operations described herein can be stored in the memory 1404. The memory 1404 can be a random-access memory, read-only memory, programmable memory, hard disk drive or any other type of volatile or non-volatile memory or storage device.

The computer system 1400 can include a processor 1408, such as a central processing unit (CPU) and/or a graphics-processing unit (GPU). The processor 1408 can include one or more general processors, digital signal processors, application specific integrated circuits, field programmable gate arrays, digital circuits, optical circuits, analog circuits, combinations thereof, or other now known or later-developed devices for analyzing and processing data. The processor 1408 can implement the set of instructions 1402 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1400 can also include a disk or optical drive unit 1415. The disk drive unit 1415 can include a computer-readable medium 1440 in which one or more sets of instructions 1402, e.g., software, can be embedded. Further, the instructions 1402 can perform one or more of the operations as described herein. The instructions 1402 can reside completely, or at least partially, within the memory 1404 or within the processor 1408 during execution by the computer system 1400. Accordingly, various databases, such as software repository revisions, delta 162, sync repository revisions, delta 172, local secure storage 412, flash memory 416, software repository revisions, delta 766, sync repository revisions, delta 774, server DB 912, etc., can be stored in the memory 1404 or the disk unit 1415.

The memory 1404 and the processor 1408 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1400 can include an input device 1425, such as a keyboard or mouse, configured for a user to interact with any of the components of system 1400. It can further include a display 1470, such as a liquid crystal display (LCD), a cathode ray tube (CRT), or any other display suitable for conveying information. The display 1470 can act as an interface for the user to see the functioning of the processor 1408, or specifically as an interface with the software stored in the memory 1404 or the drive unit 1415.

The computer system 1400 can include a communication interface 1436 that enables communications via the communications network 1445. The network 1445 can include wired networks, wireless networks, or combinations thereof. The communication interface 1436 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including those illustrated herein including FIGS. 1-13B, may be implemented using the computer functionality disclosed in FIG. 14. Further, the flow diagrams illustrated herein, including FIGS. 10A-11, may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Thus, as discussed above, a respective electronic device registered with the broker may have associated with it the respective certificate indicative of the respective electronic device being entitled to receive messages of the alert message type. In that instance, the processor may be configured to: receive, from the respective electronic device, a certificate change message, the certificate change message indicative to the broker device to generate an updated certificate associated with the respective electronic device indicative of a change such that the respective electronic device is no longer entitled to receive messages of the alert message type; and responsive to receiving the certificate change message, cause the updated certificate to be generated. Further, the certificate change message may be generated based on the respective electronic device's analysis of its respective computational or memory capabilities and based on an amount of processing of the messages of the alert message type.

In another implementation, the processor is configured to generate a tree structure of the electronic devices registered. The processor may further be configure to: receive, from the sender electronic device, a tree structure message, the tree structure message comprising a payload and an indicator of one or more nodes in the tree structure; responsive to receiving the tree structure message, determine, based on the tree structure and the indicator of one or more nodes in the tree structure, a set of addresses in the tree structure to route the message to; and send at least a part of the tree structure message to the set of addresses.

In another implementation, a broker device is disclosed that is configured to communicate with a plurality of electronic devices in a vehicle. The broker device comprises: at least one memory; and at least one processor. The processor is configured to: communicate with the plurality of electronic devices in order to obtain address indications and to validate whether the electronic devices are entitled to communicate with the broker device, wherein in order to validate a respective electronic device, the broker device receives from the respective electronic device a respective certificate in order to determine whether the respective certificate is indicative of allowing the respective electronic device to communicate via the broker device with other electronic devices in the vehicle; responsive to validating the respective electronic device, access the respective certificate in order to determine one or more types of messages that the respective electronic device is entitled to receive or send; update one or more tables correlating a non-address indication of the respective electronic device with the one or more message types that the respective device is associated with and correlating the non-address indication of the respective electronic device with an address indication of the respective electronic device in order to register the electronic devices with the broker device, the address indication used by the broker device to route messages to the respective electronic device; receive, from a sender electronic device selected from the registered electronic devices, a message from one of the plurality of electronic devices, the message including a specific message type and a payload, the message not including any address indications for use by the broker device to route the message; responsive to receipt of the message or responsive to separate polling message, the message including the specific message type: access the one or more tables correlating the message types to respective non-address indications of the plurality of electronic devices registered with the broker device in order to determine a subset of the electronic devices correlated to the specific message type; send, to the sender electronic device, the non-address indications for each of the electronic devices in the subset; receive, from the sender electronic device, one or more subsequent messages, the one or more subsequent messages including the non-address indications for each of the electronic devices in the subset; access the one or more tables correlating non-address indications with address indications in order to access the address indications correlated to each of the electronic devices in the subset; and route the one or more subsequent messages to the address indications correlated to each of the electronic devices in the subset.

As discussed above, multiple domains may be defined in the vehicle including a first domain and a second domain that have different network layouts. Alternatively, or in addition, the first domain may comprise a plurality of different networks. Further, the different domains may have respective software update modules, such as a software update module being instantiated in a head unit of the vehicle, and wherein the head unit further includes an update agent in order to update the software in the head unit of the vehicle. Another software update module may be instantiated in a gateway of the vehicle, wherein the gateway is not subject to update of its software via the software update module instantiated therein. The critical domain may include a control ECU so that the software update module (instantiated in the gateway) is configured to communicate with the external server in order to obtain the software update for the control ECU and to transmit the software update to an update agent resident in the control ECU, and wherein the update agent resident in the control ECU is configured to decrypt and decompress the software update in order to install the software update into the control ECU.

Further, as discussed above, brokers may be resident in the different domains, such as a first broker device resident in the first domain and a second broker device resident in the second domain. The first broker may be configured to: communicate with the first software update module and the electronic devices in the first domain in order to validate whether the first software update module and the electronic devices are entitled to communicate with the first broker device; responsive to validating the first software update module and the electronic devices, update one or more tables correlating a non-address indication of the first software update module and the electronic devices and an address indication of the first software update module and the electronic devices in order to register the first software update module and the electronic devices with the first broker device, the address indication used by the first broker device to route messages from the first software update module to the electronic devices; receive a software update message from the first software update module, the software update message including the non-address indication of the an electronic device in the first domain; and route, using the non-address indication of the electronic device in the first domain and the one or more tables, the software update message to the electronic device in the first domain in order for the electronic device in the first domain to update its software; and The second broker may be configured to: communicate with the second software update module and the electronic devices in the second domain in order to validate whether the second software update module and the electronic devices are entitled to communicate with the second broker device; responsive to validating the second software update module and the electronic devices, update one or more tables correlating a non-address indication of the second software update module and the electronic devices and an address indication of the second software update module and the electronic devices in order to register the second software update module and the electronic devices with the second broker device, the address indication used by the second broker device to route messages from the second software update module to the electronic devices; receive a software update message from the second software update module, the software update message including the non-address indication of the an electronic device in the second domain; and route, using the non-address indication of the electronic device in the second domain and the one or more tables, the software update message to the electronic device in the second domain in order for the electronic device in the second domain to update its software.

Finally, the first broker in the first domain may further be configured to: receive a session key message from the first software update module, the session key message including an encrypted session key and indicative of a non-address indication of an electronic device in the first domain; and route, using the non-address indication of the electronic device in the first domain and the one or more tables, the session key message to the electronic device in the first domain; and wherein the software update message is encrypted using the session key; and wherein the first broker is configured to route the software update message to the electronic device in the first domain without decrypting the software update message encrypted with the session key.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter. In this regard, the above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A broker device configured to communicate with a plurality of electronic devices in a vehicle, the broker device comprising:
    at least one memory; and
    at least one processor configured to:
        access one or more certificates;
        communicate with the plurality of electronic devices in order to validate whether the electronic devices are entitled to communicate with the broker device, wherein in order to validate a respective electronic device, the broker device accesses a respective certificate in order to determine whether the respective certificate is indicative of allowing the respective electronic device to communicate via the broker device with other electronic devices in the vehicle;
        responsive to validating the respective electronic device:
            update one or more tables an address indication of the respective electronic device in order to register the respective electronic device with the broker device thereby indicating that the respective electronic device is previously validated to communicate via the broker device; and cause the respective electronic device to receive a broker key in which the respective electronic device encrypts communications sent to the broker device with the broker key;

responsive to receiving one or more session messages from at least one of a sender device or a receiver device, the one or more session messages including information to establish a broker-routed session between the sender device and the receiver device that has an associated receiving device address indication, the broker-routed session comprising routing one or more broker-routed messages via the broker device:

decrypt the one or more session messages with the broker key;

determine, based on the one or more tables and analysis of the one or more session messages, whether at least one of the sender device or the receiver device is previously validated to communicate via the broker device; and responsive to determining that at least one of the sender device or the receiver device is previously validated to communicate via the broker device, route the one or more session messages to the receiver device in order to establish the broker-routed session between the sender device and the receiver device;

wherein the one or more session messages are for establishing a session key between the sender device and the receiver device, the session key for encrypting the one or more broker-routed messages sent during the broker-routed session and routed by the broker device; and wherein the broker device, though routing the one or more session messages to establish the broker-routed session, is unable to decrypt the one or more session messages encrypted with the session key.

2. The broker device of claim 1, wherein the one or more session messages includes:

a first session message received from the sender device that includes public information regarding the sender device and routed to the receiver device; and a second session message received from the receiver device that includes public information regarding the receiver device and routed to the sender device;

wherein the session key is configured to be independently generated by:

the sender device based on the public information of the receiver device and private information regarding the sender device; and the receiver device based on the public information of the sender device and private information regarding the receiver device.

3. The broker device of claim 1, wherein the public information of the receiver device comprises a public key associated with the receiver device;

wherein the private information of the receiver device comprises a private key associated with the receiver device;

wherein the public information of the sender device comprises a public key associated with the sender device;

wherein the private information of the sender device comprises a private key associated with the sender device;

wherein the broker device does not have access to both of the private keys associated with the sender device and the private key associated with the receiver device.

4. The broker device of claim 1, wherein the one or more session messages comprise:

one or more establishing-key session messages in order for each of the sender device and receiver device to establish the session key; and one or more encrypted-by-session-key session messages that are encrypted with the session key and the broker key.

5. The broker device of claim 4, wherein the one or more encrypted-by-session-key session messages include a data transfer from the sender device to the receiver device; and wherein the data transfer is encrypted with the session key.

6. The broker device of claim 4, wherein the one or more encrypted-by-session-key session messages include one or more non-broker routed configuration messages, the one or more non-broker routed configuration messages including information to configure a non-broker routed communication channel to transmit in a non-broker routed communication session; and wherein the information to configure a non-broker routed communication channel is encrypted with the session key.

7. The broker device of claim 6, wherein the non-broker routed communication session comprises at least one of a data distribution session (DDS) session, a user datagram protocol (UDP) session, a or transmission control protocol (TCP) session.

8. The broker device of claim 7, wherein the information to configure a non-broker routed communication channel comprises at least one topic and at least one DDS session key, the at least one topic and the at least one DDS session key being encrypted with the session key; and wherein the sender device and the receiver device use the at least one topic and the at least one DDS session key to communicate data in the DDS session without routing via the broker device.

9. The broker device of claim 1, wherein the at least one processor further configured to:

receive the one or more session messages, the one or more session messages being encrypted using the broker key and the session key;

decrypt at least a part of the one or more session messages using the broker key;

determine, based on the one or more tables and analysis of the one or more session messages, whether both of the sender device and the receiver device are previously validated to communicate via the broker device; and responsive to determining that the sender device and the receiver device are previously validated to communicate via the broker device, route the one or more session messages to the receiver device;

wherein the broker device is not configured to decrypt the one or more session messages using the session key.

10. An electronic device configured to be installed within a vehicle and to communicate with a plurality of electronic devices in the vehicle, the electronic device comprising:

at least one memory; and at least one processor configured to:

communicate with a broker device in the vehicle in order to validate the electronic device with the broker device;

receive, responsive to the electronic device being validated by the broker device, a broker key in order to encrypt communications sent to the broker device;

responsive to determining to send a broker-routed message in a broker-routed session:

configure at least one broker-routed message, the at least one broker-routed message for generating a broker-routed session key and including an indication of a receiver device and a payload;

encrypt the at least one broker-routed message with the broker key; and transmit the at least one broker-routed message to the broker device in order for the broker device to: decrypt the at least one broker-routed message with the broker key; determine whether at least one of the electronic device or the receiver device have been validated by the broker device; and responsive to determining that the at least one of the electronic device or the receiver device have been validated by the broker device, routing the at least one broker-routed message to the receiver device in order for the receiver device to generate the broker-routed session key;

determine to send a non-broker-routed message in a non-broker-routed session;

responsive to determining to send a non-broker-routed message:

use the broker device to establish a non-broker-routed session key, the non-broker-routed session key used to encrypt one or more non-broker-routed messages in the non-broker-routed session;

encrypting the one or more non-broker-routed messages with the non-broker-routed session key; and transmitting the one or more non-broker-routed messages to the receiver device without routing through the broker device.

11. The electronic device of claim 10, wherein the at least one processor is configured to use the broker device to establish the non-broker-routed session key by using the broker device to route information used for or indicative of the non-broker-routed session key so that the receiver device obtains the non-broker-routed session key.

12. The electronic device of claim 11, wherein the at least one processor is configured to generate the non-broker-routed session key to the broker device in order for the broker device to route to the receiver device in order to establish the non-broker-routed session key.

13. The electronic device of claim 12, wherein responsive to determining to send the non-broker-routed message, the at least one processor is first configured to establish the broker-routed session key, to encrypt the non-broker-routed session key with the broker-routed session key, and to transmit the non-broker-routed session key with the broker-routed session key to the broker device for routing to the receiver device.

14. The electronic device of claim 13, wherein the at least one processor is configured to establish the broker-routed session key by:

transmitting or receiving one or more broker-routed messages in order to establish the broker-routed session key.

15. The electronic device of claim 14, wherein the one or more broker-routed messages in order to establish a broker-routed session key comprise:

a first broker-routed message for transmission from the electronic device, the first broker-routed message includes a public key associated with the electronic device that is encrypted with the session key; and a second broker-routed message for receipt by the electronic device, the second broker-routed message includes a public key associated with a separate electronic device that is encrypted with the session key;

wherein the at least one processor is further configured to generate the session key using the public key associated with the separate electronic device and a private key associated with the electronic device.

16. The electronic device of claim 10, wherein the at least one processor is configured to determine to send the non-broker-routed message in the non-broker-routed session based on a type of the non-broker-routed message.

17. The electronic device of claim 16, wherein the type of the non-broker-routed message comprises a diagnostic message.

18. The electronic device of claim 10, wherein the non-broker-routed message comprises information for transmission external to the vehicle; and wherein the at least one processor is configured to determine to send the non-broker-routed message in the non-broker-routed session based on determining that the information in the non-broker-routed message is for transmission external to the vehicle.

19. The electronic device of claim 10, wherein the at least one processor is configured to determine to send the non-broker-routed message in the non-broker-routed session based on the receiver device that is to receive the non-broker-routed message.

20. A method for a broker device to communicate with a plurality of electronic devices in a vehicle, the method comprising:

communicating, by the broker device, with the plurality of electronic devices in order to validate whether the electronic devices are entitled to communicate with the broker device, wherein in order to validate a respective electronic device, the broker device accesses a respective certificate in order to determine whether the respective certificate is indicative of allowing the respective electronic device to communicate via the broker device with other electronic devices in the vehicle;

responsive to validating the respective electronic device:

updating one or more tables an address indication of the respective electronic device in order to register the respective electronic device with the broker device thereby indicating that the respective electronic device is previously validated to communicate via the broker device; and causing the respective electronic device to receive a broker key in which the respective electronic device encrypts communications sent to the broker device with the broker key;

responsive to receiving one or more session messages from at least one of a sender device or a receiver device, the one or more session messages including information to establish a broker-routed session between the sender device and the receiver device that has an associated receiving device address indication, the broker-routed session comprising routing one or more broker-routed messages via the broker device:

decrypting the one or more session messages with the broker key;

determining, based on the one or more tables and analysis of the one or more session messages, whether at least one of the sender device or the receiver device is previously validated to communicate via the broker device; and responsive to determining that at least one of the sender device or the receiver device is previously validated to communicate via the broker device, routing the one or more session messages to the receiver device in order to establish the broker-routed session between the sender device and the receiver device;

wherein the one or more session messages are for establishing a session key between the sender device and the receiver device, the session key for encrypting the one or more broker-routed messages sent during the broker-routed session and routed by the broker device; and wherein the broker device, though routing the one or more session messages to establish the broker-routed session, is unable to decrypt the one or more session messages encrypted with the session key.

* * * * *